United States Patent
Nagahara

(10) Patent No.: US 9,557,537 B2
(45) Date of Patent: Jan. 31, 2017

(54) ZOOM LENS FOR PROJECTION AND PROJECTION-TYPE DISPLAY APPARATUS

(71) Applicant: FUJIFILM Corporation, Tokyo (JP)

(72) Inventor: Akiko Nagahara, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 97 days.

(21) Appl. No.: 14/706,245

(22) Filed: May 7, 2015

(65) Prior Publication Data

US 2015/0234159 A1   Aug. 20, 2015

Related U.S. Application Data

(63) Continuation of application No. PCT/JP2013/006455, filed on Oct. 31, 2013.

(30) Foreign Application Priority Data

Nov. 16, 2012  (JP) .................................. 2012-251924

(51) Int. Cl.
*G02B 15/14*    (2006.01)
*G02B 9/34*    (2006.01)
(Continued)

(52) U.S. Cl.
CPC ............. *G02B 13/16* (2013.01); *G02B 13/006* (2013.01); *G02B 13/009* (2013.01);
(Continued)

(58) Field of Classification Search
CPC ....... G02B 13/0045; G02B 9/60; G02B 13/18; G02B 15/20; G02B 15/16; G02B 9/34; G02B 15/177; G02B 13/009; G02B 13/006; G02B 15/00; G02B 15/167
(Continued)

(56) References Cited

U.S. PATENT DOCUMENTS 6,204,976 B1 *  3/2001  Nagahara ............. G02B 15/177
                                                               359/683
6,606,201 B1    8/2003  Hirose
                        (Continued)

FOREIGN PATENT DOCUMENTS

JP    2001-124989    5/2001
JP    2003-255226    9/2003
                     (Continued)

OTHER PUBLICATIONS

International Search Report dated Mar. 4, 2014 in corresponding International Application No. PCT/JP2013/006455.

*Primary Examiner* — Evelyn A Lester
(74) *Attorney, Agent, or Firm* — Young & Thompson

(57) ABSTRACT

A zoom lens for projection consists of a negative first lens group, which is fixed during magnification change, a middle group, which includes plural lens groups that move during magnification change, and a positive last lens group, which is fixed during magnification change, in this order from a magnification side. A reduction side is non-telecentric. Both of a lens group closest to the magnification side and a lens group closest to the reduction side in the middle group have positive refractive power, and move from the reduction side toward the magnification side during magnification change from a wide-angle end to a telephoto end. The last lens group includes at least two positive lenses and at least two negative lenses. A positive lens is arranged closest to the reduction side in the last lens group. A predetermined conditional expression about a focal length of the last lens group is satisfied.

20 Claims, 45 Drawing Sheets

(51) Int. Cl.
  *G02B 13/18* (2006.01)
  *G02B 13/16* (2006.01)
  *G02B 13/00* (2006.01)
  *G02B 15/177* (2006.01)
  *G02B 15/00* (2006.01)
  *G02B 15/16* (2006.01)
  *G02B 9/60* (2006.01)
  *G02B 15/20* (2006.01)
  *G02B 15/167* (2006.01)

(52) U.S. Cl.
  CPC ....... *G02B 13/0045* (2013.01); *G02B 15/177* (2013.01); *G02B 9/34* (2013.01); *G02B 9/60* (2013.01); *G02B 13/18* (2013.01); *G02B 15/00* (2013.01); *G02B 15/16* (2013.01); *G02B 15/167* (2013.01); *G02B 15/20* (2013.01)

(58) Field of Classification Search
  USPC ....... 359/649, 650, 676, 683–686, 714, 715, 359/763, 770, 771, 781, 783
  See application file for complete search history.

(56) References Cited

U.S. PATENT DOCUMENTS

| | | | |
|---|---|---|---|
| 6,809,877 B2 | 10/2004 | Nagahara | |
| 8,228,613 B2 | 7/2012 | Sado | |
| 8,693,105 B2* | 4/2014 | Nagatoshi | G02B 15/177 359/663 |
| 8,976,454 B2* | 3/2015 | Nagatoshi | G02B 15/14 359/649 |
| 8,976,455 B2* | 3/2015 | Nagahara | G02B 15/177 359/649 |
| 2002/0080499 A1* | 6/2002 | Nagahara | G02B 13/22 359/684 |
| 2002/0181120 A1* | 12/2002 | Nagahara | G02B 15/177 359/683 |
| 2003/0184874 A1* | 10/2003 | Nagahara | G02B 15/177 359/680 |
| 2003/0231404 A1* | 12/2003 | Nagahara | G02B 15/177 359/680 |
| 2004/0190155 A1* | 9/2004 | Nagahara | G02B 15/177 359/680 |
| 2009/0135496 A1* | 5/2009 | Nagahara | G02B 15/17 359/682 |
| 2010/0245786 A1 | 9/2010 | Sado | |
| 2013/0271848 A1* | 10/2013 | Nagahara | G02B 13/16 359/683 |

FOREIGN PATENT DOCUMENTS

| | | |
|---|---|---|
| JP | 2004-20765 | 1/2004 |
| JP | 2010-237605 | 10/2010 |
| JP | 2011-123351 | 6/2011 |

* cited by examiner

FIG.19
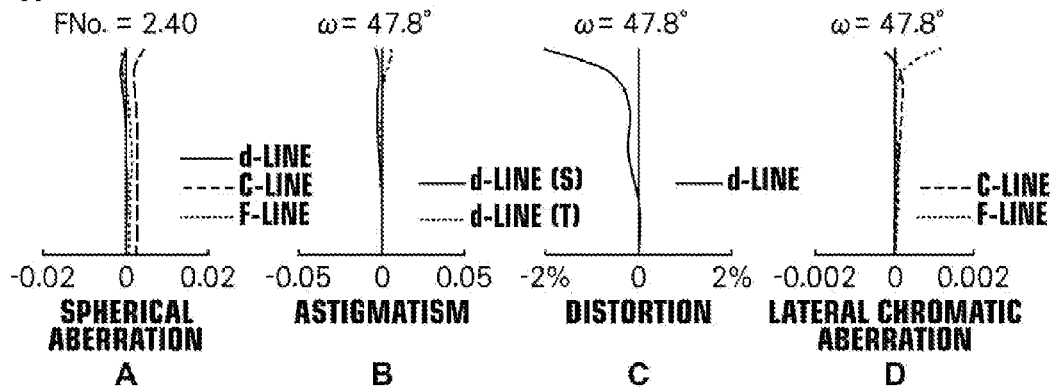
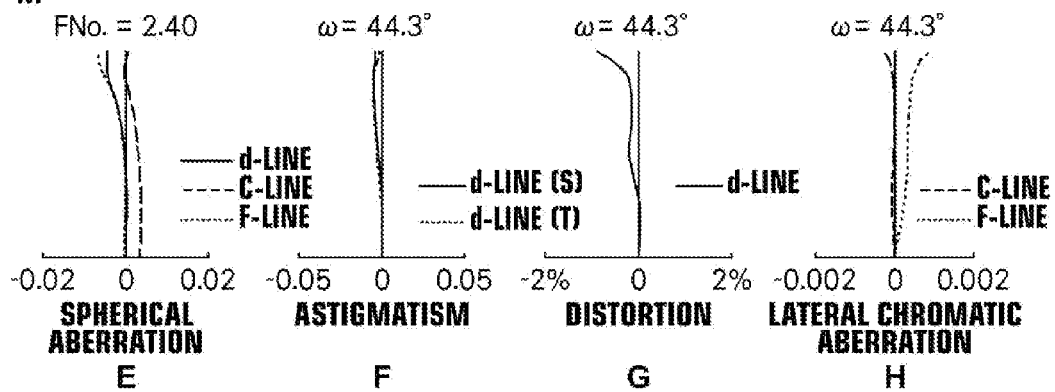
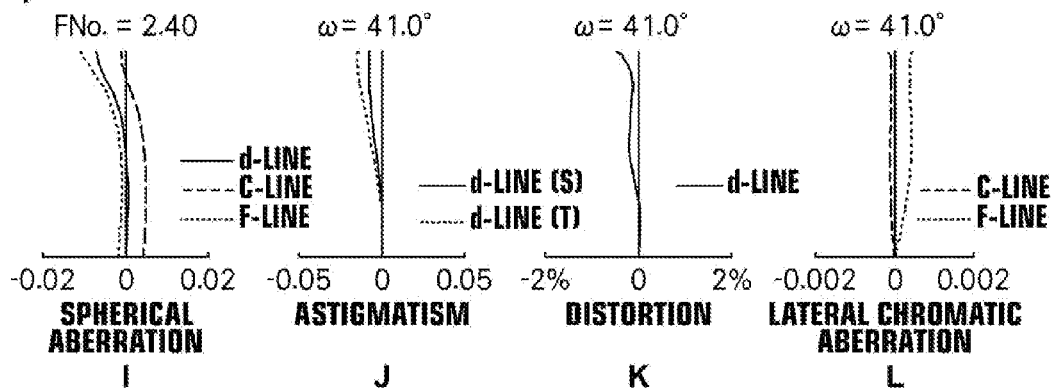

FIG.21
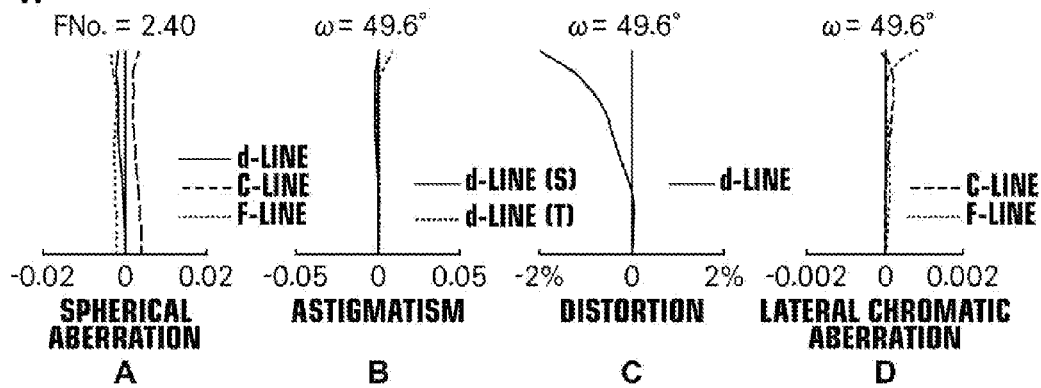
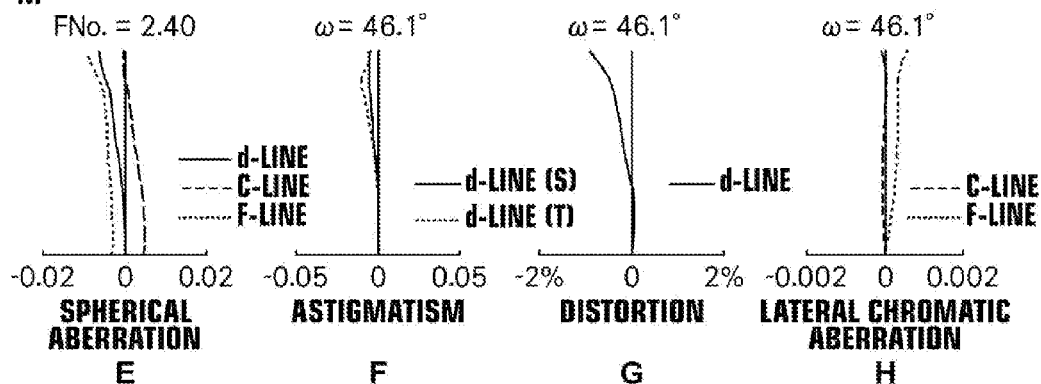
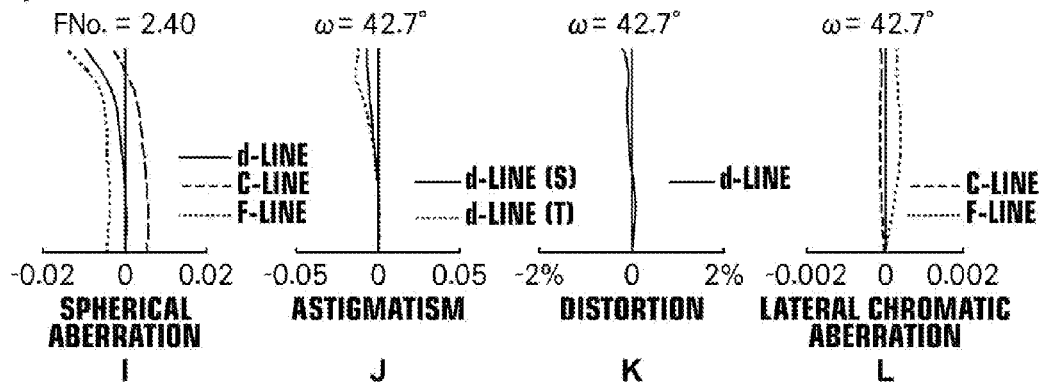

FIG.22
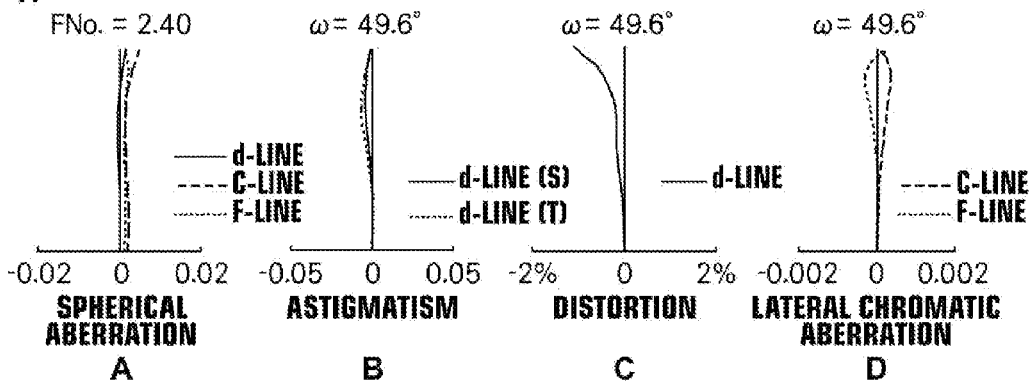
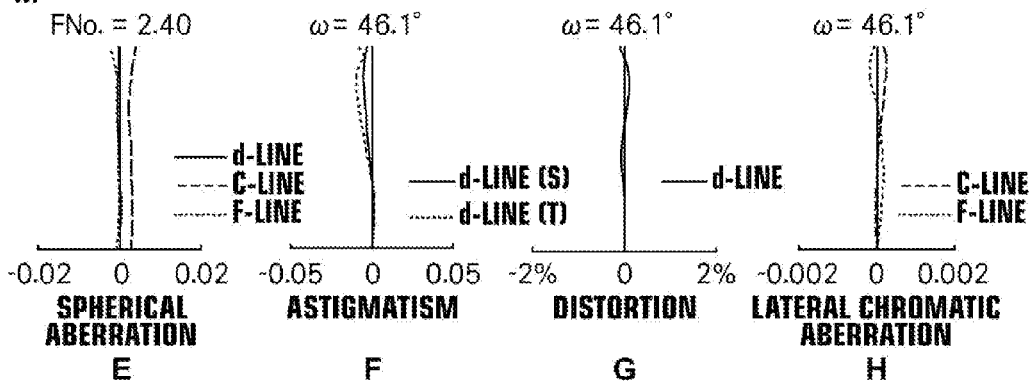
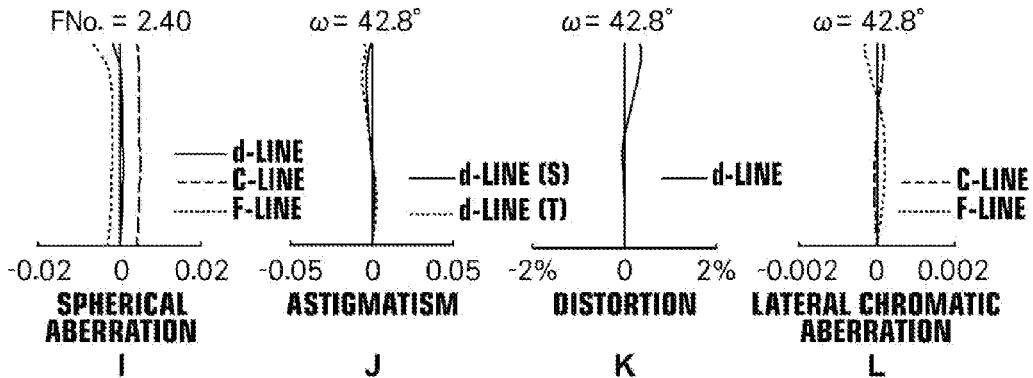

FIG.25
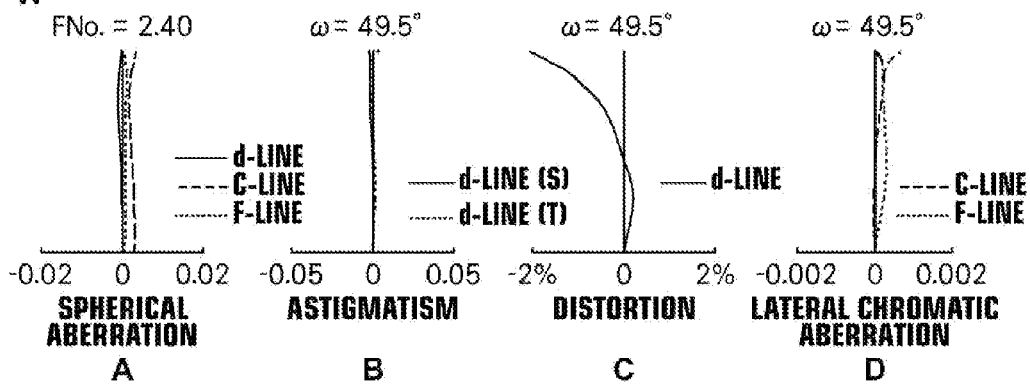
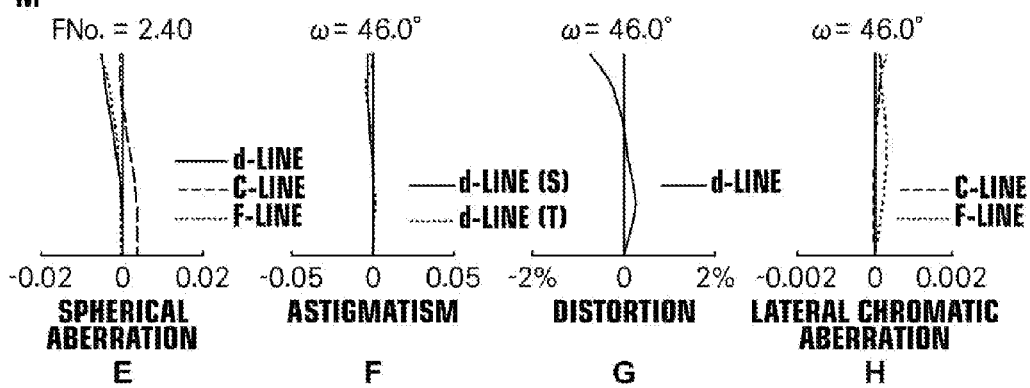
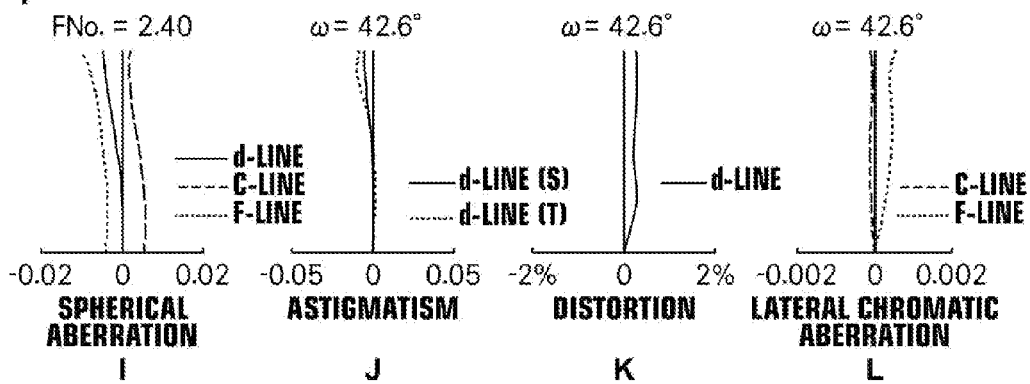

FIG.28
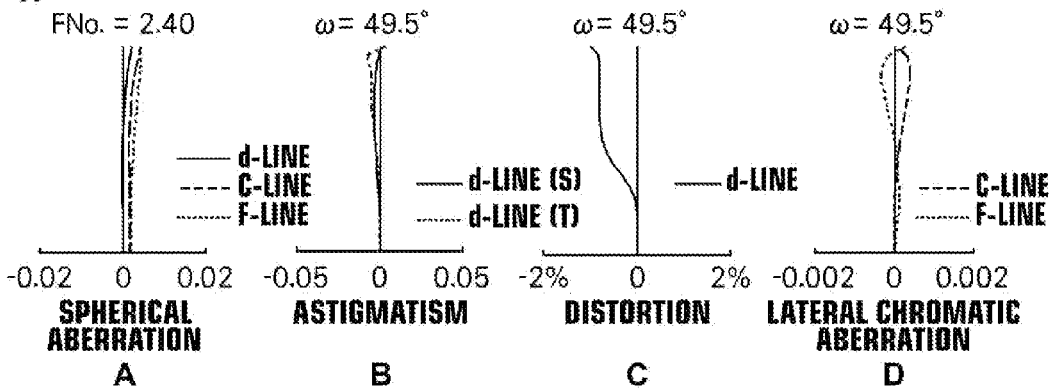
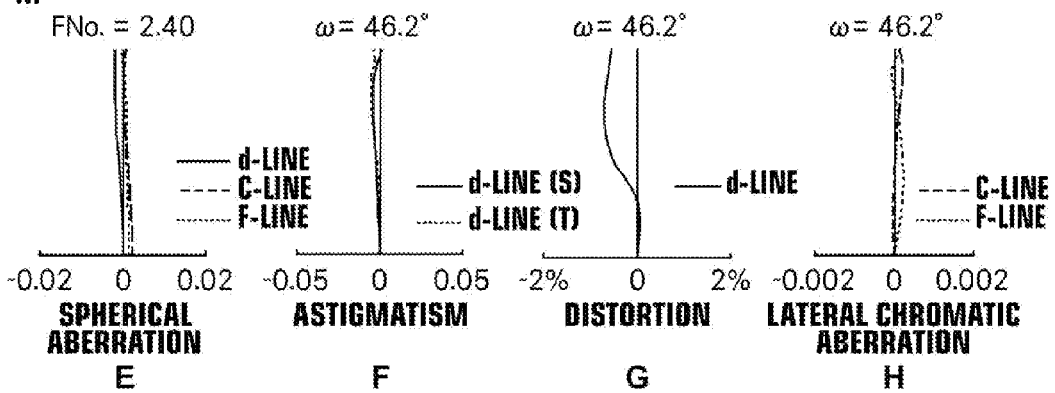
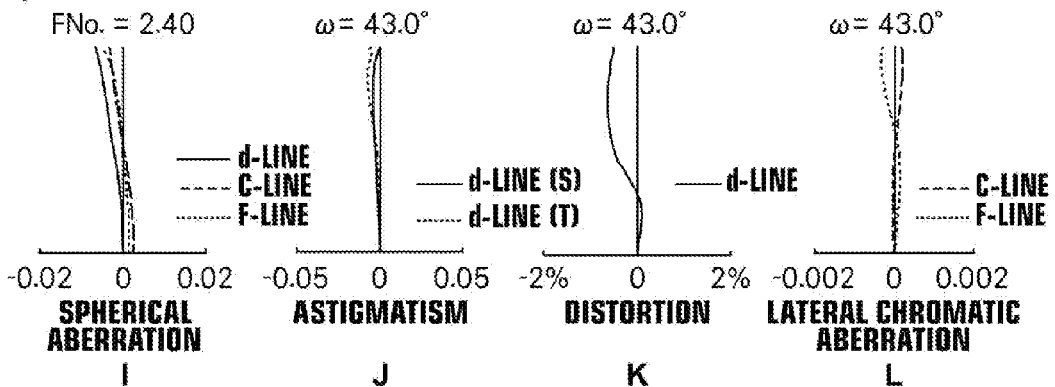

FIG.30
EXAMPLE 7 (PROJECTION DISTANCE=118.64)
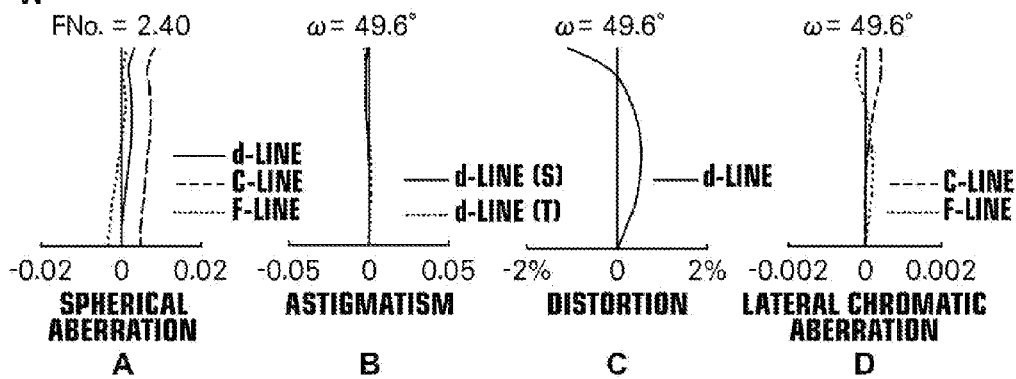
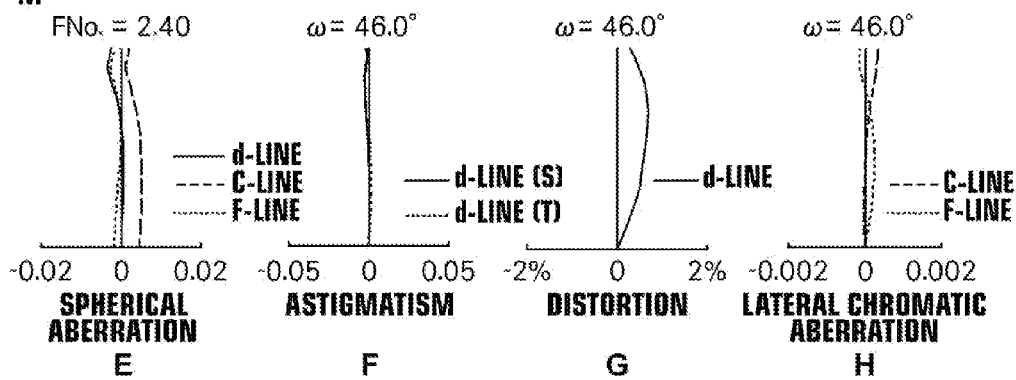
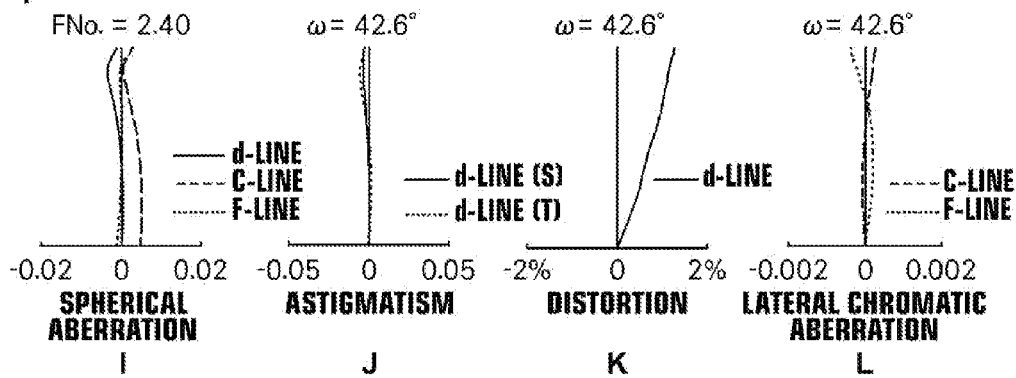

FIG.33
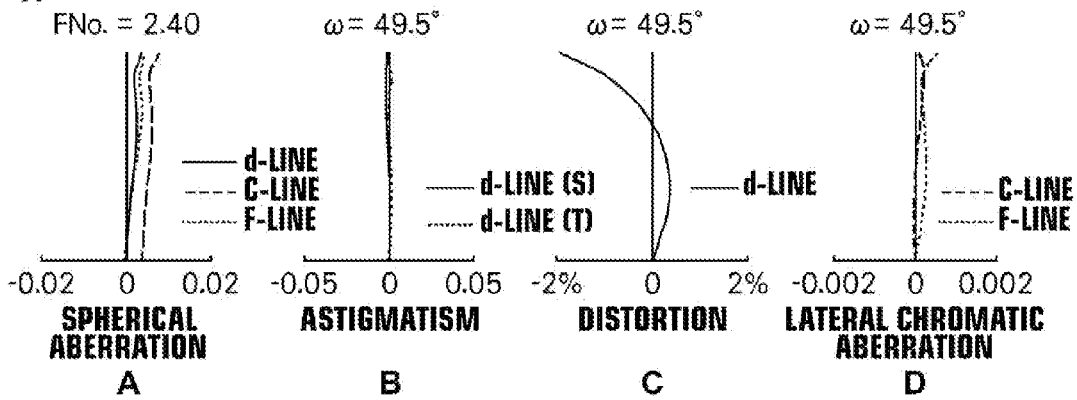
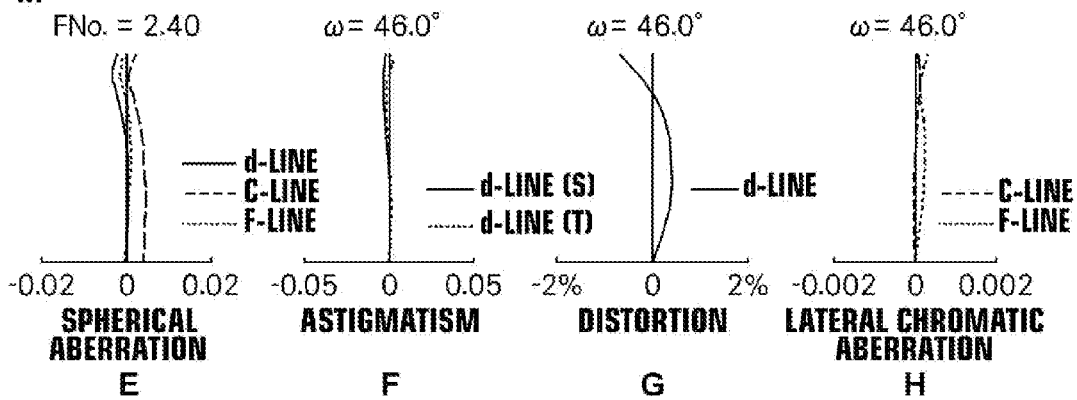
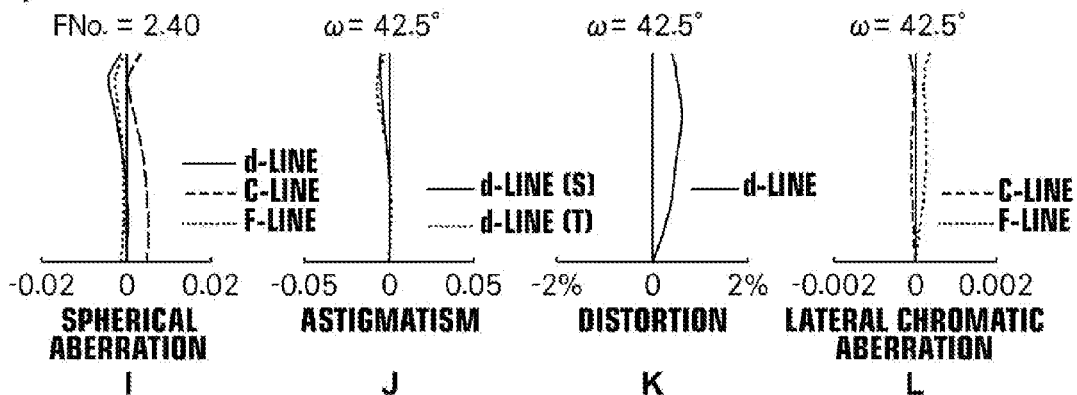

FIG.34
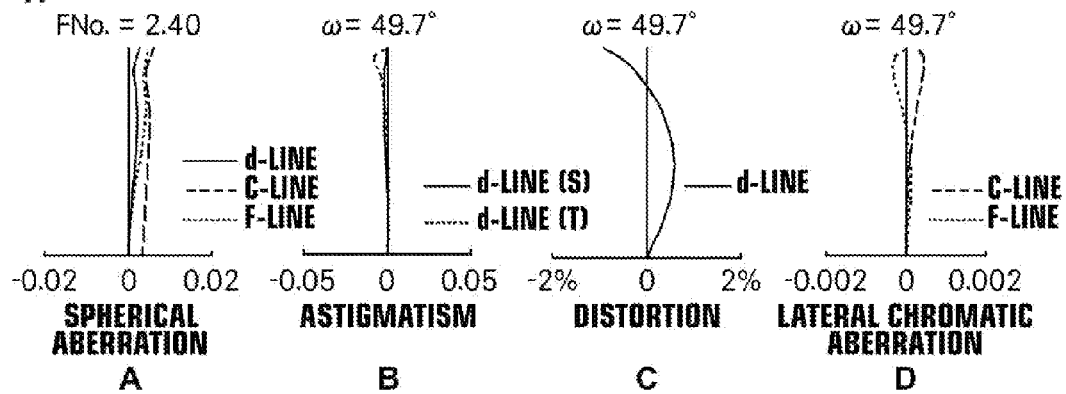
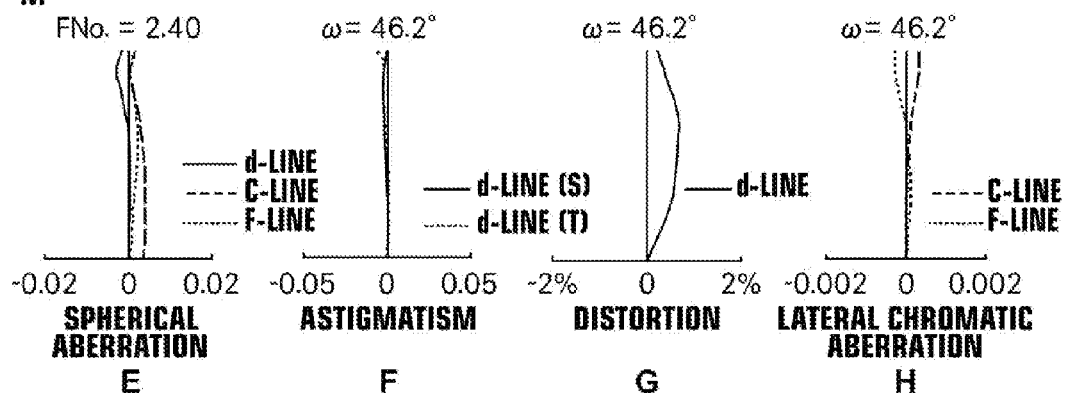
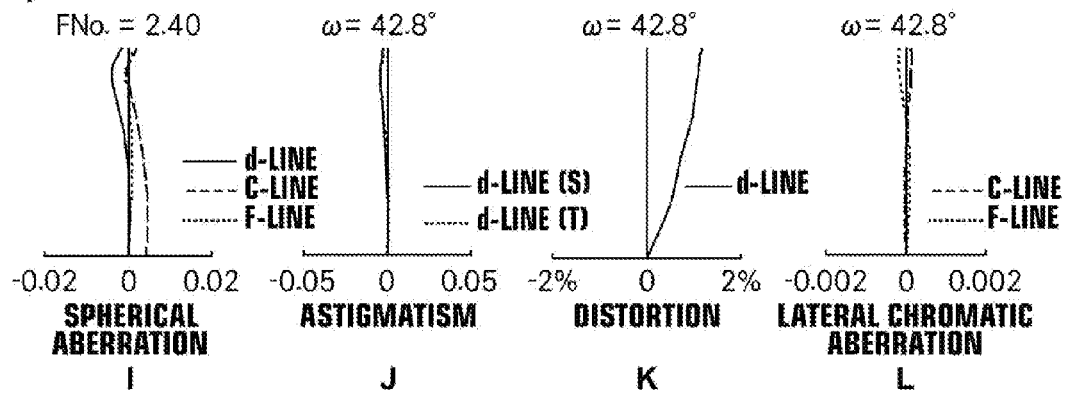

FIG.35
EXAMPLE 9 (PROJECTION DISTANCE=58.9)
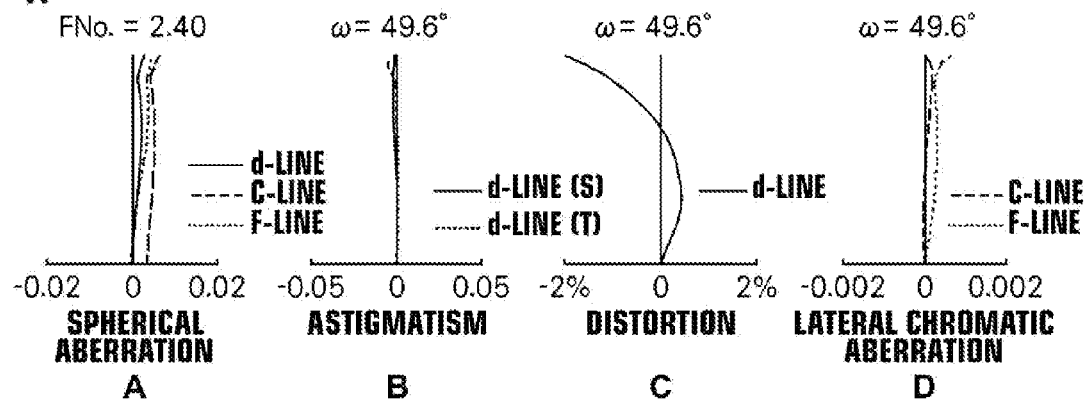
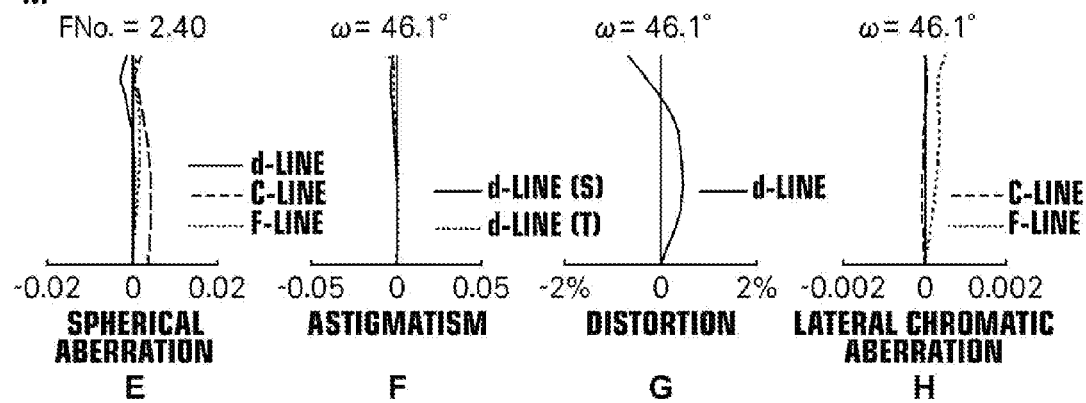
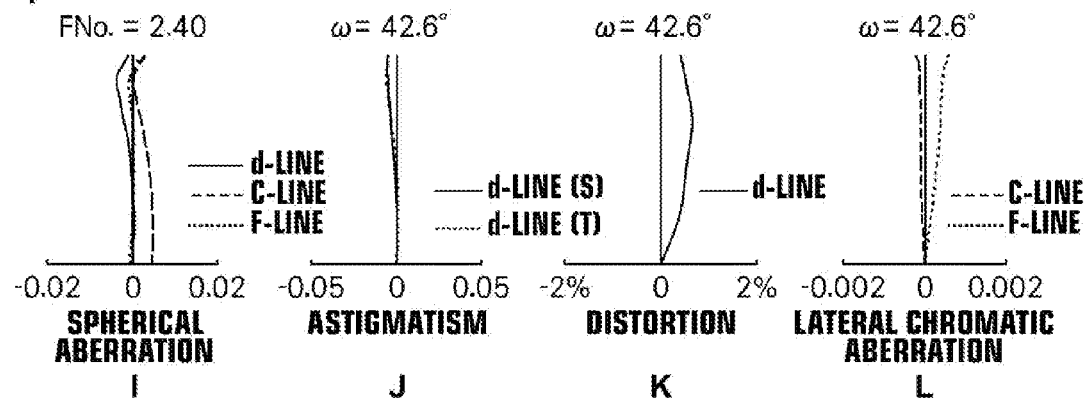

FIG.36
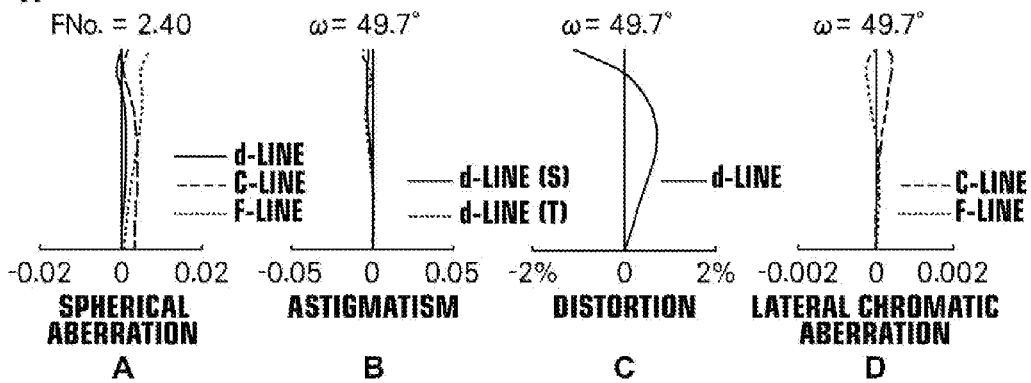
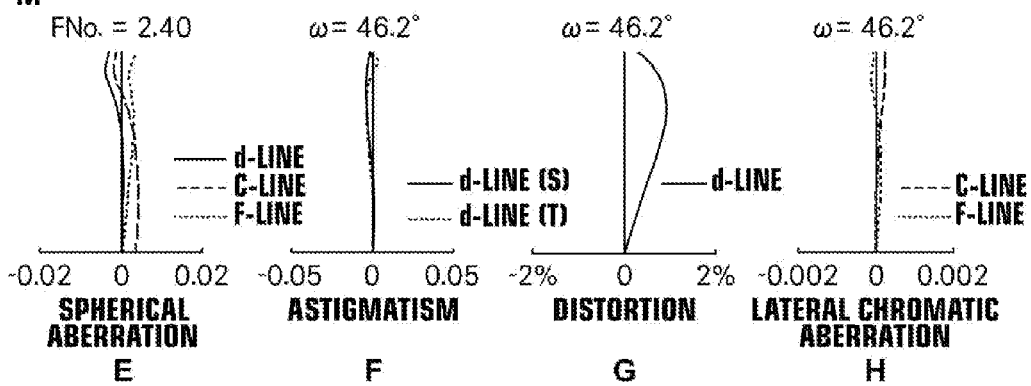
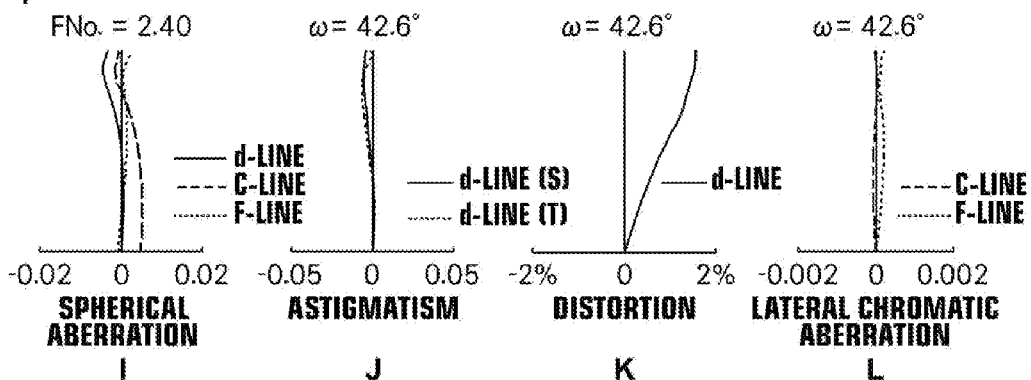

FIG.37
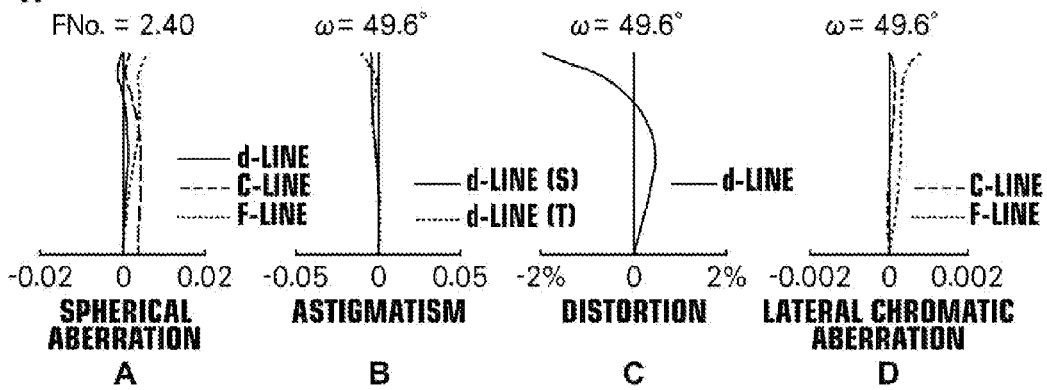
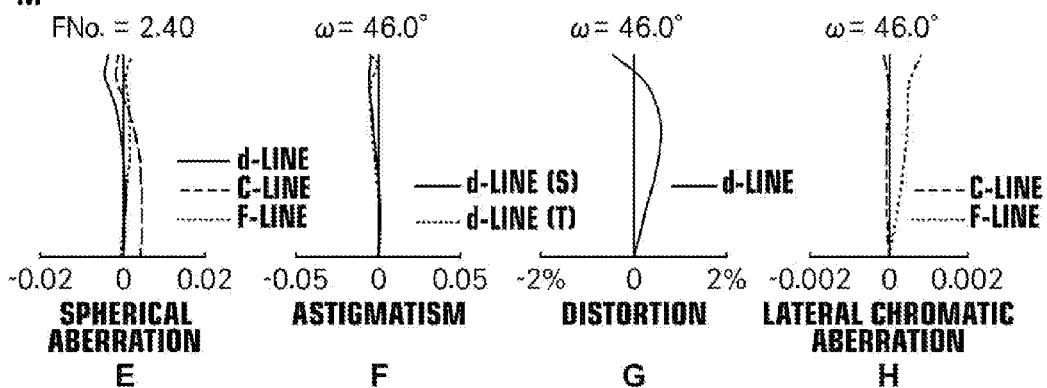
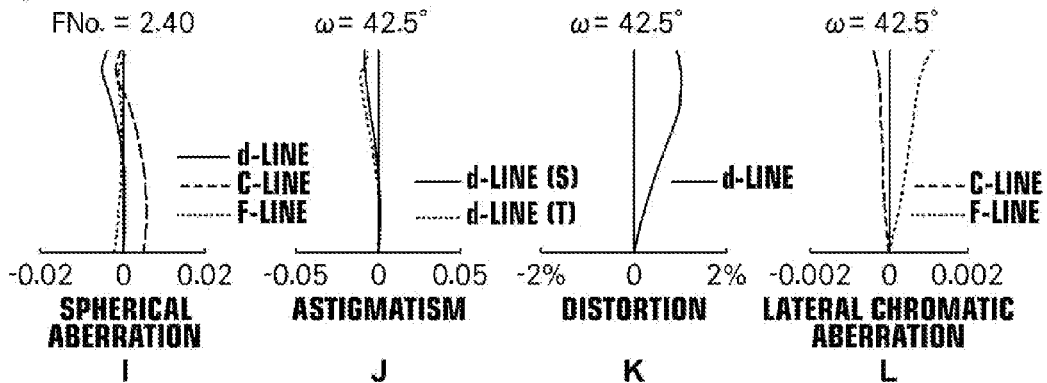

FIG.38
EXAMPLE 11 (PROJECTION DISTANCE=119.1)
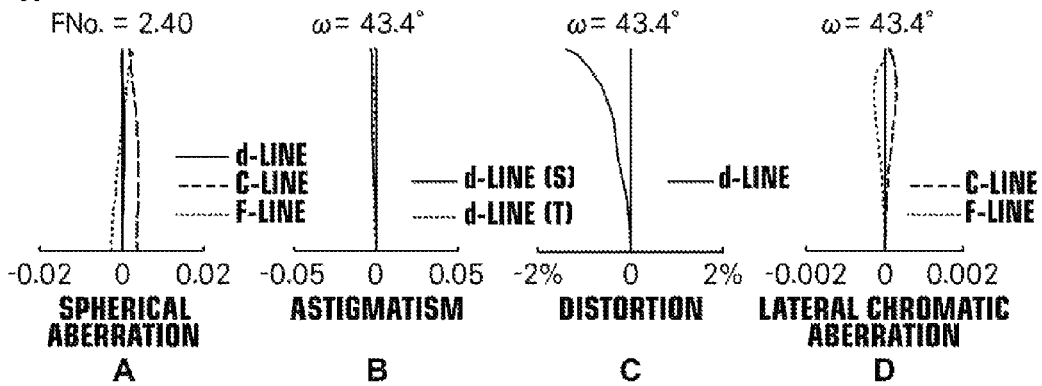
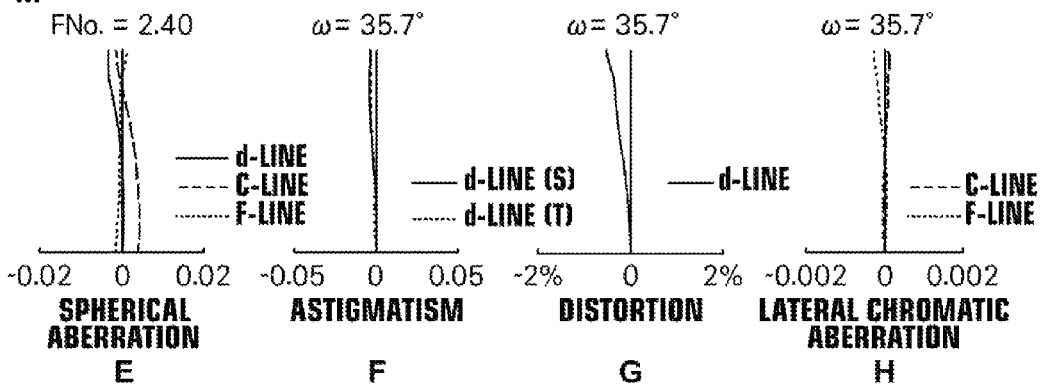
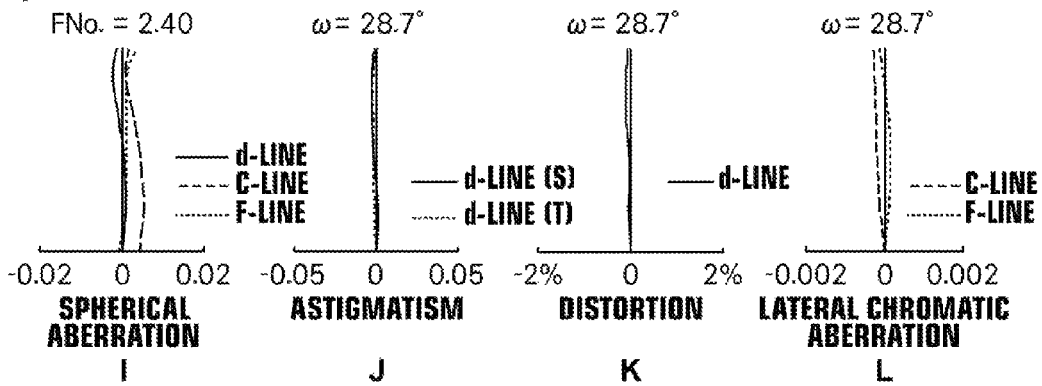

FIG.42
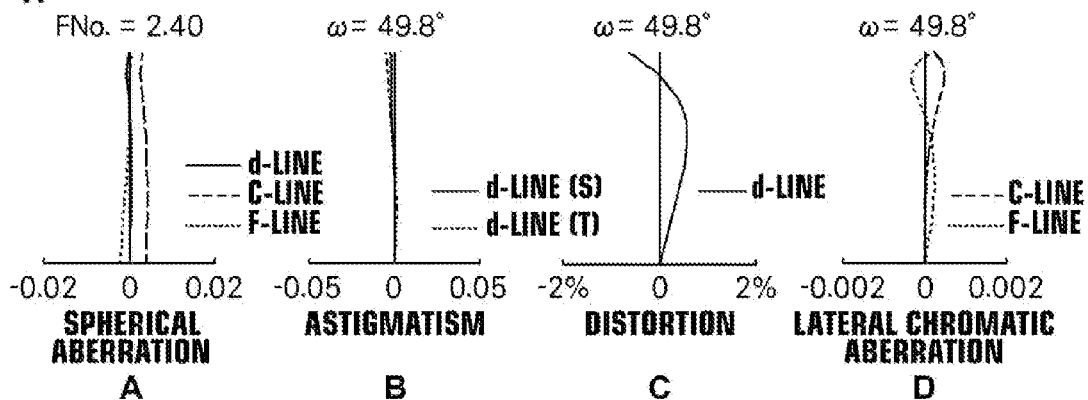
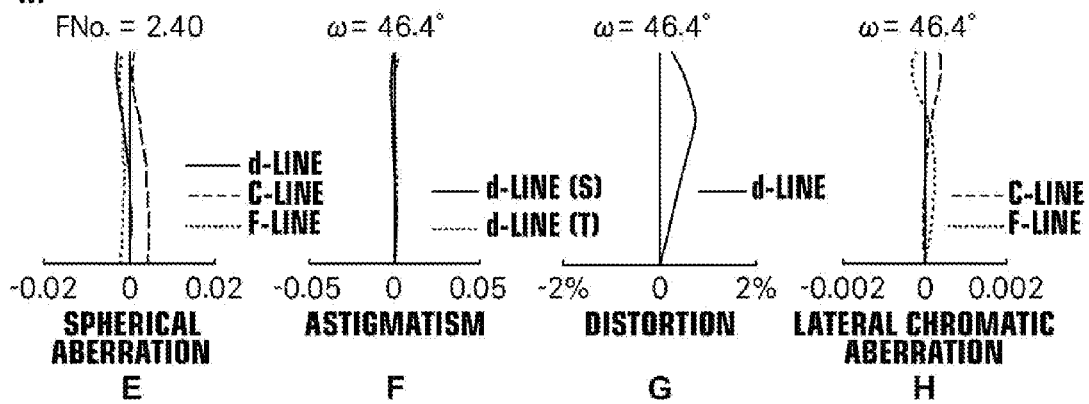
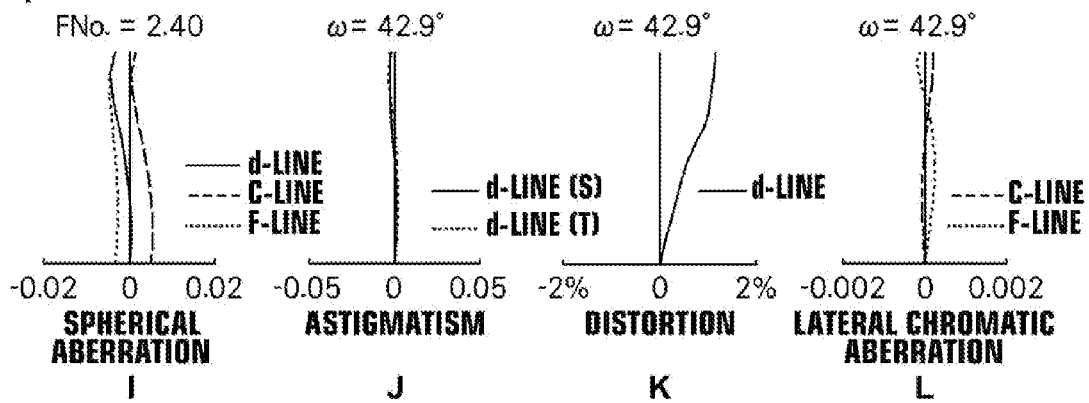

FIG.43
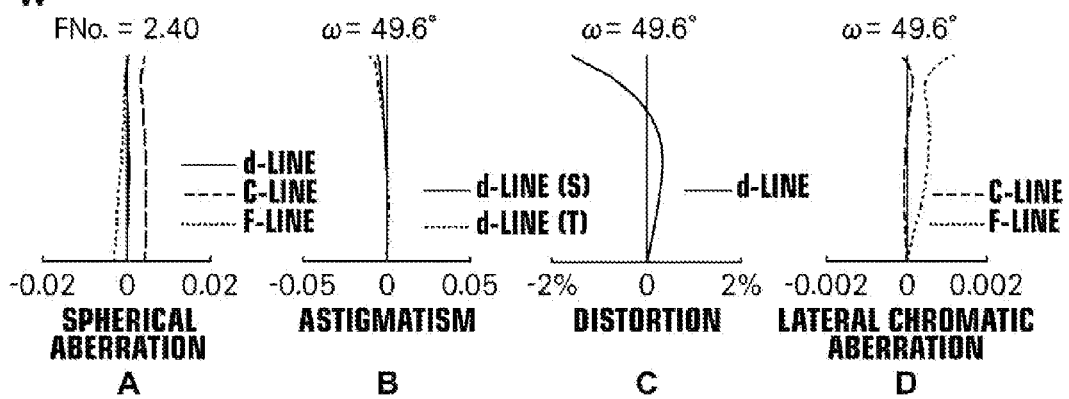
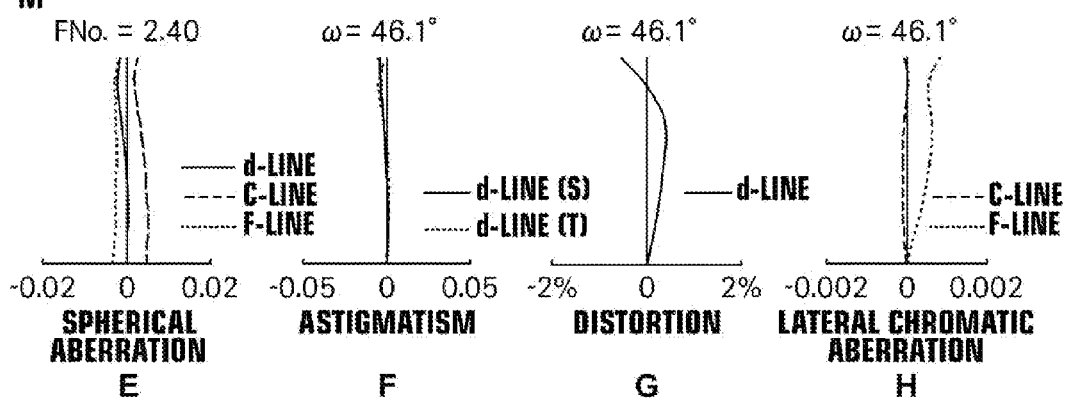
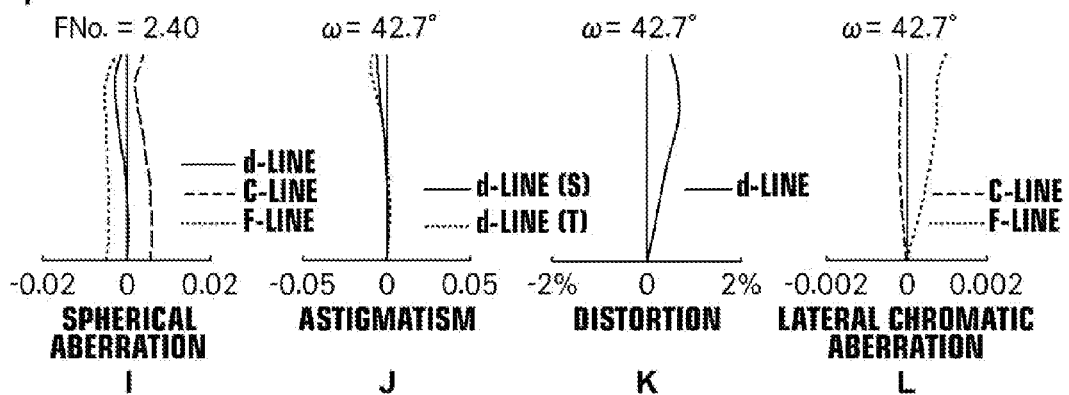

FIG.44
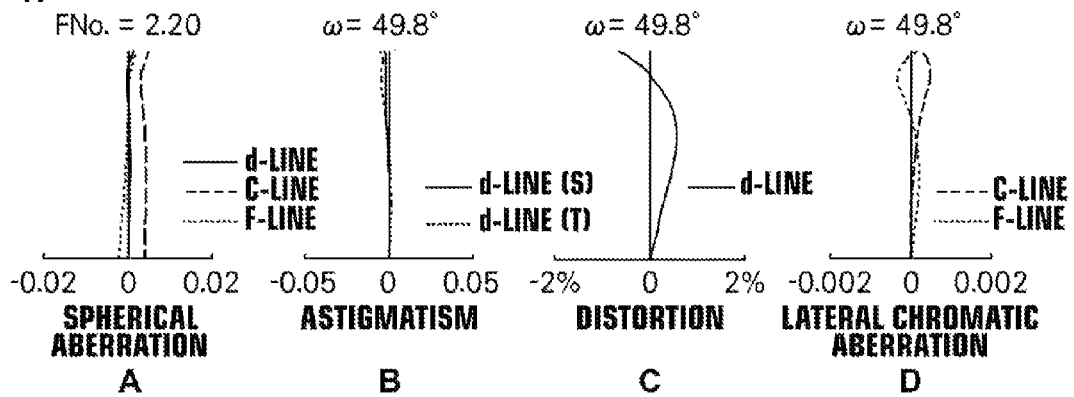
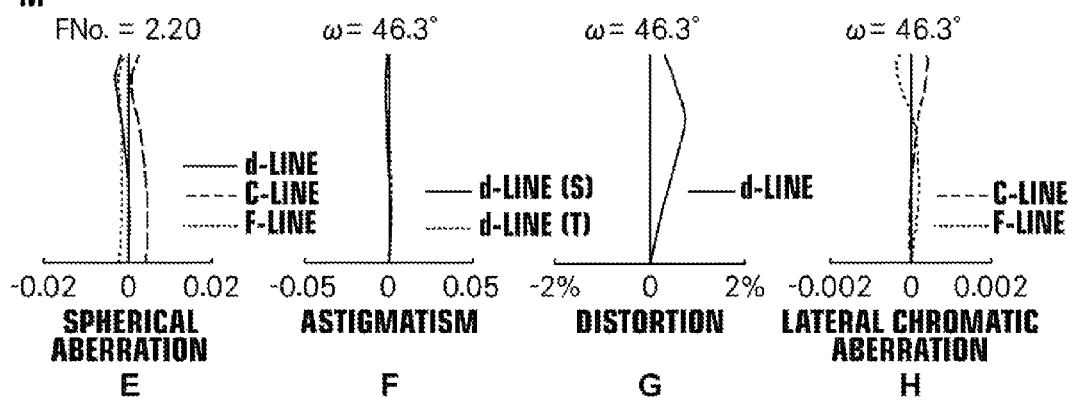
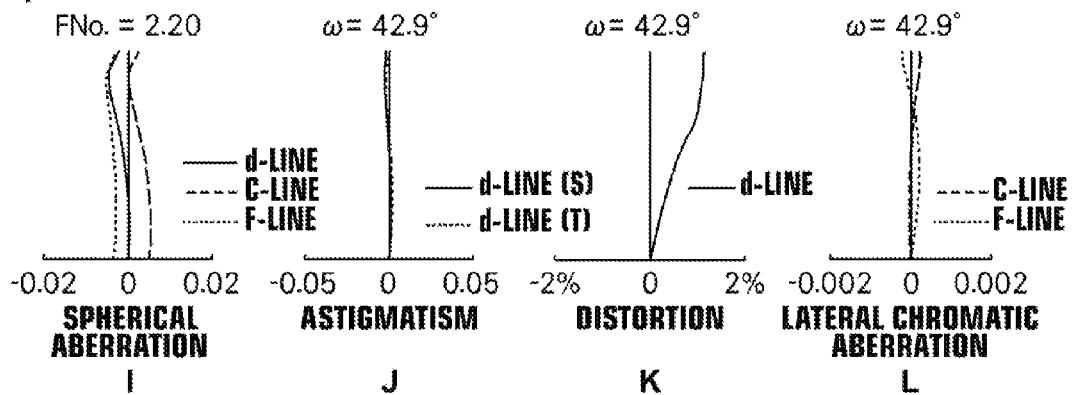

ZOOM LENS FOR PROJECTION AND PROJECTION-TYPE DISPLAY APPARATUS

CROSS-REFERENCE TO RELATED APPLICATIONS

This application is a Continuation of PCT International Application No. PCT/JP2013/006455 filed on Oct. 31, 2013, which claims priority under 35 U.S.C. §119(a) to Japanese Patent Application No. 2012-251924, filed on Nov. 16, 2012. Each of the above applications is hereby expressly incorporated by reference, in its entirety, into the present application.

BACKGROUND OF THE INVENTION

Field of the Invention

The present invention relates to a zoom lens for projection and a projection-type display apparatus. For example, the present invention relates to a zoom lens for projection appropriate to magnify and project an original image formed by a light valve or valves onto a screen and a projection-type display apparatus using the zoom lens for projection.

Description of the Related Art

Conventionally, projection-type display apparatuses that magnify and project images displayed on light valves, such as a liquid crystal display device, have been widely used. A cross dichroic prism is ordinarily used to combine colors in an optical system using transmission-type liquid crystal display devices, as light valves. Therefore, a lens for projection used in the optical system is made telecentric toward a reduction side to improve the color combination characteristics of the cross dichroic prism by taking the angle dependence characteristics of the cross dichroic prism into consideration.

When a projection-type display apparatus is used for presentation, projection in large screen size with a short projection distance is often required in a space with a relatively narrow distance from the front to the back of the space. Therefore, a demand for a wide angle lens, as a projection lens, is strong. In a wide angle lens, a change in screen size relative to a change in projection distance is large, compared with a lens with a small angle of view. Therefore, in some cases, the screen size is adjustable by changing a distance from the set apparatus to a screen only a little. However, the flexibility of the setting condition is often extremely small because the distance from the front to the back of the space is limited, as described above. Therefore, there is a tendency to prefer a zoom lens adjustable to a desirable screen size even if a distance from the set apparatus to the screen is limited.

For example, a zoom lens for projection disclosed in Japanese Unexamined Patent Publication No. 2010-237605 (Patent Document 1) is known, as a zoom lens for projection having a wide angle of view, and which is configured to be telecentric toward a reduction side. Patent Document 1 discloses a lens system consisting of five groups, in which a negative first lens group, a positive second lens group, a negative third lens group, a positive fourth lens group, and a positive fifth lens group are arranged in this order from a magnification side.

SUMMARY OF THE INVENTION

A projection-type display apparatus used in presentation or the like is often installed not permanently, but moved and installed at other places. Meanwhile, when the projection-type display apparatus is installed permanently, the projection-type display apparatus is installed often by being hung from a ceiling. Therefore, in either case, a demand for reducing the size and the weight of the projection-type display apparatus is strong. Further, there is also a demand for reducing the size of a lens to reduce the size and the weight of the whole apparatus. However, since many lenses need to be combined together to achieve sufficient image formation performance, the total length becomes long, and a magnification-side lens diameter becomes large. Therefore, reduction in the size of the lens is not easy.

Meanwhile, as a request for obtaining a projection image with higher accuracy, higher brightness and a higher contrast ratio increased, a projection-type display apparatus in which a DMD (Digital Micromirror Device: Registered Trademark) is mounted as a light valve has been drawing attention. Many micromirrors the angles of which are changeable are arranged in the DMD. In the projection-type display apparatus, ON/OFF of each pixel is switched by changing the angle of each of the micromirrors so as to change the direction of reflection of light entered the DMD through an illumination optical system. Accordingly, a whole projection image is formed. It is not always necessary that the reduction side of a lens for projection used together with the DMD, which is a reflection-type light valve as described, is telecentric.

However, in a type of projection-type display apparatus that adopts a DMD as a light valve and uses a non-telecentric optical system, it is necessary to consider so that an optical path of illumination light traveling from a light source toward the DMD through an illumination optical system, an optical path of reflection light reflected from the DMD, and each member constituting the apparatus do not interfere with each other. For example, it is necessary to consider so that a lens for projection does not block the illumination light traveling from the light source toward the DMD through the illumination optical system, and that the illumination optical system and the lens for projection do not interfere with each other. Further, it is necessary to consider so that unwanted reflection light from a pixel of the DMD switched to an OFF state does not enter the lens for projection. For that purpose, it is necessary to secure an appropriate length of back focus, and to reduce the diameter of lenses closer to the reduction side in the lens for projection at the same time.

Further, in many conventional zoom lenses for projection, an F-number changes while magnification is changed. Therefore, the zoom lenses have not satisfied a request for a zoom lens for projection that the brightness of a projection image in the same screen size is kept almost constant through the entire zoom range.

In view of the foregoing circumstances, it is an object of the present invention to provide a zoom lens for projection with excellent optical performance having a wide angle of view, and which can secure an appropriate back focus and reduce the reduction-side lens diameter, thereby contributing to reduction in the size of an apparatus, at the same time, and which is easily configurable so that an F-number is kept almost constant during magnification change, and also a projection-type display apparatus including such a zoom lens for projection.

A zoom lens for projection of the present invention consists essentially of a first lens group having negative refractive power, and which is arranged closest to a magnification side and fixed during magnification change, a last lens group having positive refractive power, and which is arranged closest to a reduction side and fixed during magnification change, and a middle group arranged between the first lens group and the last lens group, and which includes plural lens groups that move during magnification change. Both of a lens group closest to the magnification side in the middle group and a lens group closest to the reduction side in the middle group have positive refractive power, and move from the reduction side toward the magnification side during magnification change from a wide-angle end to a telephoto end. Further, the reduction side is non-telecentric. The last lens group includes at least two positive lenses and at least two negative lenses. A most reduction-side positive lens having positive refractive power is arranged closest to the reduction side in the last lens group.

Further, the following conditional expression (1) is satisfied:

$$3.00<fGe/fw<12.00 \qquad (1),\ where$$

fGe: a focal length of the last lens group, and fw: a focal length of an entire system at the wide-angle end when a projection distance is infinity.

In the zoom lens for projection of the present invention, it is more desirable that the following conditional expression (1') is satisfied instead of the aforementioned conditional expression (1). It is even more desirable that the following conditional expression (1") is satisfied:

$$4.00<fGe/fw<11.00 \qquad (1');\ and$$

$$5.00<fGe/fw<10.00 \qquad (1").$$

In the zoom lens for projection of the present invention, it is desirable that the first lens group consists of a front group consisting of first through third lenses in this order from the magnification side and a rear group in this order from the magnification side, and that the front group includes an aspheric lens.

In the zoom lens for projection of the present invention, it is desirable that the most reduction-side positive lens is a biconvex lens.

In the zoom lens for projection of the present invention, it is desirable that a negative lens with its concave surface facing the reduction side is arranged toward the magnification side of the most reduction-side positive lens in such a manner that a first air lens is formed between the negative lens and the most reduction-side positive lens, and that the following conditional expression (2) is satisfied:

$$0.01<d1/Hr1<0.15 \qquad (2),\ where$$

d1: a center thickness of the first air lens, and

Hr1: a maximum effective radius of a reduction-side surface of the first air lens.

When the first air lens is formed, it is desirable that the following conditional expression (3) is satisfied:

$$0.30<RF1\times(NdR1-1)/((RR1\times(NdF1-1))<1.10 \qquad (3),\ where$$

RF1: a curvature radius of a magnification-side surface of the first air lens,

RR1: a curvature radius of a reduction-side surface of the first air lens,

NdF1: a refractive index for d-line of the negative lens forming the first air lens, and NdR1: a refractive index for d-line of the most reduction-side positive lens.

In the zoom lens for projection of the present invention, it is desirable that the following conditional expression (4) is satisfied:

$$1.50<fp12/fw<5.00 \qquad (4),\ where$$

fp12: a combined focal length of a second positive lens from the reduction side in the last lens group through the most reduction-side positive lens.

In the zoom lens for projection of the present invention, it is desirable that the last lens group includes, besides the most reduction-side positive lens, a positive lens with its convex surface facing the magnification side and a negative lens with its concave surface facing the reduction side arranged toward the magnification side of the positive lens in such a manner that a second air lens is formed between the negative lens and the positive lens. Further, it is desirable that the following conditional expression (5) is satisfied:

$$0.01<d2/Hr2<0.15 \qquad (5),\ where$$

d2: a center thickness of the second air lens, and

Hr2: a maximum effective radius of a reduction-side surface of the second air lens.

When the second air lens is formed, it is desirable that the following conditional expression (6) is satisfied:

$$0.30<RF2\times(NdR2-1)/((RR2\times(NdF2-1))<1.10 \qquad (6),\ where$$

RF2: a curvature radius of a magnification-side surface of the second air lens,

RR2: a curvature radius of a reduction-side surface of the second air lens,

NdF2: a refractive index for d-line of the negative lens forming the second air lens, and NdR2: a refractive index for d-line of the positive lens forming the second air lens.

In the zoom lens for projection of the present invention, it is desirable that the following conditional expressions (7) and (8) are satisfied:

$$2.50<Bf/y<4.50 \qquad (7);\ and$$

$$0.80<y/fw \qquad (8),\ where$$

Bf: a reduction-side air-equivalent back focus of an entire system, and y: a reduction-side maximum image height.

It is more desirable that the following conditional expression (7') is satisfied instead of the aforementioned conditional expression (7). It is more desirable that the following conditional expression (8') is satisfied instead of the aforementioned conditional expression (8). It is even more desirable that the following conditional expression (8") is satisfied:

$$3.00<Bf/y<4.00 \qquad (7');$$

$$0.85<y/fw \qquad (8');\ and$$

$$0.90<y/fw<1.40 \qquad (8").$$

In the zoom lens for projection of the present invention, when the first lens group consists of a front group consisting of first through third lenses in this order from the magnification side and a rear group in this order from the magnification side, it is desirable that the following conditional expression (9) is satisfied. It is more desirable that the following conditional expression (9') is satisfied. It is even more desirable that the following conditional expression (9″) is satisfied:

$$-2.50 < fG1F/fw < -0.80 \quad (9);$$

$$-2.10 < fG1F/fw < -1.10 \quad (9'); \text{ and}$$

$$-2.10 < fG1F/fw < -1.30 \quad (9''), \text{ where}$$

fG1F: a focal length of the front group.

In the zoom lens for projection of the present invention, the middle group may consist of two lens groups having positive refractive power, and which move during magnification change. Alternatively, the middle group may consist of three lens groups that move during magnification change, and the three lens groups may be a lens group having positive refractive power, a lens group having negative refractive power and a lens group having positive refractive power in this order from the magnification side.

In the zoom lens for projection of the present invention, it is desirable that the following conditional expression (10) is satisfied. It is more desirable that the following conditional expression (10′) is satisfied:

$$4.00 < Dep/y < 6.00 \quad (10); \text{ and}$$

$$4.00 < Dep/y < 5.00 \quad (10'), \text{ where}$$

Dep: a length from a paraxial exit pupil position to a reduction-side image plane at a wide-angle end when the reduction side is regarded as an exit side, and y: a reduction-side maximum image height.

A projection-type display apparatus according to the present invention includes a light source, a light valve that light from the light source enters, and the aforementioned zoom lens for projection of the present invention, as a zoom lens for projection that projects an optical image of light that has been optically modulated by the light valve onto a screen.

Here, the term "magnification side" means a projected side (a screen side). The screen side will be referred to as the magnification side also in reduction projection for the sake of convenience. On the other hand, the term "reduction side" means an original image display area side (a light valve side). The light valve side will be referred to as the reduction side also in reduction projection for the sake of convenience.

Further, when a bisector (not illustrated) of an angle between an upper-side maximum ray and a lower-side maximum ray is considered on a cross section of rays condensing at an arbitrary point on a reduction-side image plane, the expression "the reduction side is non-telecentric" means that the absolute value of the inclination of the bisector of the angle with respect to optical axis Z is greater than 3°.

Here, the expression "consists essentially of . . . " means that lenses substantially without any refractive power and optical elements other than lenses, such as a stop and a cover glass, may be included in addition to the lens groups mentioned as composition elements.

The "lens group" does not necessarily consist of plural lenses. The lens group may consist of only one lens.

The surface shape and the curvature radius of the lens and the sign of the refractive power of the lens are considered in a paraxial region when the lens includes an aspheric surface.

Regarding the aforementioned "Dep", an air-equivalent value is used as a back focus portion.

The zoom lens for projection of the present invention adopts negative lead type configuration of lens groups. Further, fixed groups and movable groups are appropriately set, and the reduction side is non-telecentric. Especially, the configuration of the last lens group arranged closest to the reduction side is appropriately set. Therefore, the zoom lens is configurable to have a wide angle of view. Further, it is possible to secure an appropriate back focus, and to reduce the reduction-side lens diameter, thereby contributing to reduction in the size of the apparatus, at the same time. Further, the zoom lens for projection is easily configurable in such a manner that an F-number is kept almost constant during magnification change. It is possible to give excellent optical performance to the zoom lens for projection.

Further, the projection-type display apparatus of the present invention includes the zoom lens for projection of the present invention. Therefore, the size of the projection-type display apparatus is small, and the projection-type display apparatus has a wide angle of view. Further, it is possible to obtain excellent projection images, and to easily keep the brightness of a projection image in the same screen size almost constant through the entire zoom range.

BRIEF DESCRIPTION OF THE DRAWINGS

FIG. 19, Sections A through L are aberration diagrams of the zoom lens for projection in Example 1 of the present invention when a projection distance is a closest distance;

FIG. 21, Sections A through L are aberration diagrams of the zoom lens for projection in Example 2 of the present invention when a projection distance is a closest distance;

FIG. 22, Sections A through L are aberration diagrams of the zoom lens for projection in Example 3 of the present invention when a projection distance is a reference distance;

FIG. 25, Sections A through L are aberration diagrams of the zoom lens for projection in Example 4 of the present invention when a projection distance is a closest distance;

FIG. 28, Sections A through L are aberration diagrams of the zoom lens for projection in Example 6 of the present invention when a projection distance is a reference distance;

FIG. 30, Sections A through L are aberration diagrams of the zoom lens for projection in Example 7 of the present invention when a projection distance is a reference distance;

FIG. 33, Sections A through L are aberration diagrams of the zoom lens for projection in Example 8 of the present invention when a projection distance is a closest distance;

FIG. 34, Sections A through L are aberration diagrams of the zoom lens for projection in Example 9 of the present invention when a projection distance is a reference distance;

FIG. 35, Sections A through L are aberration diagrams of the zoom lens for projection in Example 9 of the present invention when a projection distance is a closest distance;

FIG. 36, Sections A through L are aberration diagrams of the zoom lens for projection in Example 10 of the present invention when a projection distance is a reference distance;

FIG. 37, Sections A through L are aberration diagrams of the zoom lens for projection in Example 10 of the present invention when a projection distance is a closest distance;

FIG. 38, Sections A through L are aberration diagrams of the zoom lens for projection in Example 11 of the present invention when a projection distance is a reference distance;

FIG. 42, Sections A through L are aberration diagrams of the zoom lens for projection in Example 13 of the present invention when a projection distance is a reference distance;

FIG. 43, Sections A through L are aberration diagrams of the zoom lens for projection in Example 13 of the present invention when a projection distance is a closest distance;

FIG. 44, Sections A through L are aberration diagrams of the zoom lens for projection in Example 14 of the present invention when a projection distance is a reference distance.

DESCRIPTION OF THE PREFERRED EMBODIMENTS

Figure 1:
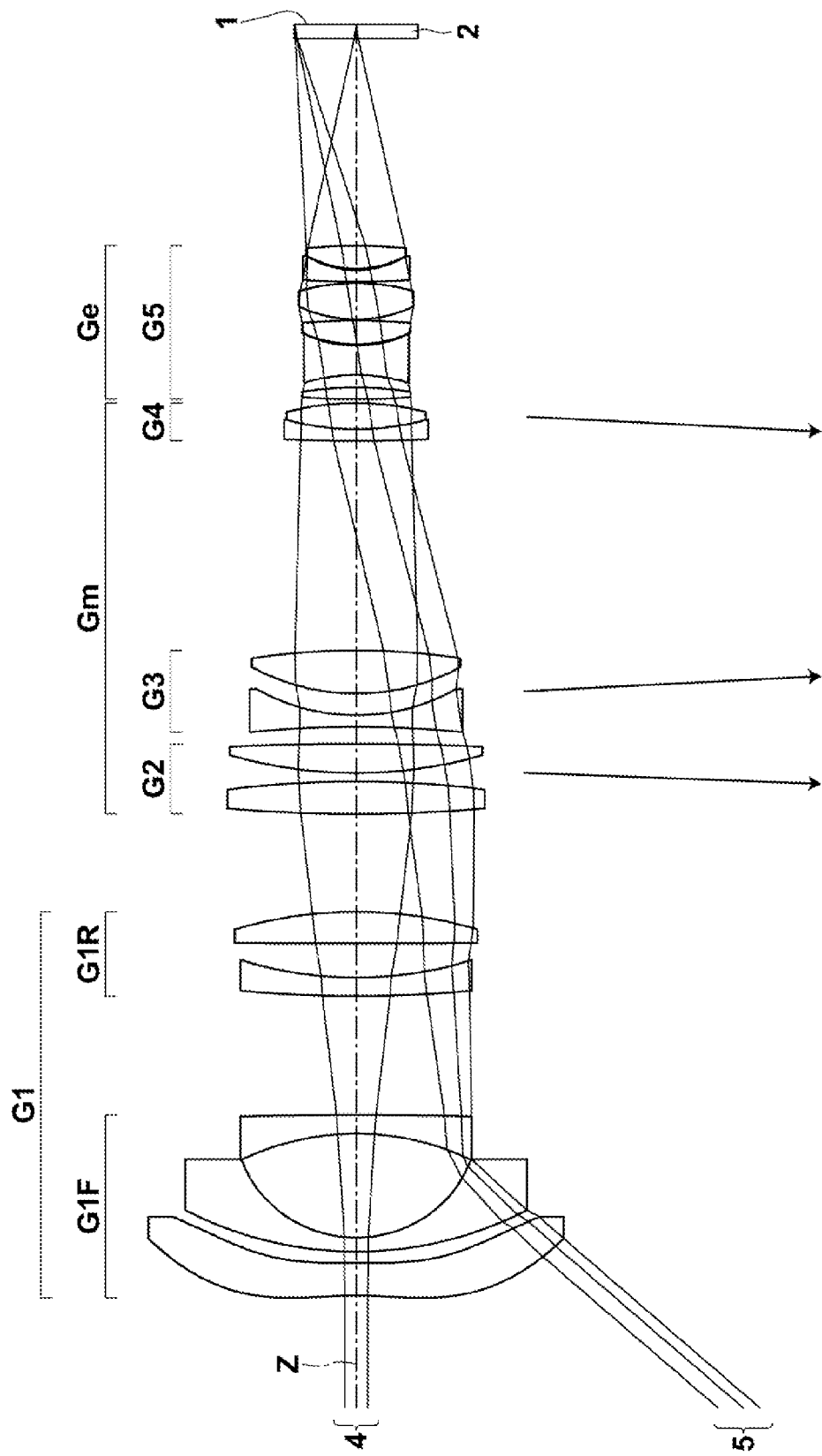
FIG. 1 is a cross section illustrating the lens configuration of a zoom lens for projection according to an embodiment of the present invention and paths of rays.
Figure 2:
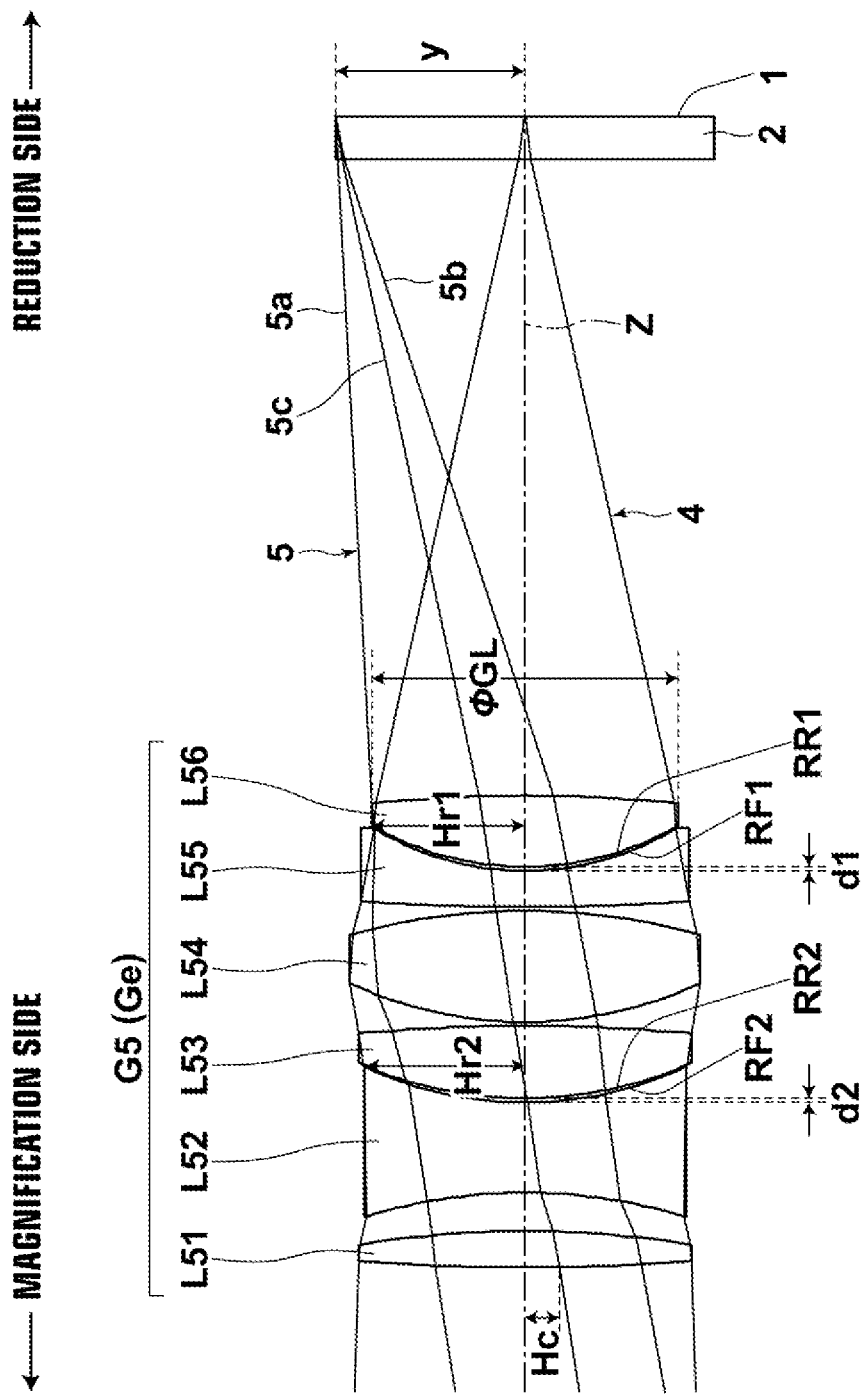
FIG. 2 is a partial enlarged diagram of the zoom lens for projection illustrated in FIG. 1.
Figure 3:
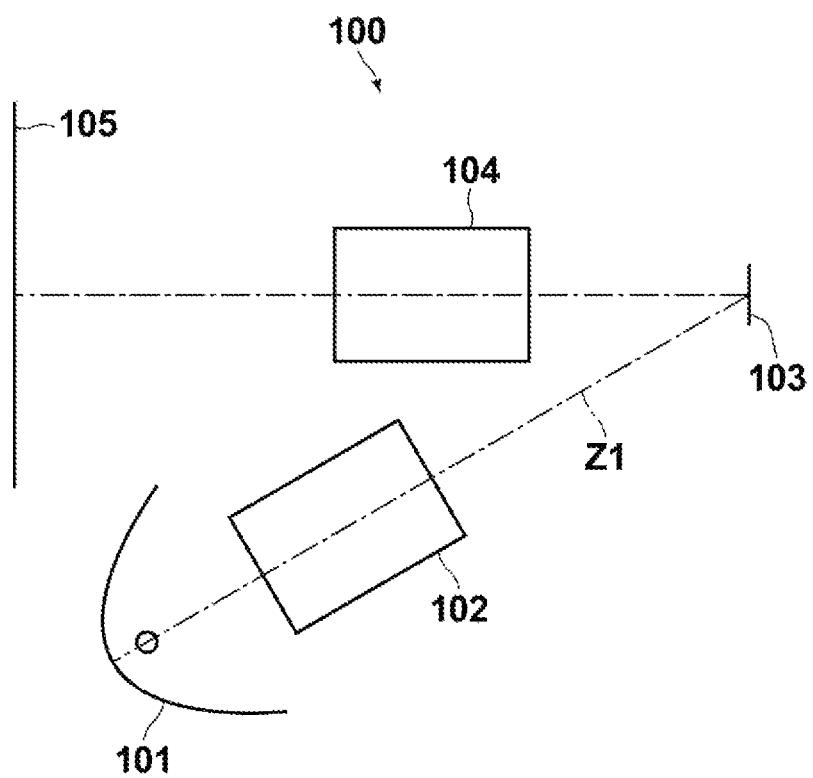
FIG. 3 is a schematic diagram illustrating the configuration of a projection-type display apparatus according to an embodiment of the present invention.

Next, embodiments of the present invention will be described in detail with reference to drawings. FIG. 1 is a cross section illustrating a zoom lens for projection according to an embodiment of the present invention at a wide-angle end. FIG. 2 is a partial enlarged diagram of the zoom lens for projection illustrated in FIG. 1. The example illustrated in FIG. 1 and FIG. 2 corresponds to a zoom lens for projection in Example 1, which will be described later. FIG. 3 is a schematic diagram illustrating the configuration of a projection-type display apparatus according to an embodiment of the present invention.

First, with reference to FIG. 3, a projection-type display apparatus according to an embodiment of the present invention will be described. A projection-type display apparatus 100 illustrated in FIG. 3 includes a light source 101, an illumination optical system 102, a DMD 103, as a light valve, and a zoom lens 104 for projection according to an embodiment of the present invention. Rays output from the light source 101 are selectively converted in time series by a color wheel, which is not illustrated, to each light of three primary color light (R, G and B). After the distribution of light amounts of the rays on a cross section perpendicular to optical axis Z1 is made uniform by the illumination optical system 102, the rays enter the DMD 103. In the DMD 103, modulation is switched, based on switched color of incident light, to modulation for light of the color. The light optically modulated by the DMD 103 enters the zoom lens 104 for projection. The zoom lens 104 for projection projects an optical image of this optically modulated light onto a screen 105.

In a projection-type display apparatus using a reflection-type light valve, and in which an optical system is non-telecentric, it is necessary to consider so that each member does not interfere with each other, and each member does not block optical paths. For example, in the example illustrated in FIG. 3, it is necessary to consider so that the illumination optical system 102 and the zoom lens 104 for projection do not interfere with each other, and that the zoom lens 104 for projection does not block illumination light traveling from the illumination optical system 102 toward the DMD 103. Further, it is necessary to consider so that unwanted reflection light from a pixel of the DMD 103 that has been switched to OFF does not enter the zoom lens 104 for projection. For that purpose, it is necessary to reduce the DMD-103-side (reduction side) lens diameter of the zoom lens for projection 104, and to provide an appropriate length of back focus.

In the zoom lens for projection of the present invention, the reduction side is non-telecentric. If the reduction side of the zoom lens for projection is telecentric, the reduction-side lens diameter becomes large when the back focus is tried to be increased while a peripheral light amount and brightness are secured. To secure a long back focus while reducing the reduction-side lens diameter, it is necessary to position the reduction-side pupil position as close to the reduction side as possible in the zoom lens for projection. In the zoom lens for projection according to an embodiment of the present invention that will be described next, an appropriate back focus is secured, and the reduction-side lens diameter is reduced at the same time by positioning the reduction-side pupil position closer the reduction side in the zoom lens for projection.

Next, with reference to FIG. 1 and FIG. 2, the configuration of the zoom lens for projection according to an embodiment of the present invention will be described in detail. An example of a zoom lens for projection illustrated in FIG. 1 consists of five groups of first lens group G1 having negative refractive power, second lens group G2 having positive refractive power, third lens group G3 having negative refractive power, fourth lens group G4 having positive refractive power and fifth lens group G5 having positive refractive power arranged in this order from the magnification side.

In FIG. 1 and FIG. 2, axial rays 4 and rays 5 at a maximum image height are also illustrated. In FIG. 1 and FIG. 2, a case in which the zoom lens for projection is mounted in a projection-type display apparatus is assumed, and a parallel-flat-plate-shaped optical member 2, which is assumed to be various filters, a cover glass or the like, and an image display surface 1 of a light valve, which is located on the reduction-side surface of the optical member 2, are also illustrated.

FIG. 1 and FIG. 2 illustrate an example in which the position of the reduction-side surface of the optical member 2 and the position of the image display surface 1 are matched with each other. However, it is not always necessary that the positions are matched with each other. Further, FIG. 1 and FIG. 2 illustrate only one image display surface 1. Alternatively, the projection-type display apparatus may be configured so that display of a full color image is possible by separating rays output from a light source into three primary colors by a color separation optical system, and by arranging three light valves for respective primary colors.

In the example illustrated in FIG. 1, first lens group G1 consists of five single lenses. Second lens group G2 consists of two single lenses. Third lens group G3 consists of two single lenses. Fourth lens group G4 consists of a cemented lens in which two lenses are cemented together. Fifth lens group G5 consists of six single lenses. Here, the number of lens groups in the zoom lens for projection of the present invention and the number of a lens or lenses constituting each lens group are not necessarily limited to the example illustrated in FIG. 1.

The zoom lens for projection of the present invention consists of first lens group G1 having negative refractive power, and which is arranged closest to the magnification side and fixed during magnification change, last lens group Ge having positive refractive power, and which is arranged closest to the reduction side and fixed during magnification change, and middle group Gm arranged between first lens group G1 and last lens group Ge, and which includes plural lens groups that move during magnification change.

As described above, the negative lens group is arranged closest to the magnification side, and the positive lens group is arranged closest to the reduction side. Therefore, it is possible to widen an angle of view, and the arrangement is advantageous to securing an appropriate length of back focus.

In the example illustrated in FIG. 1, three lens groups of second lens group G2, third lens group G3 and fourth lens group G4 constitute middle group Gm, and fifth lens group G5 constitutes last lens group Ge. In the example illustrated in FIG. 1, all of second lens group G2 through fourth lens group G4 are movable groups that move during magnification change. In FIG. 1, the direction of movement of each of the lens groups during magnification change from a wide-angle end to a telephoto end is schematically illustrated by an arrow under each of the lens groups.

When middle group Gm consists of three movable groups of a lens group having positive refractive power, a lens group having negative refractive power and a lens group having positive refractive power in this order from the magnification side, as in the example illustrated in FIG. 1, it is possible to excellently correct curvature of field through the entire zoom range while preventing the total length of the lens system from becoming long.

Middle group Gm of the present invention may adopt different configuration. For example, when middle group Gm consists of two lens groups having positive refractive power, and which move during magnification change, it is possible to configure middle group Gm by using a minimum number of lens groups. Therefore, the configuration is cost-advantageous.

In the present invention, both of a lens group (corresponding to second lens group G2 in the example illustrated in FIG. 1) closest to the magnification side in middle group Gm and a lens group (corresponding to fourth lens group G4 in the example illustrated in FIG. 1) closest to the reduction side in middle group Gm have positive refractive power, and are configured in such a manner to move from the reduction side toward the magnification side during magnification change from the wide-angle end to the telephoto end.

When two of the movable groups, i.e., the movable group closest to the magnification side and the movable group closest to the reduction side are positive lens groups, as described above, it is possible to prevent the lens diameter of first lens group G1, which tends to become large, from becoming large. Therefore, the configuration is advantageous to reduction in size.

Further, the movable group closest to the magnification side and the movable group closest to the reduction side move from the reduction side toward the magnification side during magnification change from the wide-angle end to the telephoto end. Therefore, it is possible to reduce all of the total length of the lens system, the lens diameter of first lens group G1, and the lens diameter of the movable group closest to the magnification side. Especially, since the movable group closest to the magnification side and the movable group closest to the reduction side move in the same direction during magnification change, lenses in the movable lens groups or mechanical parts holding the lenses in the movable lens groups can move by using a common space. Therefore, it is possible to reduce the total length of the lens system.

Unlike the present invention, if a lens system is configured in such a manner that two movable groups having positive refractive power move in opposite directions from each other during magnification change, movement by using a common space, as described above, is not possible. Therefore, the total length of the lens system becomes long. Further, if a lens system is configured in such a manner that a movable group closest to the magnification side and a movable group closest to the reduction move in opposite directions from each other during magnification change, off-axial rays are greatly away from the optical axis between the two movable groups at a zoom position in which the two movable groups are greatly away from each other. Therefore, the lens diameter of the first lens group and the lens diameter of the movable group closest to the magnification side become large. To prevent such increase in diameter, a lens group closer to the reduction side, for example, a lens group corresponding to the last lens group must be moved during magnification change. In that case, it becomes difficult to keep an F-number constant during magnification change.

In the zoom lens for projection of the present invention, last lens group Ge, which is closest to the reduction side, is a fixed group, which is fixed during magnification change. Therefore, it is possible to easily keep an F-number constant during magnification change. For example, when a pupil position is present in last lens group Ge, which is a fixed lens group, it is possible to keep an F-number constant through the entire zoom range.

In the present invention, the refractive power of last lens group Ge is set in such a manner to satisfy the following conditional expression (1):

$$3.00 < fGe/fw < 12.00 \qquad (1),$$ where fGe: a focal length of the last lens group, and
fw: a focal length of an entire system at the wide-angle end when a projection distance is infinity.

If the lower limit of conditional expression (1) is not satisfied, it becomes difficult to excellently correct a lateral chromatic aberration and curvature of field. Further, it becomes difficult to secure an appropriate length of back focus. If the upper limit of conditional expression (1) is not satisfied, the divergence of axial rays and the divergence of lower-side off-axial rays become large. Therefore, the diameter of lenses closer to the magnification side than last lens group Ge becomes large. When conditional expression (1) is satisfied, it is possible to excellently correct a lateral chromatic aberration and curvature of field, and to secure an appropriate length of back focus while preventing the diameter of lenses closer to the magnification side than last lens group Ge from becoming large by reducing the divergence of axial rays and the divergence of lower-side off-axial rays.

FIG. 2 is a partial enlarged diagram including last lens group Ge of the zoom lens for projection illustrated in FIG. 1 and an image display surface 1. In FIG. 2, an upper-side maximum ray 5a, a lower-side maximum ray 5b, and a chief ray 5c of rays 5 at a maximum image height are illustrated. Here, the term "upper-side" and the term "lower-side" refer to an upper direction and a lower direction, respectively, on the paper of FIG. 2. The lower-side maximum ray 5b illustrated in FIG. 2 is included, for example, in the aforementioned lower-side off-axial rays. The upper-side maximum ray 5a illustrated in FIG. 2 is included, for example, in upper-side off-axial rays.

As FIG. 1 shows, off-axial rays are away from optical axis Z in first lens group G1 through third lens group G3, and determine the effective diameter of these lens groups. Therefore, it is possible to suppress the lens diameter of magnification-side lens groups by reducing the divergence of off-axial rays.

It is desirable that the following conditional expression (1') is satisfied to improve the effect achievable by satisfying conditional expression (1). It is more desirable that the following conditional expression (1") is satisfied:

$$4.00 < fGe/fw < 11.00 \qquad (1'); \text{ and}$$

$$5.00 < fGe/fw < 10.00 \qquad (1'').$$

Last lens group Ge includes at least two positive lenses and at least two negative lenses. Last lens group Ge is configured in such a manner that a most reduction-side positive lens having positive refractive power is arranged closest to the reduction side in last lens group Ge.

For example, last lens group Ge in the example illustrated in FIG. 2 consists of six lenses of positive lens L51, negative lens L52, positive lens L53, positive lens L54, negative lens L55 and positive lens L56 arranged in this order from the magnification side. In the example illustrated in FIG. 2, the most reduction-side positive lens corresponds to lens L56.

Last lens group Ge includes at least two positive lenses. Therefore, it is possible to excellently correct aberrations while preventing the diameter of lenses in magnification-side lens groups from becoming large by reducing the divergence of axial rays and the divergence of lower-side off-axial rays.

Last lens group Ge includes at least two negative lenses. Therefore, it is possible to appropriately keep the refractive power of last lens group Ge even if the divergence of axial rays and the divergence of lower-side off-axial rays are reduced. Further, it is possible to excellently correct a longitudinal chromatic aberration and curvature of field.

When a positive lens is arranged closest to the reduction side in last lens group Ge, it is possible to prevent the diameter of lenses in magnification-side lens groups from becoming large by reducing the divergence of axial rays and the divergence of lower-side off-axial rays.

It is desirable that the most reduction-side positive lens arranged closest to the reduction side in last lens group Ge is a biconvex lens. In such a case, it is possible to more easily prevent the lens diameter of magnification-side lens groups from becoming large by reducing the divergence of axial rays and the divergence of lower-side off-axial rays.

Further, it is desirable that a second positive lens (corresponding to lens L54 in the example illustrated in FIG. 2) from the reduction side in last lens group Ge is also a biconvex lens. In such a case, it is possible to more easily prevent the diameter of lenses in magnification-side lens groups from becoming large by reducing the divergence of axial rays and the divergence of lower-side off-axial rays.

It is desirable that a negative lens with its concave surface facing the reduction side is arranged toward the magnification side of the most reduction-side positive lens in such a manner that a first air lens is formed between the negative lens and the most reduction-side positive lens. When this configuration is adopted, it is possible to excellently correct curvature of field and a spherical aberration while preventing the diameter of lenses closer to the magnification side than the negative lens forming the first air lens from becoming large.

Regarding the first air lens, it is desirable that the following conditional expression (2) is satisfied:

$$0.01 < d1/Hr1 < 0.15 \qquad (2),$$ where d1: a center thickness of the first air lens, and
Hr1: a maximum effective radius of the reduction-side surface of the first air lens.

In the example illustrated in FIG. 2, negative lens L55 with its concave surface facing the reduction side is arranged immediately toward the magnification side of lens L56, which is the most reduction-side positive lens, with a very small air space therebetween. A first air lens is formed by a reduction-side surface of lens L55 and a magnification-side surface of lens L56. In the example illustrated in FIG. 2, d1 is an air space on an optical axis between lens L55 and lens L56, and Hr1 is the maximum effective radius of the magnification-side surface of lens L56.

If the lower limit of conditional expression (2) is not satisfied, a space between two lenses (corresponding to lens L55 and lens L56 in the example illustrated in FIG. 2) forming the first air lens becomes too narrow, and production becomes difficult. If the upper limit of conditional expression (2) is not satisfied, the effect of correcting curvature of field and a spherical aberration becomes weak. When conditional expression (2) is satisfied, it is possible to achieve a lens system in which the effect of excellently correcting curvature of field and a spherical aberration is obtainable.

It is desirable that the following conditional expression (2') is satisfied to improve the effect of correcting curvature of field and a spherical aberration than the case of satisfying conditional expression (2). It is more desirable that the following conditional expression (2") is satisfied to further improve the effect:

$$0.01 < d1/Hr1 < 0.10 \qquad (2'); \text{ and}$$

$$0.01 < d1/Hr1 < 0.05 \qquad (2'').$$

Regarding the first air lens, it is desirable that the following conditional expression (3) is satisfied:

$$0.30 < RF1 \times (NdR1-1)/((RR1 \times (NdF1-1)) < 1.10 \qquad (3),$$ where

RF1: a curvature radius of a magnification-side surface of the first air lens,
RR1: a curvature radius of a reduction-side surface of the first air lens,
NdF1: a refractive index for d-line of the negative lens forming the first air lens, and
NdR1: a refractive index for d-line of the most reduction-side positive lens.

In the example illustrated in FIG. 2, RF1 is the curvature radius of the reduction-side surface of lens L55, and RR1 is the curvature radius of the magnification-side surface of lens L56. NdF1 is the refractive index for d-line of lens L55, and NdR1 is the refractive index for d-line of lens L56.

Conditional expression (3) defines a desirable range of a ratio of the refractive power of the magnification-side surface of the first air lens to the refractive power of the reduction-side surface of the first air lens. If conditional expression (3) is not satisfied, it becomes difficult to excellently correct curvature of field and a spherical aberration. When conditional expression (3) is satisfied, excellent correction of curvature of field and a spherical aberration becomes possible.

It is desirable that the following conditional expression (3') is satisfied to improve the effect achievable by satisfying conditional expression (3):

$$0.45 < RF1 \times (NdR1-1)/((RR1 \times (NdF1-1)) < 0.90 \qquad (3').$$

Regarding the positive refractive power of lenses closer to the reduction side in last lens group Ge, it is desirable that the following conditional expression (4) is satisfied:

$$1.50 < fp12/fw < 5.00 \qquad (4),$$ where fp12: a combined focal length of a second positive lens from the reduction side in the last lens group through the most reduction-side positive lens, and
fw: a focal length of an entire system at the wide-angle end when a projection distance is infinity.

In the example illustrated in FIG. 2, fp12 is a combined focal length of lenses L54, L55 and L56. If the lower limit of conditional expression (4) is not satisfied, it becomes difficult to excellently correct a spherical aberration, curvature of field and a longitudinal chromatic aberration. If the upper limit of conditional expression (4) is not satisfied, the diameter of lenses in the magnification-side lens groups becomes large. When conditional expression (4) is satisfied, it is possible to prevent the diameter of lenses in the magnification-side lens groups from becoming large by reducing the divergence of axial rays and the divergence of lower-side off-axial rays while excellently correcting a spherical aberration, curvature of field and a longitudinal chromatic aberration.

It is desirable that the following conditional expression (4') is satisfied to improve the effect achievable by satisfying conditional expression (4):

$$2.00 < fp12/fw < 4.00 \qquad (4').$$

Further, it is desirable that last lens group Ge includes, besides the most reduction-side positive lens, a positive lens with its convex surface facing the magnification side and a negative lens with its concave surface facing the reduction side arranged toward the magnification side of the positive lens in such a manner that a second air lens is formed between the negative lens and the positive lens. When this configuration is adopted, it is possible to excellently correct, especially, a spherical aberration and curvature of field.

Regarding the second air lens, it is desirable that the following conditional expression (5) is satisfied:

$$0.01 < d2/Hr2 < 0.15 \qquad (5),$$ where d2: a center thickness of the second air lens, and
Hr2: a maximum effective radius of a reduction-side surface of the second air lens.

In the example illustrated in FIG. 2, negative lens L52 with its concave surface facing the reduction side is arranged immediately toward the magnification side of positive lens L53 with its convex surface facing the magnification side with a very small air space therebetween. The second air lens is formed by the reduction-side surface of lens L52 and the magnification-side surface of lens L53. In the example illustrated in FIG. 2, d2 is an air space on an optical axis between lens L52 and lens L53, and Hr2 is the maximum effective radius of the magnification-side surface of lens L53.

If the lower limit of conditional expression (5) is not satisfied, a space between the two lenses (corresponding to lens L52 and lens L53 in the example illustrated in FIG. 2) forming the second air lens becomes too narrow, and production becomes difficult. If the upper limit of conditional expression (5) is not satisfied, the effect of correcting curvature of field and a spherical aberration becomes weak. When conditional expression (5) is satisfied, it is possible to achieve a lens system in which curvature of field and a spherical aberration are excellently corrected.

It is desirable that the following conditional expression (5') is satisfied to improve the effect of correcting curvature of field and a spherical aberration achievable by satisfying conditional expression (5):

$$0.01 < d2/Hr2 < 0.10 \quad (5').$$

Regarding the second air lens, it is desirable that the following conditional expression (6) is satisfied:

$$0.30 < RF2 \times (NdR2-1)/((RR2 \times (NdF2-1)) < 1.10 \quad (6), \text{ where}$$

RF2: a curvature radius of a magnification-side surface of the second air lens,

RR2: a curvature radius of a reduction-side surface of the second air lens,

NdF2: a refractive index for d-line of the negative lens forming the second air lens, and NdR2: a refractive index for d-line of the positive lens forming the second air lens.

In the example illustrated in FIG. 2, RF2 is the curvature radius of the reduction-side surface of lens L52, and RR2 is the curvature radius of the magnification-side surface of lens L53. NdF2 is the refractive index for d-line of lens L52, and NdR2 is the refractive index for d-line of lens L53.

Conditional expression (6) defines a desirable range of a ratio of the refractive power of the magnification-side surface of the second air lens to the refractive power of the reduction-side surface of the second air lens. If conditional expression (6) is not satisfied, it becomes difficult to excellently correct curvature of field and a spherical aberration. When conditional expression (6) is satisfied, excellent correction of curvature of field and a spherical aberration becomes possible.

It is desirable that the following conditional expression (6') is satisfied to improve the effect achievable by satisfying conditional expression (6):

$$0.45 < RF2 \times (NdR2-1)/((RR2 \times (NdF2-1)) < 0.90 \quad (6').$$

Further, it is desirable that a first negative lens (corresponding to lens L55 in the example illustrated in FIG. 2) from the reduction side in last lens group Ge is a meniscus lens with its convex surface facing the magnification side. If this negative lens is a biconcave lens, the negative refractive power of this lens becomes strong. Therefore, it becomes necessary to increase the refractive power of a positive lens or lenses in last lens group Ge. Consequently, the balance of aberrations is lost. Hence, it is desirable that this negative lens is a meniscus lens. Further, when this negative lens is a meniscus lens, it is desirable that this negative lens is a meniscus lens with its convex surface facing the magnification side to form the aforementioned air lens.

The configuration of last lens group Ge in the example illustrated in FIG. 2 will be described more in detail. Last lens group Ge consists of six lenses of lens L51, which is a biconvex lens, lens L52, which is a biconcave lens, lens L53, which is a biconvex lens, lens L54, which is a biconcave lens, lens L55, which is a negative meniscus lens with its concave surface facing the reduction side, and lens L56, which is a biconvex lens, in this order from the magnification side. However, the configuration of last lens group Ge may be modified in various manners, as in examples that will be described later. For example, lens L51 may be a positive meniscus lens. Further, lens L53 may also be a positive meniscus lens. Alternatively, last lens group Ge may consist of seven lenses of a positive meniscus lens, a biconcave lens, a biconvex lens, a biconvex lens, a negative meniscus lens, a negative meniscus lens and a biconvex lens arranged in this order from the magnification side.

In the zoom lens for projection according to an embodiment of the present invention, it is desirable that the following conditional expression (7) is satisfied:

$$2.50 < Bf/y < 4.50 \quad (7); \text{ where}$$

Bf: a reduction-side air-equivalent back focus of an entire system, and y: a reduction-side maximum image height.

If the lower limit of conditional expression (7) is not satisfied, it is not possible to secure an appropriate length of back focus, and there are a risk that the illumination optical system 102 and the zoom lens for projection interfere with each other, and a risk that the zoom lens for projection blocks illumination light output from the illumination optical system 102, and a risk that unwanted reflection light from a pixel of the DMD that has been switched to OFF enters the zoom lens for projection. If the upper limit of conditional expression (7) is not satisfied, the diameter of lenses closer to the reduction side in the zoom lens for projection becomes large. When conditional expression (7) is satisfied, it is possible to configure the zoom lens for projection in small size while securing an appropriate length of back focus and preventing interference between the zoom lens for projection and other members or optical paths.

It is desirable that the following conditional expression (7') is satisfied to improve the effect achievable by satisfying conditional expression (7):

$$3.00 < Bf/y < 4.00 \quad (7');$$

Further, it is desirable that the following conditional expression (8) is satisfied:

$$0.80 < y/fw \quad (8), \text{ where}$$

y: a reduction-side maximum image height, and fw: a focal length of an entire system at the wide-angle end when a projection distance is infinity.

If the lower limit of conditional expression (8) is not satisfied, it is impossible to widen an angle of view as requested. When conditional expression (8) is satisfied, it is possible to secure a requested wide angle of view.

It is more desirable that the following conditional expression (8') is satisfied to secure a wider angle of view. It is even more desirable that the lower limit of the following conditional expression (8") is satisfied. Here, if the upper limit of the following conditional expression (8") is not satisfied, the size of the lens system becomes large, and it becomes difficult to correct distortion. When conditional expression (8") is satisfied, it is possible to achieve a requested wide angle of view while preventing the size of the lens system from becoming large and excellently correcting distortion at the same time.

$$0.85 < y/fw \quad (8'); \text{ and}$$

$$0.90 < y/fw < 1.40 \quad (8").$$

The configuration of first lens group G1 is also important to widen an angle of view. It is desirable that first lens group G1 consists of front group G1F consisting of three lenses of first through third lenses in this order from the magnification side and rear group G1R in this order from the magnification side. Further, it is desirable that front group G1F includes at least one aspheric lens. When front group G1F includes an aspheric lens, it is possible to excellently correct distortion the generation amount of which increases as the angle of view is widened.

It is more desirable that a most magnification-side lens in front group G1F has an aspheric surface. When this configuration is adopted, it is possible to achieve an excellent aberration correction effect. Further, since the most magnification-side lens in front group G1F has a largest diameter in the entire system, it is desirable that the most magnification-side lens in front group G1F is made of plastic when an aspheric lens is adopted as this lens. In such a case, it is possible to reduce the weight of the lens.

For example, first lens group G1 in the example illustrated in FIG. 1 consists of five lenses of a lens having a negative meniscus shape, and a paraxial region of which has a concave surface facing the magnification side, a negative lens having a meniscus shape with its concave surface facing the reduction side, a negative lens having a meniscus shape with its concave surface facing the magnification side, a negative lens having a meniscus shape with its convex surface facing the magnification side, and a biconvex lens in this order form the magnification side. Further, the most magnification-side lens is an aspheric lens.

Regarding the refractive power of front group G1F, it is desirable that the following conditional expression (9) is satisfied:

$$-2.50 < fG1F/fw < -0.80 \quad (9), \text{ where}$$

fG1F: a focal length of the front group, and fw: a focal length of an entire system at the wide-angle end when a projection distance is infinity.

Conditional expression (9) defines a desirable range of the refractive power of front group G1F. If the lower limit of conditional expression (9) is not satisfied, the diameter of lenses in first lens group G1, especially, the diameter of lenses in front group G1F becomes large. Further, it becomes difficult to secure an appropriate length of back focus. If the upper limit of conditional expression (9) is not satisfied, excellent correction of curvature of field becomes difficult. When conditional expression (9) is satisfied, it is possible to secure an appropriate length of back focus, and to prevent the lens diameter from becoming large, and to excellently correct curvature of field.

It is desirable that the following conditional expression (9') is satisfied to improve the effect achievable by satisfying conditional expression (9). It is more desirable that the following conditional expression (9") is satisfied to further improve the effect:

$$-2.10 < fG1F/fw < -1.10 \quad (9'); \text{ and}$$

$$-2.10 < fG1F/fw < -1.30 \quad (9'').$$

Here, it is desirable that a lens or lenses only in rear group G1R move during focusing when a projection distance has changed. Since front group G1F, which includes a lens having a large diameter, is fixed during focusing, it is possible to reduce a load on a drive mechanism. Further, it is possible to keep the total length of the optical system constant even during focusing. Further, it is possible to reduce a change in rays entering an aspheric lens in front group G1F when the aspheric lens is included in front group G1F, and to suppress a fluctuation of aberrations caused by a change in projection distance.

When rear group G1R includes plural lenses, a part of the plural lenses may be moved during focusing. Alternatively, all of the lenses in rear group G1R may be moved. Further, the plural lenses may be moved in an integrated manner, or independently from each other. A lens or plural lenses used for focusing may be selected based on a variation amount of a projection distance.

Further, it is desirable that the following conditional expression (10) is satisfied:

$$4.00 < Dep/y < 6.00 \quad (10); \text{ where}$$

Dep: a length from a paraxial exit pupil position to a reduction-side image plane at a wide-angle end when the reduction side is regarded as an exit side, and y: a reduction-side maximum image height.

If the lower limit of conditional expression (10) is not satisfied, it becomes difficult to secure an appropriate length of back focus when it is tried to prevent the diameter of lenses closer to the magnification side in the zoom lens for projection from becoming large, and there are a risk that the illumination optical system 102 and the zoom lens for projection interfere with each other, and a risk that the zoom lens for projection blocks illumination light output from the illumination optical system 102, and a risk that unwanted reflection light from a pixel of the DMD that has been switched to OFF enters the zoom lens for projection. If the upper limit of conditional expression (10) is not satisfied, the reduction-side pupil position is located further closer to the magnification side, and the diameter of lenses closer to the reduction-side in the zoom lens for projection becomes large. When conditional expression (10) is satisfied, it is possible to configure the system in small size while preventing interference with other members and optical paths.

It is desirable that the following conditional expression (10') is satisfied to prevent the diameter of lenses closer to the reduction-side from becoming large more effectively than the case in which conditional expression (10) is satisfied:

$$4.00 < Dep/y < 5.00 \quad (10').$$

Further, it is desirable that the following conditional expression (12) is satisfied:

$$\phi GL - y \times 2 < 0 \quad (12), \text{ where}$$

φGL: an effective diameter of a most reduction-side surface in the last lens group, and y: a reduction-side maximum image height.

If the upper limit of conditional expression (12) is not satisfied, the diameter of lenses closer to the reduction side becomes large, and there are a risk that the illumination optical system 102 and the zoom lens for projection interfere with each other, and a risk that the zoom lens for projection blocks illumination light output from the illumination optical system 102, and a risk that unwanted reflection light from a pixel of the DMD that has been switched to OFF enters the zoom lens for projection. When conditional expression (12) is satisfied, it is possible to reduce the diameter of lenses closer to the reduction side in the zoom lens for projection, and to prevent interference with other members and optical paths.

It is desirable that the following conditional expression (12') is satisfied to reduce the size of lenses closer to reduction side more effectively than the case in which conditional expression (12) is satisfied:

$$\phi GL - y \times 2 < -0.20 \quad (12').$$

Further, regarding the material of negative lenses in last lens group Ge, it is desirable that the following conditional expression (13) is satisfied:

$$35.0 < vp < 60.0 \quad (13), \text{ where}$$

vp: an average of Abbe numbers for d-line of negative lenses in last lens group.

If the lower limit of conditional expression (13) is not satisfied, excellent correction of chromatic aberrations becomes difficult. If the upper limit of conditional expression (13) is not satisfied, a material having a low refractive index in the range of refractive indices of currently usable optical materials is used. Therefore, excellent correction of curvature of field becomes difficult. When conditional expression (13) is satisfied, excellent correction of chromatic aberrations and curvature of field becomes possible.

It is desirable that the following conditional expression (13') is satisfied to more excellently correct chromatic aberrations than the case in which conditional expression (13) is satisfied:

$$40.0 < vp < 60.0 \quad (13').$$

Further, it is desirable that the zoom lens for projection is configured in such a manner that an F-number is kept constant through the entire zoom range. In such a case, when a projection size is the same, projection with the same brightness is possible regardless of a zoom ratio.

Therefore, it is desirable that the zoom lens for projection according to an embodiment of the present invention satisfies the following conditional expression (14):

$$Hc/y \le 0.00 \quad (14), \text{ where}$$

Hc: the height of a chief ray at a maximum image height on a most magnification-side surface in the last lens group, and y: a reduction-side maximum image height.

Here, the signs of Hc and y are positive to denote a height upward from optical axis Z, and negative to denote a height downward from optical axis Z, and rays the sign of y of which is positive will be considered.

When the upper limit of conditional expression (14) is satisfied, it is possible to position an intersection of the chief ray at the maximum image height and optical axis Z in last lens group Ge. Therefore, it is possible to keep an F-number constant through the entire zoom range.

Further, it is desirable that the following conditional expression (14') is satisfied. If the lower limit of conditional expression (14') is not satisfied, the lens diameter of lens groups that move during magnification change and first lens group G1, which are located closer to the magnification side than last lens group Ge, becomes large. When conditional expression (14') is satisfied, it is possible to keep an F-number constant through the entire zoom range while preventing the size of the lens system from becoming large:

$$-0.50 < Hc/y \le 0.00 \quad (14').$$

As described above, it is desirable that the reduction-side pupil position is set closer to the reduction side in the zoom lens for projection according to the embodiment of the present invention. Therefore, rays tend to be closely condensed in last lens group Ge. Hence, it is desirable that last lens group Ge does not include any cemented lens. If last lens group Ge, in which rays are closely condensed, includes a cemented lens, the quality of a cementing agent may change remarkably and deteriorate by intense light when the zoom lens for projection is used together with a high output light source, and there is a risk that the performance of the lens deteriorates. When all lenses in last lens group Ge are single lenses, it is possible to eliminate such a matter of concern.

Here, in a cross section of rays condensing at an arbitrary point on a reduction-side image plane, it is desirable that an angle formed by a bisector of an upper-side maximum ray and a lower-side maximum ray of each of the rays and a chief ray of each of the rays is within ±3° to make illumination light enter the zoom lens for projection by suppressing a loss of the illumination light.

Further, in a zoom lens for projection, as a target of the present invention, it is desirable that distortion is suppressed to about 2% or less through the entire zoom range.

Here, the desirable configuration, as described above, may be combined in an arbitrary manner. It is desirable that the configuration is optionally adopted in an appropriate manner based on what is requested in a zoom lens for projection.

Next, specific examples of the zoom lens for projection of the present invention will be described.

Example 1

Figure 4:
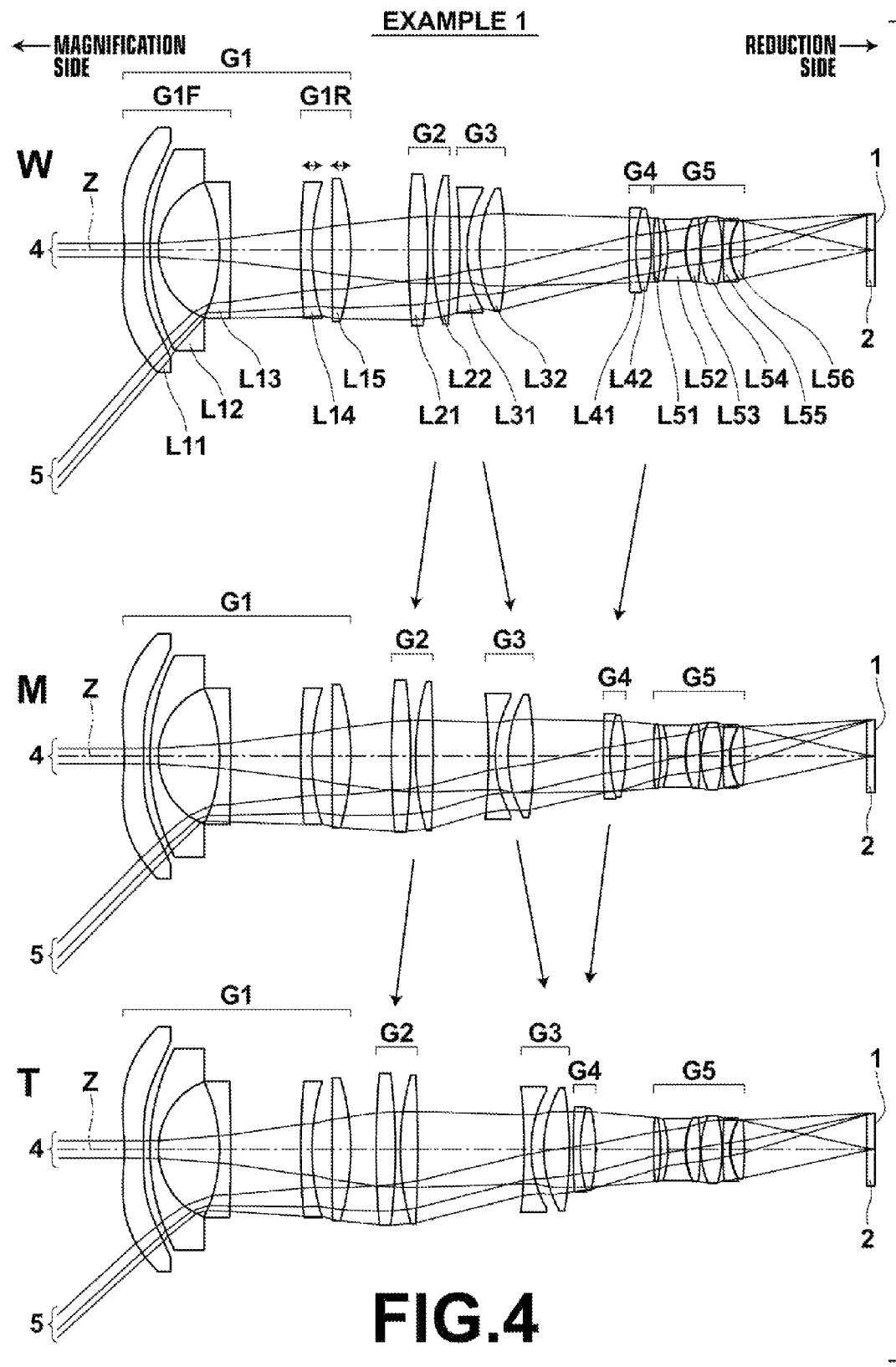
FIG. 4 is a cross section illustrating the lens configuration of a zoom lens for projection in Example 1 of the present invention and paths of rays.

FIG. 4 is a diagram illustrating a cross section of the zoom lens for projection in Example 1 and paths of rays. In FIG. 4, the arrangement and configuration of each lens group at a wide-angle end, a middle focal length state and a telephoto end is illustrated in a top row, a middle row and a bottom row, respectively, to which signs W, M and T are given on the left side of FIG. 4. Further, in FIG. 4, axial rays 4, rays 5 at a maximum image height, a parallel-flat-plate-shaped optical member 2, which is assumed to be various filters, a cover glass or the like, and an image display surface 1 of a light valve located on a reduction-side surface of the optical member 2 are also illustrated. Further, arrows schematically indicating the directions of movement of each lens group when magnification is changed from a wide-angle end to a middle focal length state, and from the middle focal length state to a telephoto end are also illustrated between the top row and the middle row, and between the middle row and the bottom row, respectively. FIG. 4 illustrates the configuration when a projection distance is infinity.

The group configuration of the zoom lens for projection in Example 1 is a five-group lens configured by arranging first lens group G1 having negative refractive power, second lens group G2 having positive refractive power, third lens group G3 having negative refractive power, fourth lens group G4 having positive refractive power and fifth lens group G5 having positive refractive power in this order from the magnification side. The zoom lens for projection is configured in such a manner that first lens group G1 and fifth lens group G5 are fixed, and second lens group G2 through fourth lens group G4 move in the direction of an optical axis, and second lens group G2 and fourth lens group G4 of them move from the reduction side toward the magnification side during magnification change from a wide-angle end to a telephoto end. Further, the reduction side is non-telecentric.

Each lens group of the zoom lens for projection in Example 1 is schematically configured in the following manner. First lens group G1 consists of five lenses of lenses L11 through L15 in this order from the magnification side. Lenses L11 through L13 constitute front group G1F and lenses L14 and L15 constitute rear group G1R. As a focusing method, focusing is performed by moving, in the direction of the optical axis, lenses L14 and L15 independently from each other, as schematically illustrated by arrows above lenses L14 and L15.

Second lens group G2 consists of two lenses of lenses L21 and L22 in this order from the magnification side. Third lens group G3 consists of two lenses of lenses L31 and L32 in this order from the magnification side. Fourth lens group G4 consists of two lenses of lenses L41 and L42 in this order from the magnification side. Fifth lens group G5 consists of six lenses of lenses L51 through L56 in this order from the magnification side.

In the zoom lens for projection in Example 1, lens L41 and lens L42 are cemented together, and the other lenses are single lenses, which are not cemented. Further, in the zoom lens for projection in Example 1, lens L11 is a plastic lens, and both surfaces of lens L11 are aspherical, and both surfaces of the other lenses are spherical.

As numerical value data representing the detailed configuration of the zoom lens for projection in Example 1, Table 1 shows basic lens data, and Table 2 shows aspherical coefficients, and Table 3 shows specification for d-line and values of variable surface distances. The numerical values shown in Table 1 through Table 3 are values that have been normalized so that the focal length of an entire system at a wide-angle end when a projection distance is infinity is 1, and rounded at predetermined digits.

In Table 1, column Si shows the surface number of the i-th surface (i=1, 2, 3, . . . ) when the magnification-side surface of the most magnification-side composition element is the first surface, and surface numbers are assigned to surfaces of composition elements to sequentially increase toward the reduction side. Column Ri shows the curvature radius of the i-th surface, and column Di shows a distance between the i-th surface and the (i+1)th surface on optical axis Z. Column Ndj shows the refractive index of the j-th composition element (j=1, 2, 3, . . . ) for d-line (wavelength is 587.6 nm) when the most magnification-side composition element is the first composition element, and the number of j sequentially increases toward the reduction side. The column vdj shows the Abbe number of the j-th composition element for d-line.

Here, the sign of a curvature radius is positive when a surface shape is convex toward the magnification side, and negative when a surface shape is convex toward the reduction side. The basic lens data show data including the optical member 2. Mark * is attached to the surface numbers of aspheric surfaces. The column of curvature radius shows the numerical values of paraxial curvature radii for aspheric surfaces.

Table 2 shows aspherical coefficients of each aspheric surface in Example 1. In the numerical values of the aspherical coefficients in Table 2, "E–n" (n: integer) means "×10$^{-n}$". The aspherical coefficients are values of coefficients KA, Am (m=3, 4, 5, . . . ) in an aspheric surface equation represented by the following expression:

$$Zd = C \cdot h^2 / \{1+(1-KA \cdot C^2 \cdot h^2)^{1/2}\} + \Sigma Am \cdot h^m, \text{ where}$$

Zd: the depth of an aspheric surface (the length of a perpendicular from a point on the aspheric surface at height h to a flat plane that contacts with the vertex of the aspheric surface and is perpendicular to the optical axis), h: a height (the length from the optical axis to the lens surface), C: a paraxial curvature, and KA, Am: aspherical coefficients (m=3, 4, 5, . . . ).

DD[i] written in column Di of Table 1 indicates that a distance between the i-th surface and the (i+1)th surface is a variable surface distance. In Example, 1, a distance between first lens group G1 and second lens group G2, a distance between second lens group G2 and third lens group G3, a distance between third lens group G3 and fourth lens group G4, and a distance between fourth lens group G4 and fifth lens group G5 are variable surface distances that change during magnification change, and correspond to DD[10], DD[14], DD[18] and DD[21] in Table 1, respectively. Further, in Example 1, a distance between front group G1F and rear group G1R, a distance between lens L14 and lens L15, and a distance between rear group G1R and second lens group G2 are variable surface distances that change during focusing, and correspond to DD[6], DD[8] and DD[10] in Table 1, respectively.

The upper part of Table 3 shows zoom ratios, focal length f′ of an entire system, F-number FNo., full angle 2ω of view (the unit is degrees), and values of the aforementioned variable surface distances at a wide-angle end, a middle focal length state and a telephoto end when a projection distance of the zoom lens for projection in Example 1 is infinity.

The lower part of Table 3 shows zoom ratios, focal length f′ of an entire system, F-number FNo., full angle 2ω of view (the unit is degrees), and values of DD[6], DD[8] and DD[10] of the variable surface distances at a wide-angle end, a middle focal length state and a telephoto end when a projection distance of the zoom lens for projection in Example 1 is a reference distance and a closest distance. In Example 1, the reference projection distance is 119.28, and the closest projection distance is 58.66. Here, the term "projection distance" refers to a length from the most magnification-side surface of the zoom lens for projection to a projection surface (screen). The values of DD[14], DD[18] and DD[21] at each of a wide-angle end, a middle focal length state and a telephoto end when a projection distance is a reference distance and a closest distance are the same as the values shown in the upper part of Table 3. Therefore, these values are omitted in the lower part of Table 3.

TABLE 1

| Si | Ri | Di | Ndj | vdj |
|---|---|---|---|---|
| *1 | −6.2339 | 0.6111 | 1.49100 | 57.58 |
| *2 | −36.6200 | 0.2121 | | |
| 3 | 6.4630 | 0.2618 | 1.71300 | 53.87 |
| 4 | 2.1936 | 1.9428 | | |
| 5 | −4.5949 | 0.3492 | 1.77250 | 49.60 |
| 6 | −82.0382 | DD[6] | | |
| 7 | 22.6692 | 0.3491 | 1.80100 | 34.97 |
| 8 | 6.7254 | DD[8] | | |
| 9 | 189.8556 | 0.5931 | 1.51633 | 64.14 |
| 10 | −7.3481 | DD[10] | | |
| 11 | 25.0172 | 0.6111 | 1.71736 | 29.52 |
| 12 | −17.4883 | 0.1587 | | |
| 13 | 7.9470 | 0.5454 | 1.51742 | 52.43 |
| 14 | −45.2934 | DD[14] | | |
| 15 | −18.3154 | 0.2182 | 1.61800 | 63.33 |
| 16 | 3.5197 | 0.4066 | | |
| 17 | 3.8078 | 0.8087 | 1.51742 | 52.43 |
| 18 | −11.5501 | DD[18] | | |
| 19 | 25.6792 | 0.2182 | 1.80100 | 34.97 |
| 20 | 4.4693 | 0.4889 | 1.48749 | 70.23 |
| 21 | −4.9179 | DD[21] | | |
| 22 | 12.2360 | 0.2209 | 1.51633 | 64.14 |
| 23 | −5.7097 | 0.2350 | | |
| 24 | −3.0566 | 0.5477 | 1.77250 | 49.60 |
| 25 | 2.1103 | 0.0261 | | |
| 26 | 2.2745 | 0.4421 | 1.48749 | 70.23 |
| 27 | −10.5175 | 0.0261 | | |
| 28 | 2.3680 | 0.6755 | 1.51633 | 64.14 |
| 29 | −3.6725 | 0.0261 | | |
| 30 | 14.5344 | 0.2181 | 1.80400 | 46.57 |
| 31 | 1.6427 | 0.0261 | | |
| 32 | 1.7388 | 0.4307 | 1.58913 | 61.14 |
| 33 | −8.7293 | 3.8807 | | |
| 34 | ∞ | 0.2619 | 1.50847 | 61.19 |
| 35 | ∞ | | | |

TABLE 2

| SURFACE NUMBER | 1 | 2 |
|---|---|---|
| KA | 8.00000E−01 | −2.79783E+00 |
| A3 | 2.35617E−02 | 2.79988E−02 |
| A4 | 2.62012E−02 | 1.33531E−02 |
| A5 | −9.44838E−03 | −1.82872E−03 |
| A6 | 6.15118E−04 | −8.20912E−04 |
| A7 | 2.21754E−04 | −1.14104E−04 |
| A8 | −1.35923E−05 | 1.08794E−05 |
| A9 | −4.90001E−06 | 9.48372E−06 |
| A10 | −3.56069E−08 | 1.43417E−06 |
| A11 | 5.47945E−08 | 2.43244E−07 |
| A12 | 3.60075E−09 | −1.51690E−07 |

TABLE 3

| | PROJECTION DISTANCE = ∞ | | |
|---|---|---|---|
| | WIDE-ANGLE END | MIDDLE | TELEPHOTO END |
| ZOOM RATIO | 1.000 | 1.118 | 1.250 |
| f′ | 1.000 | 1.118 | 1.250 |
| FNo. | 2.40 | 2.40 | 2.40 |
| 2ω[°] | 96.0 | 89.0 | 82.6 |
| DD[6] | 2.2260 | 2.2260 | 2.2260 |
| DD[8] | 0.6373 | 0.6373 | 0.6373 |
| DD[10] | 1.8290 | 1.2872 | 0.8021 |
| DD[14] | 0.3153 | 1.7598 | 3.3802 |
| DD[18] | 3.9209 | 2.2060 | 0.1264 |
| DD[21] | 0.0711 | 0.8833 | 1.8275 |

| | PROJECTION DISTANCE = 119.28 | | | PROJECTION DISTANCE = 58.66 | | |
|---|---|---|---|---|---|---|
| | WIDE-ANGLE END | MIDDLE | TELEPHOTO END | WIDE-ANGLE END | MIDDLE | TELEPHOTO END |
| ZOOM RATIO | 1.000 | 1.118 | 1.250 | 1.000 | 1.118 | 1.250 |
| f′ | 1.001 | 1.119 | 1.251 | 1.002 | 1.121 | 1.254 |
| FNo. | 2.40 | 2.40 | 2.40 | 2.40 | 2.40 | 2.40 |
| 2ω[°] | 95.8 | 88.8 | 82.4 | 95.6 | 88.6 | 82.0 |
| DD[6] | 2.1973 | 2.1973 | 2.1973 | 2.0793 | 2.0793 | 2.0793 |
| DD[8] | 0.6620 | 0.6620 | 0.6620 | 0.6935 | 0.6935 | 0.6935 |
| DD[10] | 1.8330 | 1.2912 | 0.8061 | 1.9194 | 1.3776 | 0.8926 |

Figure 18:
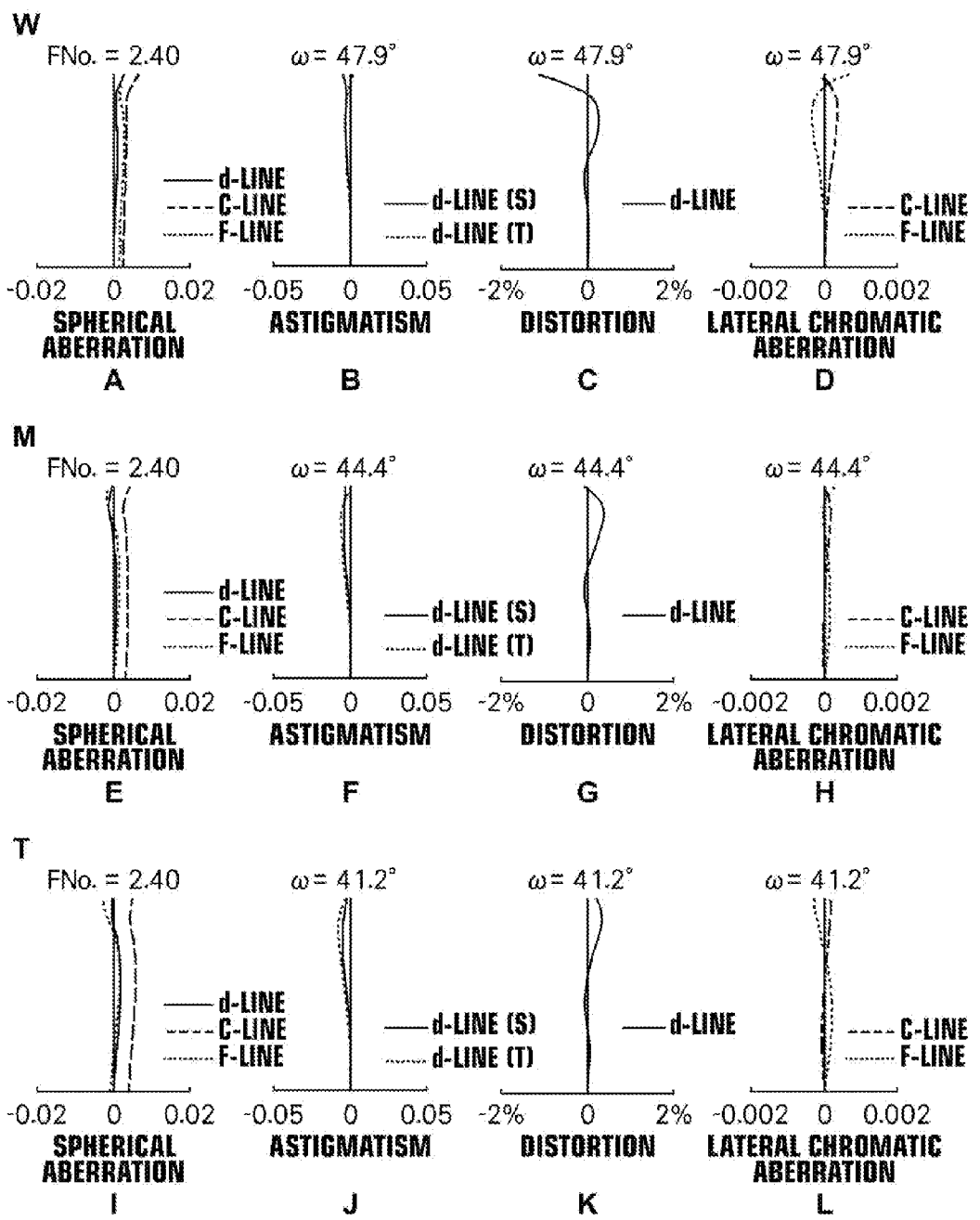
FIG. 18, Sections A through L are aberration diagrams of the zoom lens for projection in Example 1 of the present invention when a projection distance is a reference distance.

FIG. 18, Sections A through L are aberration diagrams of the zoom lens for projection in Example 1 when a projection distance is a reference distance (119.28). FIG. 18, Sections A through D are diagrams illustrating a spherical aberration, astigmatism, distortion and a lateral chromatic aberration, respectively, at a wide-angle end. FIG. 18, Sections E through H are diagrams illustrating a spherical aberration, astigmatism, distortion and a lateral chromatic aberration, respectively, at a middle focal length state. FIG. 18, Sections I through L are diagrams illustrating a spherical aberration, astigmatism, distortion and a lateral chromatic aberration, respectively, at a telephoto end.

FIG. 19, Sections A through L are aberration diagrams of the zoom lens for projection in Example 1 when a projection distance is a closest distance (58.66). FIG. 19, Sections A through D are diagrams illustrating a spherical aberration, astigmatism, distortion and a lateral chromatic aberration, respectively, at a wide-angle end. FIG. 19, Sections E through H are diagrams illustrating a spherical aberration, astigmatism, distortion and a lateral chromatic aberration, respectively, at a middle focal length state. FIG. 19, Sections I through L are diagrams illustrating a spherical aberration, astigmatism, distortion and a lateral chromatic aberration, respectively, at a telephoto end.

Each of the aberration diagrams in FIG. 18, Sections A through L and FIG. 19, Sections A through L is based on d-line. The diagrams of the spherical aberration illustrate aberrations also for F-line (wavelength is 486.1 nm) and C-line (wavelength is 656.3 nm). The diagrams of the lateral chromatic aberration illustrate aberrations for F-line and C-line. In the diagrams of the astigmatism, aberrations for the sagittal direction are indicated by solid lines, and aberrations for the tangential direction are indicated by broken lines. The signs of (S) and (T) are written in the explanation of the line types. In the diagrams of the spherical aberration, FNo. represents an F-number. In the other aberration diagrams, w represents a half angle of view. The aberration diagrams in FIG. 18, Sections A through L and FIG. 19, Sections A through L illustrate aberrations that have been normalized so that the focal length of an entire system at a wide-angle end when a projection distance is infinity is 1.

The signs, meanings and description methods of various data, and the feature that values are normalized so that the focal length of the entire system at a wide angle end when a projection distance is infinity is 1, which have been described in the explanation of Example 1, are similar also in the following examples, unless otherwise mentioned specifically.

Example 2

Figure 5:
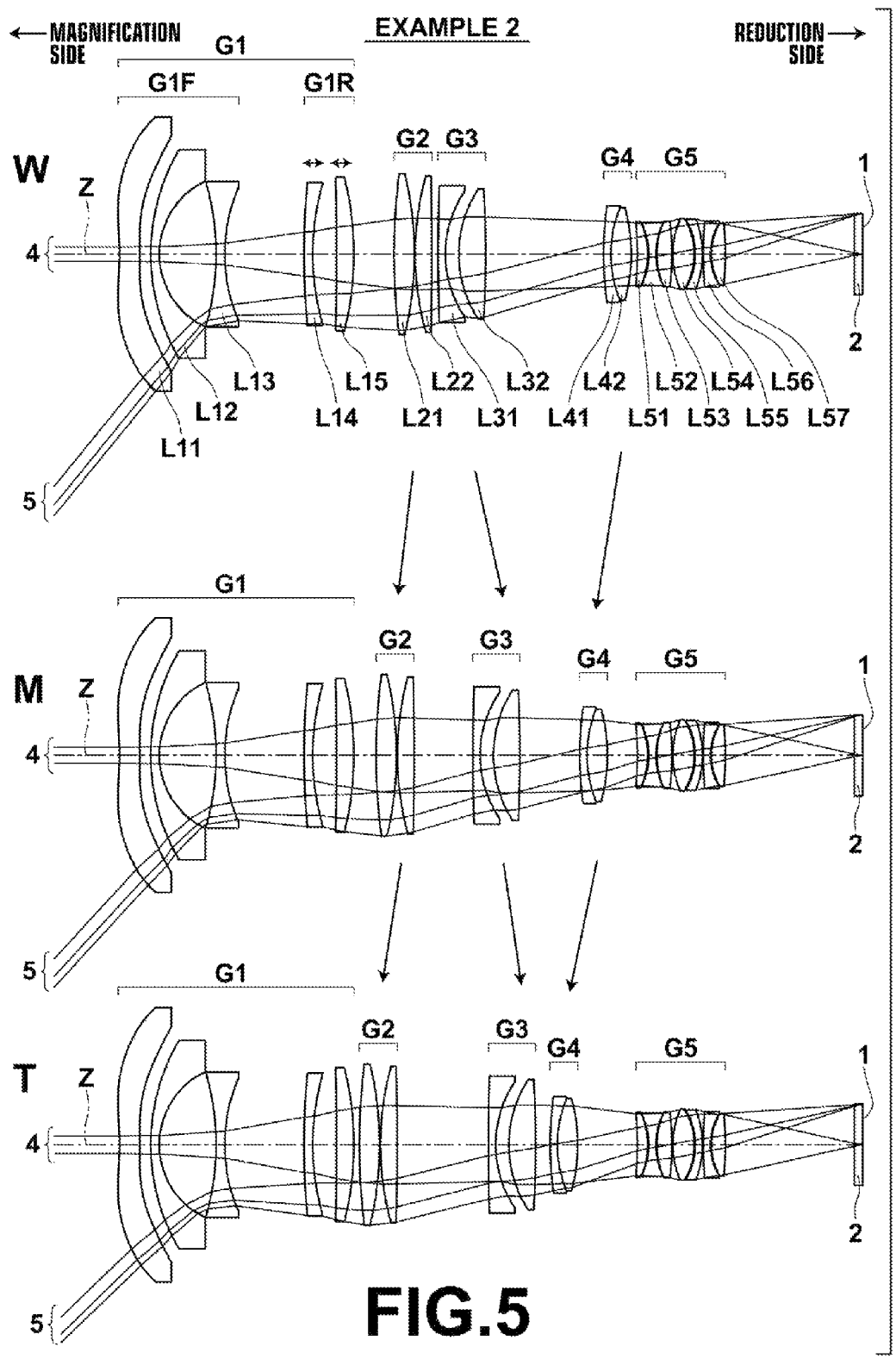
FIG. 5 is a cross section illustrating the lens configuration of a zoom lens for projection in Example 2 of the present invention and paths of rays.
Figure 20:
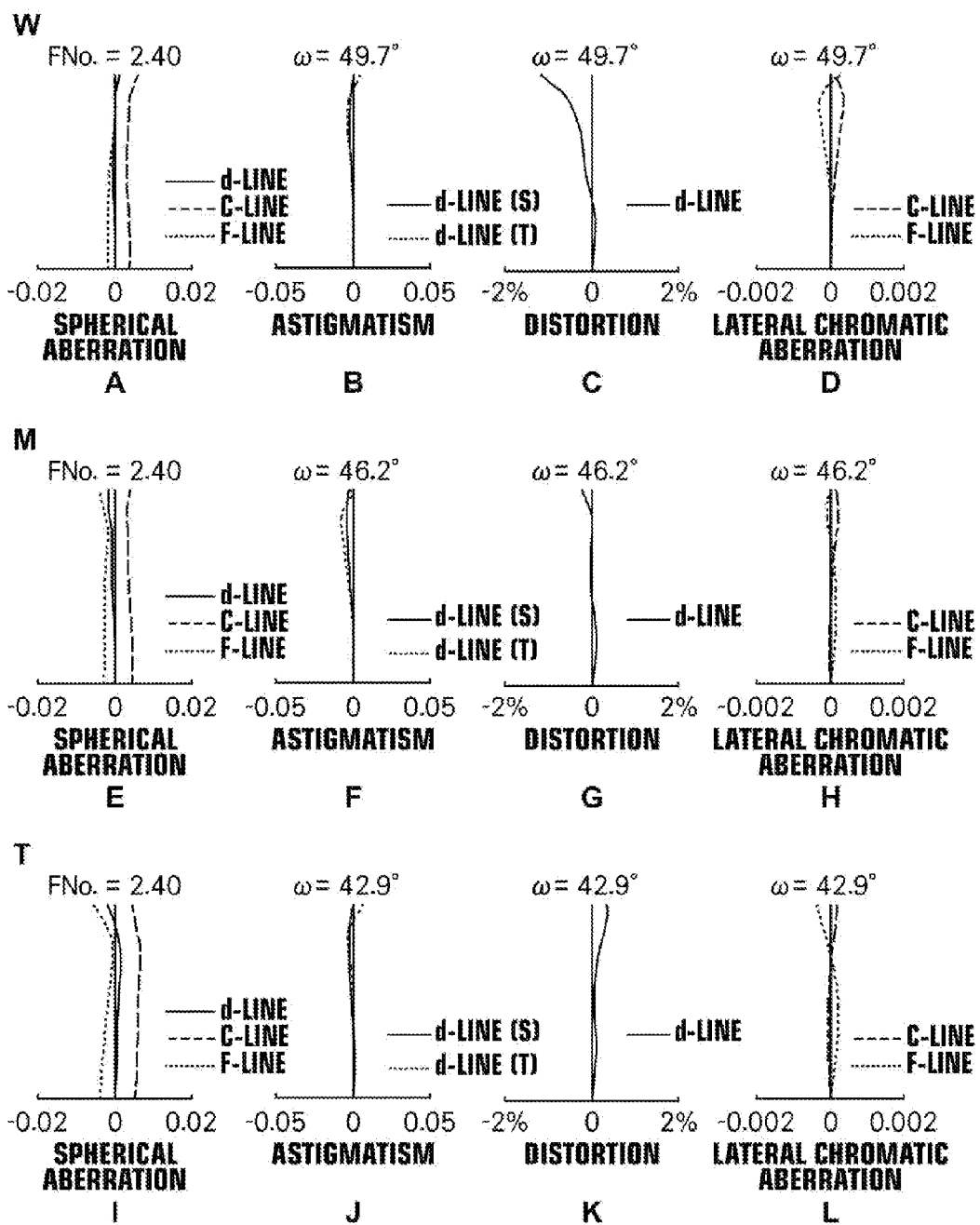
FIG. 20, Sections A through L are aberration diagrams of the zoom lens for projection in Example 2 of the present invention when a projection distance is a reference distance.

FIG. 5 is a diagram illustrating a cross section of the zoom lens for projection in Example 2 and paths of rays. In the zoom lens for projection of Example 2, the group configuration, the schematic configuration of each lens group, and a focusing method are almost similar to the zoom lens for projection in Example 1. The zoom lens for projection in Example 2 differs from Example 1 in that fifth lens group G5 consists of seven lenses of L51 through L57. Table 4, Table 5 and Table 6 show basic lens data of the zoom lens for projection in Example 2, aspherical coefficients, and specification for d-line and values of variable surface distances, respectively. FIG. 20, Sections A through L and FIG. 21, Sections A through L are aberration diagrams of the zoom lens for projection in Example 2. In Example 2, a reference projection distance is 119.17, and a closest projection distance is 58.61.

TABLE 4

| Si | Ri | Di | Ndj | νdj |
|---|---|---|---|---|
| *1 | −6.2285 | 0.6105 | 1.49100 | 57.58 |
| *2 | −36.5884 | 0.3341 | | |
| 3 | 5.8197 | 0.2617 | 1.63854 | 55.38 |
| 4 | 2.3080 | 1.7186 | | |
| 5 | −7.2994 | 0.2616 | 1.77250 | 49.60 |
| 6 | 4.6920 | DD[6] | | |
| 7 | 22.5769 | 0.2616 | 1.62299 | 58.16 |
| 8 | 7.2057 | DD[8] | | |
| 9 | −112.5256 | 0.5236 | 1.51633 | 64.14 |
| 10 | −8.8009 | DD[10] | | |
| 11 | 17.9259 | 0.6134 | 1.62588 | 35.70 |
| 12 | −9.6007 | 0.0261 | | |
| 13 | 8.3609 | 0.5012 | 1.48749 | 70.23 |
| 14 | −108.0512 | DD[14] | | |
| 15 | 58.8898 | 0.2180 | 1.61800 | 63.33 |
| 16 | 3.1581 | 0.4063 | | |
| 17 | 3.3678 | 0.8047 | 1.51742 | 52.43 |
| 18 | −35.3042 | DD[18] | | |
| 19 | 9.8168 | 0.2180 | 1.80100 | 34.97 |

TABLE 4-continued

| Si | Ri | Di | Ndj | νdj |
|---|---|---|---|---|
| 20 | 3.4143 | 0.6138 | 1.48749 | 70.23 |
| 21 | −5.0181 | DD[21] | | |
| 22 | −11.9019 | 0.3201 | 1.51633 | 64.14 |
| 23 | −2.0776 | 0.0262 | | |
| 24 | −1.9449 | 0.2180 | 1.77250 | 49.60 |
| 25 | 2.0376 | 0.0262 | | |
| 26 | 2.2912 | 0.4550 | 1.48749 | 70.23 |
| 27 | −8.2452 | 0.0263 | | |
| 28 | 2.4063 | 0.6526 | 1.48749 | 70.23 |
| 29 | −1.9244 | 0.0261 | | |

TABLE 4-continued

| Si | Ri | Di | Ndj | νdj |
|---|---|---|---|---|
| 30 | −1.9502 | 0.2186 | 1.62299 | 58.16 |
| 31 | −2.6782 | 0.0261 | | |
| 32 | 11.4965 | 0.2180 | 1.80100 | 34.97 |
| 33 | 1.6709 | 0.0263 | | |
| 34 | 1.7723 | 0.4215 | 1.60342 | 38.03 |
| 35 | −8.7356 | 3.9044 | | |
| 36 | ∞ | 0.2617 | 1.50847 | 61.19 |
| 37 | ∞ | | | |

TABLE 5

| SURFACE NUMBER | 1 | 2 |
|---|---|---|
| KA | 8.00000E−01 | −2.79783E+00 |
| A3 | 2.46352E−02 | 2.93307E−02 |
| A4 | 2.36638E−02 | 1.20415E−02 |
| A5 | −9.27590E−03 | −2.23278E−03 |
| A6 | 6.51962E−04 | −7.70996E−04 |
| A7 | 2.36779E−04 | −5.46235E−05 |
| A8 | −1.90717E−05 | 1.70744E−05 |
| A9 | −5.89742E−06 | 9.17279E−06 |
| A10 | −4.66676E−09 | 6.25753E−07 |
| A11 | 8.20958E−08 | 2.44572E−07 |
| A12 | 1.66618E−08 | −1.41120E−07 |

TABLE 6

| PROJECTION DISTANCE = ∞ | | | |
|---|---|---|---|
| | WIDE-ANGLE END | MIDDLE | TELEPHOTO END |
| ZOOM RATIO | 1.000 | 1.118 | 1.250 |
| f' | 1.000 | 1.118 | 1.250 |
| FNo. | 2.40 | 2.40 | 2.40 |
| 2ω[°] | 99.4 | 92.6 | 86.0 |
| DD[6] | 2.4013 | 2.4013 | 2.4013 |
| DD[8] | 0.7188 | 0.7188 | 0.7188 |
| DD[10] | 1.2162 | 0.6767 | 0.1649 |
| DD[14] | 0.1934 | 1.7811 | 2.7640 |
| DD[18] | 3.5789 | 1.8096 | 0.4438 |
| DD[21] | 0.1860 | 0.9071 | 1.8018 |

| | PROJECTION DISTANCE = 119.17 | | | PROJECTION DISTANCE = 58.61 | | |
|---|---|---|---|---|---|---|
| | WIDE-ANGLE END | MIDDLE | TELEPHOTO END | WIDE-ANGLE END | MIDDLE | TELEPHOTO END |
| ZOOM RATIO | 1.000 | 1.118 | 1.250 | 1.000 | 1.118 | 1.250 |
| f' | 1.000 | 1.119 | 1.251 | 1.002 | 1.120 | 1.253 |
| FNo. | 2.40 | 2.40 | 2.40 | 2.40 | 2.40 | 2.40 |
| 2ω[°] | 99.4 | 92.4 | 85.8 | 99.2 | 92.2 | 85.4 |
| DD[6] | 2.3652 | 2.3652 | 2.3652 | 2.2384 | 2.2384 | 2.2384 |
| DD[8] | 0.7494 | 0.7494 | 0.7494 | 0.7927 | 0.7927 | 0.7927 |
| DD[10] | 1.2217 | 0.6822 | 0.1704 | 1.3052 | 0.7656 | 0.2539 |

Example 3

Figure 6:
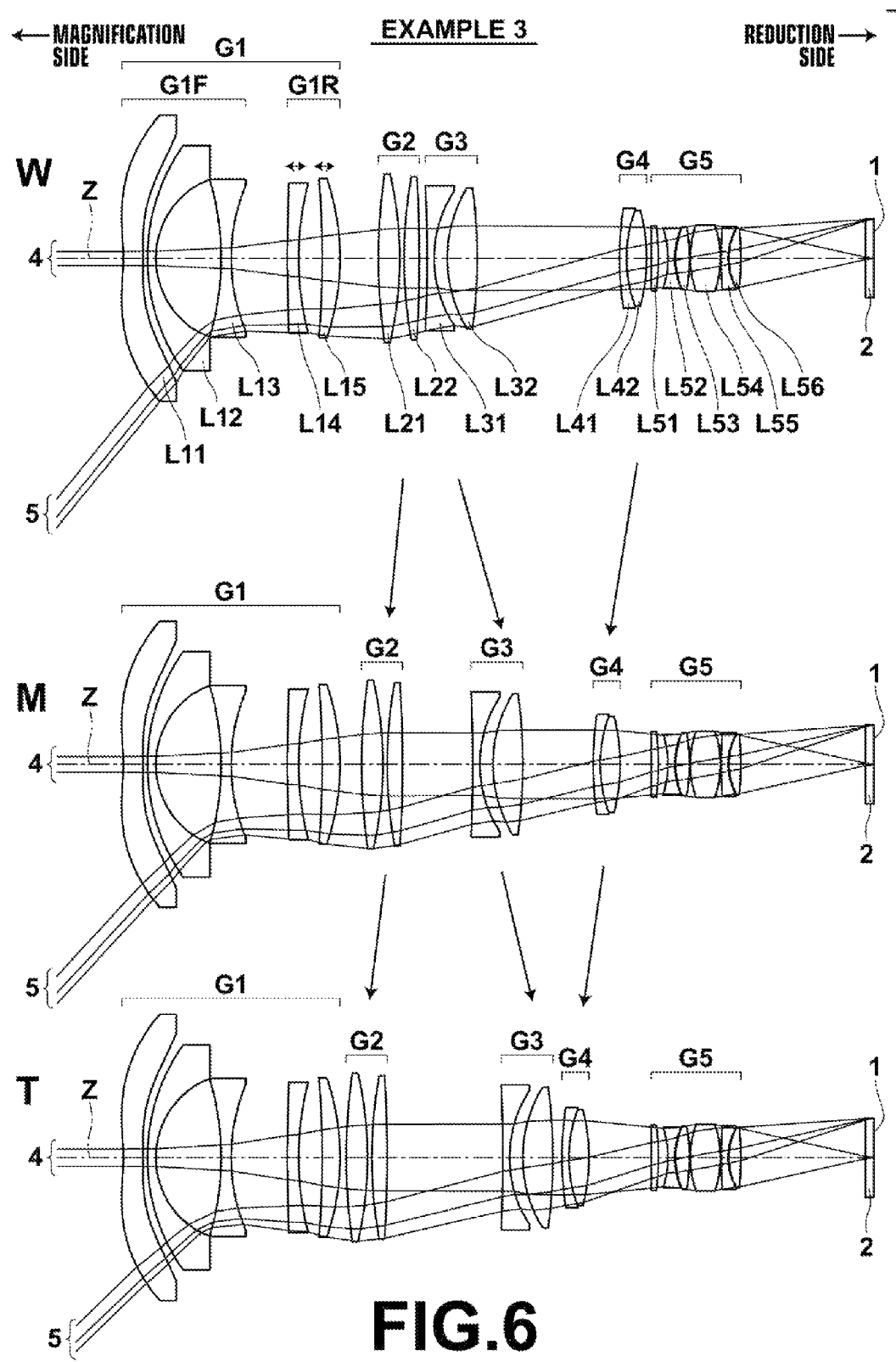
FIG. 6 is a cross section illustrating the lens configuration of a zoom lens for projection in Example 3 of the present invention and paths of rays.
Figure 23:
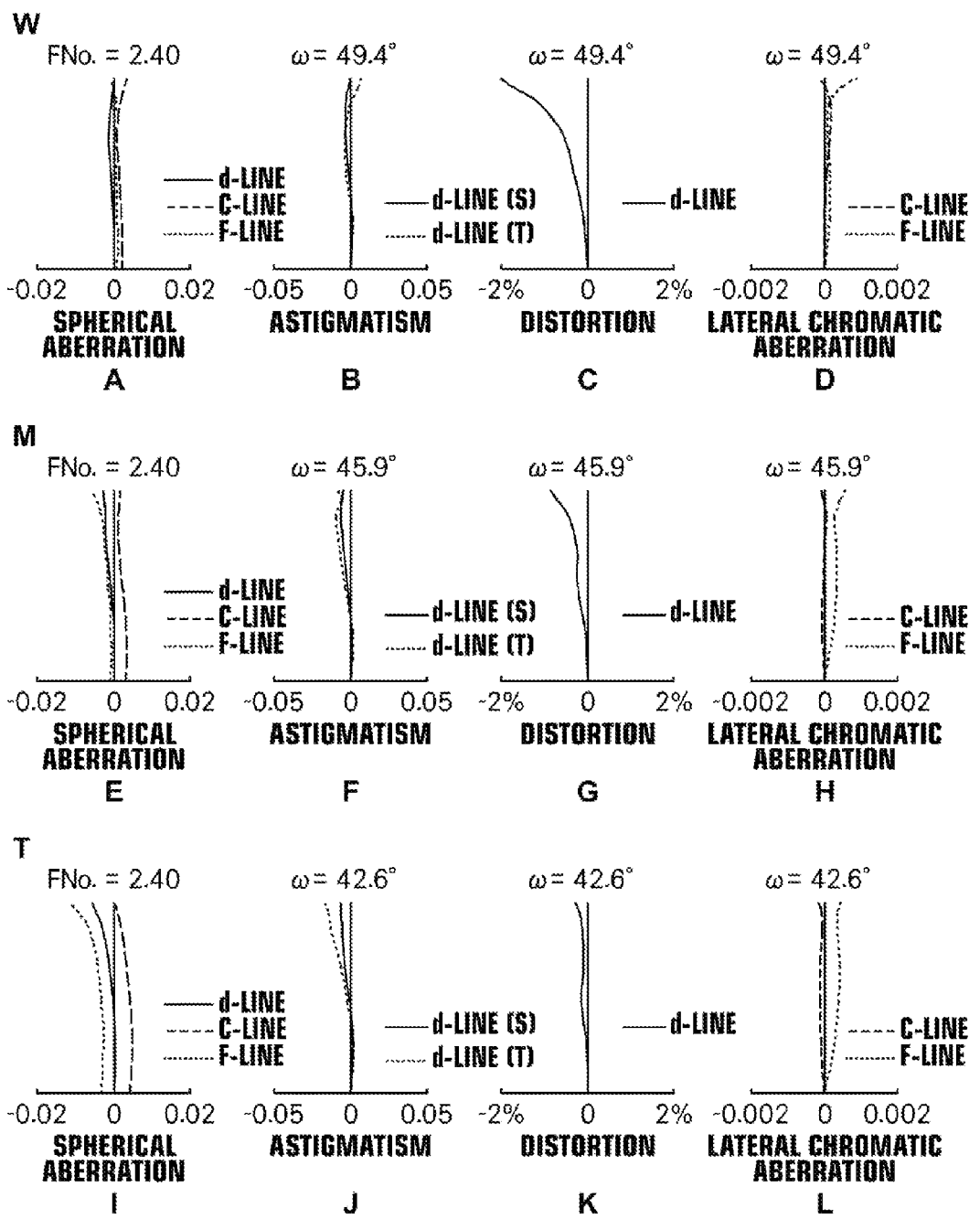
FIG. 23, Sections A through L are aberration diagrams of the zoom lens for projection in Example 3 of the present invention when a projection distance is a closest distance.

FIG. 6 is a diagram illustrating a cross section of the zoom lens for projection in Example 3 and paths of rays. In the zoom lens for projection of Example 3, the group configuration, the schematic configuration of each lens group, and a focusing method are almost similar to the zoom lens for projection in Example 1. Table 7, Table 8 and Table 9 show basic lens data of the zoom lens for projection in Example 3, aspherical coefficients, and specification for d-line and values of variable surface distances, respectively. FIG. 22, Sections A through L and FIG. 23, Sections A through L are aberration diagrams of the zoom lens for projection in Example 3. In Example 3, a reference projection distance is 119.12, and a closest projection distance is 58.59.

TABLE 7

| Si | Ri | Di | Ndj | vdj |
|---|---|---|---|---|
| *1 | −6.2259 | 0.6103 | 1.49100 | 57.58 |
| *2 | −36.5729 | 0.1432 | | |
| 3 | 5.6820 | 0.2615 | 1.63854 | 55.38 |
| 4 | 2.4975 | 2.0323 | | |
| 5 | −7.9538 | 0.3109 | 1.77250 | 49.60 |
| 6 | 5.4817 | DD[6] | | |
| 7 | 54.6300 | 0.3487 | 1.62299 | 58.16 |
| 8 | 8.6925 | DD[8] | | |
| 9 | −27.9624 | 0.5528 | 1.51633 | 64.14 |
| 10 | −7.1216 | DD[10] | | |
| 11 | 16.8686 | 0.6588 | 1.62588 | 35.70 |
| 12 | −10.8668 | 0.1348 | | |
| 13 | 13.1168 | 0.4746 | 1.48749 | 70.23 |
| 14 | −38.7199 | DD[14] | | |
| 15 | −40.9562 | 0.2179 | 1.61800 | 63.33 |
| 16 | 3.5805 | 0.4061 | | |
| 17 | 3.8837 | 0.9331 | 1.51742 | 52.43 |

TABLE 7-continued

| Si | Ri | Di | Ndj | vdj |
|---|---|---|---|---|
| 18 | −15.7545 | DD[18] | | |
| 19 | 9.6326 | 0.2178 | 1.80100 | 34.97 |
| 20 | 3.9908 | 0.6198 | 1.48749 | 70.23 |
| 21 | −5.5024 | DD[21] | | |
| 22 | −61.7265 | 0.2179 | 1.51633 | 64.14 |
| 23 | −7.8192 | 0.3004 | | |
| 24 | −2.7176 | 0.2179 | 1.77250 | 49.60 |
| 25 | 2.2420 | 0.0261 | | |
| 26 | 2.3859 | 0.4259 | 1.48749 | 70.23 |
| 27 | −5.2299 | 0.0261 | | |
| 28 | 2.8413 | 0.9282 | 1.51633 | 64.14 |
| 29 | −3.1161 | 0.0262 | | |
| 30 | 11.4080 | 0.2179 | 1.80400 | 46.57 |
| 31 | 1.7454 | 0.0262 | | |
| 32 | 1.8397 | 0.3658 | 1.61800 | 63.33 |
| 33 | −8.7181 | 3.8806 | | |
| 34 | ∞ | 0.2615 | 1.50847 | 61.19 |
| 35 | ∞ | | | |

TABLE 8

| SURFACE NUMBER | 1 | 2 |
|---|---|---|
| KA | 8.00000E−01 | −2.79783E+00 |
| A3 | 2.78066E−02 | 3.23688E−02 |
| A4 | 1.98176E−02 | 1.07966E−02 |
| A5 | −8.20734E−03 | −3.19796E−03 |
| A6 | 6.43743E−04 | −5.45205E−04 |
| A7 | 1.86718E−04 | 3.72351E−05 |
| A8 | −1.75525E−05 | 2.40233E−05 |
| A9 | −4.41106E−06 | 3.10653E−06 |
| A10 | 2.07130E−07 | −1.10505E−06 |
| A11 | 4.58316E−08 | 1.25174E−07 |
| A12 | 3.70603E−09 | −1.74649E−08 |

TABLE 9

| | PROJECTION DISTANCE = ∞ | | |
|---|---|---|---|
| | WIDE-ANGLE END | MIDDLE | TELEPHOTO END |
| ZOOM RATIO | 1.000 | 1.118 | 1.250 |
| f' | 1.000 | 1.118 | 1.250 |
| FNo. | 2.40 | 2.40 | 2.40 |
| 2ω[°] | 99.4 | 92.4 | 85.8 |
| DD[6] | 1.7485 | 1.7485 | 1.7485 |
| DD[8] | 0.7315 | 0.7315 | 0.7315 |
| DD[10] | 1.1926 | 0.6706 | 0.1935 |
| DD[14] | 0.2412 | 2.1858 | 3.5956 |
| DD[18] | 4.4263 | 2.1851 | 0.2847 |
| DD[21] | 0.1477 | 0.9663 | 1.9340 |

| | PROJECTION DISTANCE = 119.12 | | | PROJECTION DISTANCE = 58.59 | | |
|---|---|---|---|---|---|---|
| | WIDE-ANGLE END | MIDDLE | TELEPHOTO END | WIDE-ANGLE END | MIDDLE | TELEPHOTO END |
| ZOOM RATIO | 1.000 | 1.118 | 1.250 | 1.000 | 1.118 | 1.250 |
| f' | 1.001 | 1.120 | 1.252 | 1.004 | 1.123 | 1.256 |
| FNo. | 2.40 | 2.40 | 2.40 | 2.40 | 2.40 | 2.40 |
| 2ω[°] | 99.2 | 92.2 | 85.6 | 98.8 | 91.8 | 85.2 |
| DD[6] | 1.6973 | 1.6973 | 1.6973 | 1.5531 | 1.5531 | 1.5531 |
| DD[8] | 0.7728 | 0.7728 | 0.7728 | 0.8295 | 0.8295 | 0.8295 |
| DD[10] | 1.2025 | 0.6805 | 0.2034 | 1.2899 | 0.7680 | 0.2908 |

Example 4

Figure 7:
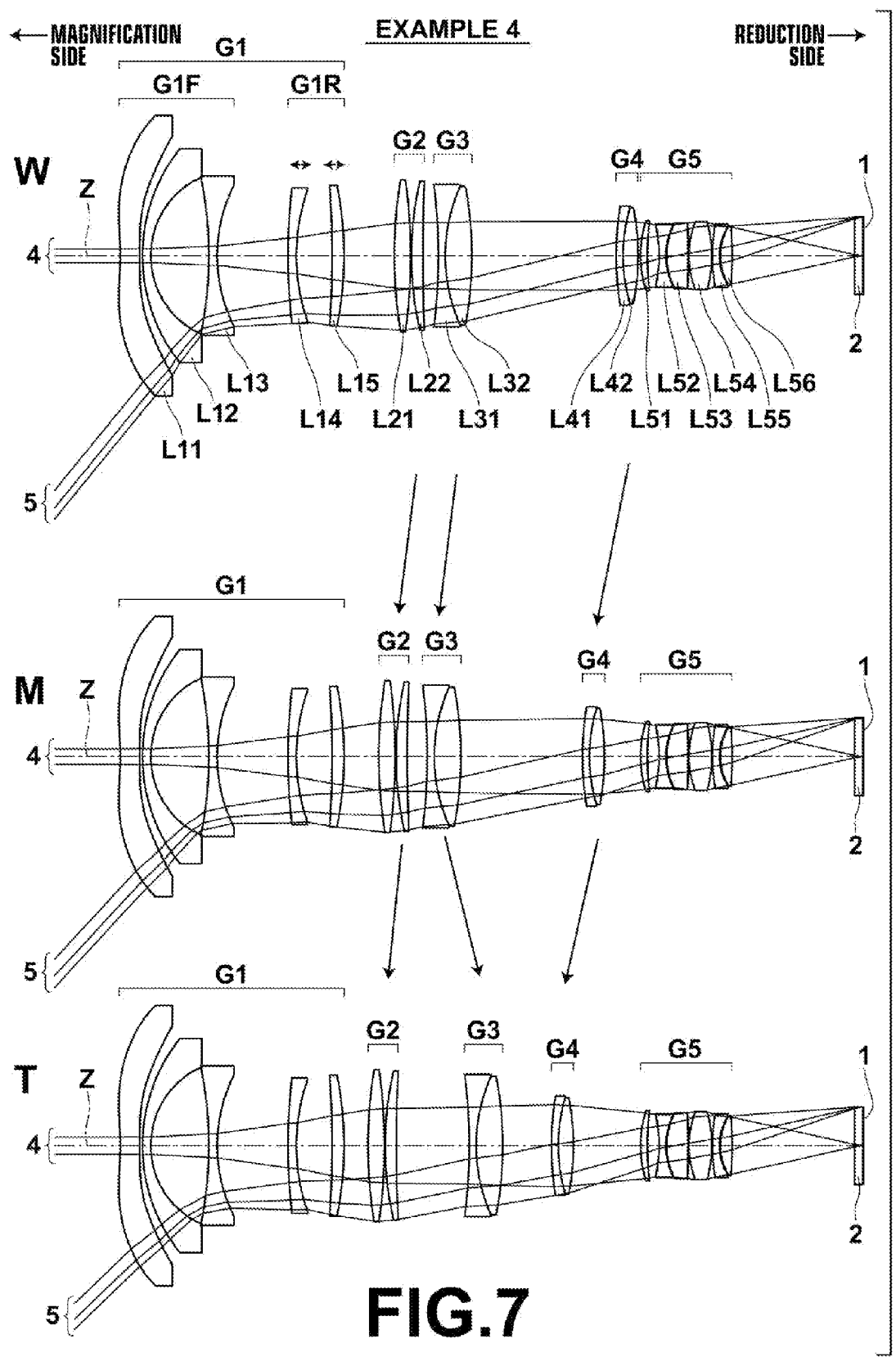
FIG. 7 is a cross section illustrating the lens configuration of a zoom lens for projection in Example 4 of the present invention and paths of rays.
Figure 24:
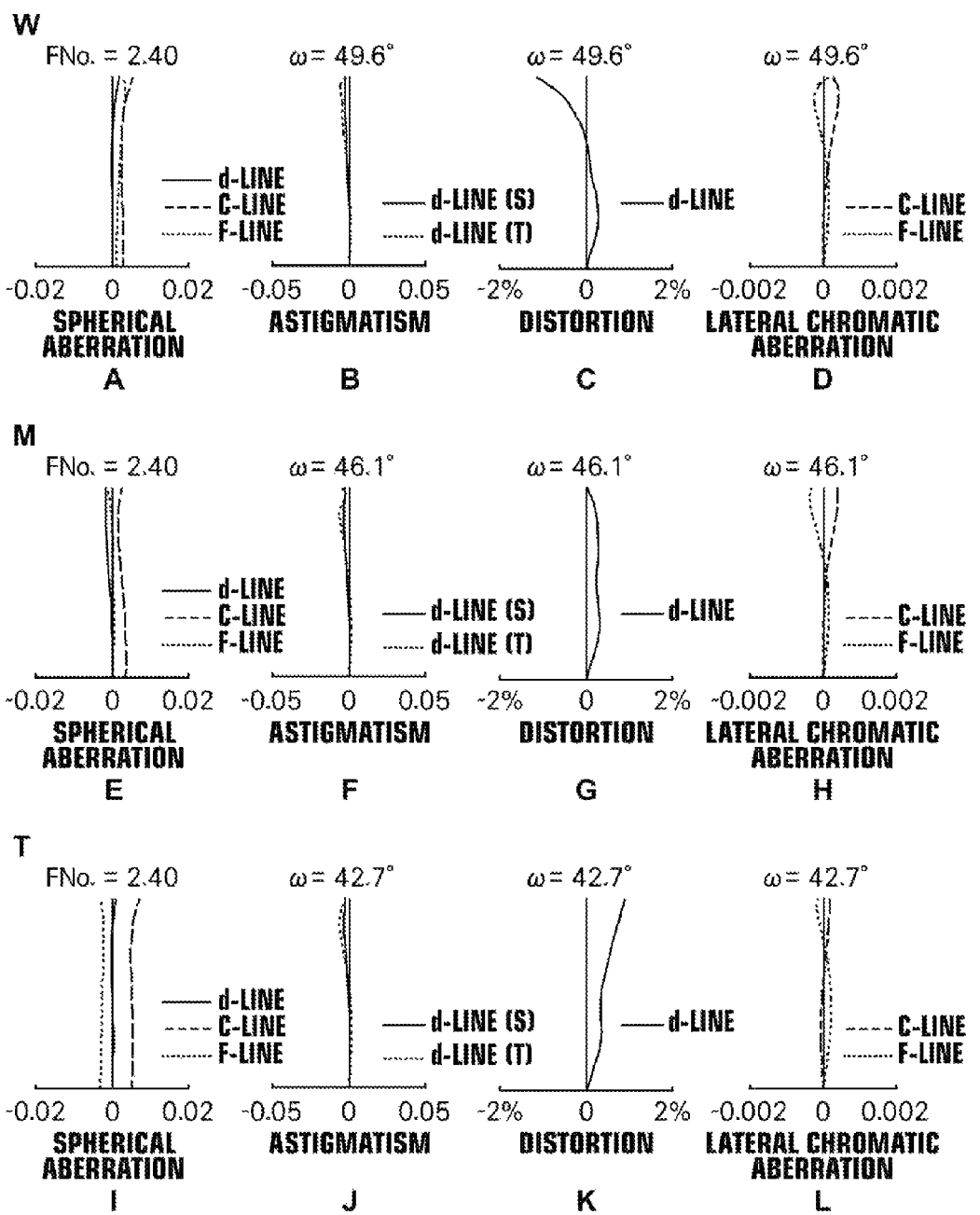
FIG. 24, Sections A through L are aberration diagrams of the zoom lens for projection in Example 4 of the present invention when a projection distance is a reference distance.

FIG. 7 is a diagram illustrating a cross section of the zoom lens for projection in Example 4 and paths of rays. In the zoom lens for projection of Example 4, the group configuration, the schematic configuration of each lens group, and a focusing method are almost similar to the zoom lens for projection in Example 1. The zoom lens for projection in Example 4 differs from Example 1 in that lens L31 and lens L32 are cemented together. Table 10, Table 11 and Table 12 show basic lens data of the zoom lens for projection in Example 4, aspherical coefficients, and specification for d-line and values of variable surface distances, respectively. FIG. 24, Sections A through L and FIG. 25, Sections A through L are aberration diagrams of the zoom lens for projection in Example 4. In Example 4, a reference projection distance is 119, and a closest projection distance is 58.53.

TABLE 10

| Si | Ri | Di | Ndj | vdj |
|---|---|---|---|---|
| *1 | −6.2196 | 0.6097 | 1.49100 | 57.58 |
| *2 | −36.5359 | 0.0870 | | |
| 3 | 5.0472 | 0.2613 | 1.63854 | 55.38 |
| 4 | 2.5658 | 1.8304 | | |
| 5 | −11.5417 | 0.2612 | 1.77250 | 49.60 |
| 6 | 4.5938 | DD[6] | | |
| 7 | 17.2394 | 0.2613 | 1.72342 | 37.95 |
| 8 | 5.8448 | DD[8] | | |
| 9 | −29.7665 | 0.3752 | 1.51633 | 64.14 |
| 10 | −10.5419 | DD[10] | | |
| 11 | 13.6744 | 0.5130 | 1.69895 | 30.13 |
| 12 | −16.1425 | 0.0261 | | |
| 13 | 9.7734 | 0.3555 | 1.51633 | 64.14 |
| 14 | 50.1441 | DD[14] | | |
| 15 | −15.9757 | 0.2177 | 1.61800 | 63.33 |
| 16 | 4.9567 | 0.8370 | 1.51742 | 52.43 |
| 17 | −10.5684 | DD[17] | | |

TABLE 10-continued

| Si | Ri | Di | Ndj | vdj |
|---|---|---|---|---|
| 18 | 8.9798 | 0.2177 | 1.80518 | 25.42 |
| 19 | 4.9739 | 0.4731 | 1.48749 | 70.23 |
| 20 | −7.2360 | DD[20] | | |
| 21 | 3.2630 | 0.2178 | 1.48749 | 70.23 |
| 22 | 8.1186 | 0.3634 | | |
| 23 | −4.2634 | 0.2176 | 1.77250 | 49.60 |
| 24 | 2.0040 | 0.0261 | | |
| 25 | 2.1068 | 0.6689 | 1.48749 | 70.23 |
| 26 | −34.3700 | 0.0260 | | |
| 27 | 2.7143 | 0.7181 | 1.51633 | 64.14 |
| 28 | −3.6320 | 0.0260 | | |
| 29 | 5.6565 | 0.2177 | 1.80400 | 46.57 |
| 30 | 1.6210 | 0.0262 | | |
| 31 | 1.6931 | 0.3727 | 1.48749 | 70.23 |

TABLE 10-continued

| Si | Ri | Di | Ndj | vdj |
|---|---|---|---|---|
| 32 | −8.7092 | 3.8559 | | |
| 33 | ∞ | 0.2613 | 1.50847 | 61.19 |
| 34 | ∞ | | | |

TABLE 11

| SURFACE NUMBER | 1 | 2 |
|---|---|---|
| KA | 8.00000E−01 | −2.79783E+00 |
| A3 | 2.79390E−02 | 3.03502E−02 |
| A4 | 1.92791E−02 | 1.18665E−02 |
| A5 | −7.87799E−03 | −3.26065E−03 |
| A6 | 4.64334E−04 | −6.86222E−04 |
| A7 | 2.28302E−04 | 1.57048E−05 |
| A8 | −1.89070E−05 | 3.72723E−05 |
| A9 | −5.29021E−06 | 5.52133E−06 |
| A10 | 1.54267E−07 | −3.21457E−07 |
| A11 | 1.04885E−07 | −4.53422E−08 |
| A12 | 4.92499E−09 | −1.34212E−07 |
| A13 | −1.00277E−09 | 1.90486E−08 |

TABLE 12

| | PROJECTION DISTANCE = ∞ | | |
|---|---|---|---|
| | WIDE-ANGLE END | MIDDLE | TELEPHOTO END |
| ZOOM RATIO | 1.000 | 1.118 | 1.250 |
| f′ | 1.000 | 1.118 | 1.250 |
| FNo. | 2.40 | 2.40 | 2.40 |
| 2ω[°] | 99.4 | 92.4 | 85.6 |
| DD[6] | 2.2270 | 2.2270 | 2.2270 |
| DD[8] | 1.1202 | 1.1202 | 1.1202 |
| DD[10] | 1.5804 | 1.0935 | 0.7527 |
| DD[14] | 0.4897 | 0.6291 | 2.2867 |
| DD[17] | 4.5357 | 3.8276 | 1.5334 |
| DD[20] | 0.0730 | 1.1286 | 2.1060 |

| | PROJECTION DISTANCE = 119 | | | PROJECTION DISTANCE = 58.53 | | |
|---|---|---|---|---|---|---|
| | WIDE-ANGLE END | MIDDLE | TELEPHOTO END | WIDE-ANGLE END | MIDDLE | TELEPHOTO END |
| ZOOM RATIO | 1.000 | 1.118 | 1.250 | 1.000 | 1.118 | 1.250 |
| f′ | 1.000 | 1.118 | 1.250 | 1.002 | 1.120 | 1.252 |
| FNo. | 2.40 | 2.40 | 2.40 | 2.40 | 2.40 | 2.40 |
| 2ω[°] | 99.2 | 92.2 | 85.4 | 99.0 | 92.0 | 85.2 |
| DD[6] | 2.2287 | 2.2287 | 2.2287 | 2.1090 | 2.1090 | 2.1090 |
| DD[8] | 1.1719 | 1.1719 | 1.1719 | 1.1403 | 1.1403 | 1.1403 |
| DD[10] | 1.5270 | 1.0400 | 0.6993 | 1.6783 | 1.1913 | 0.8506 |

Example 5

Figure 8:
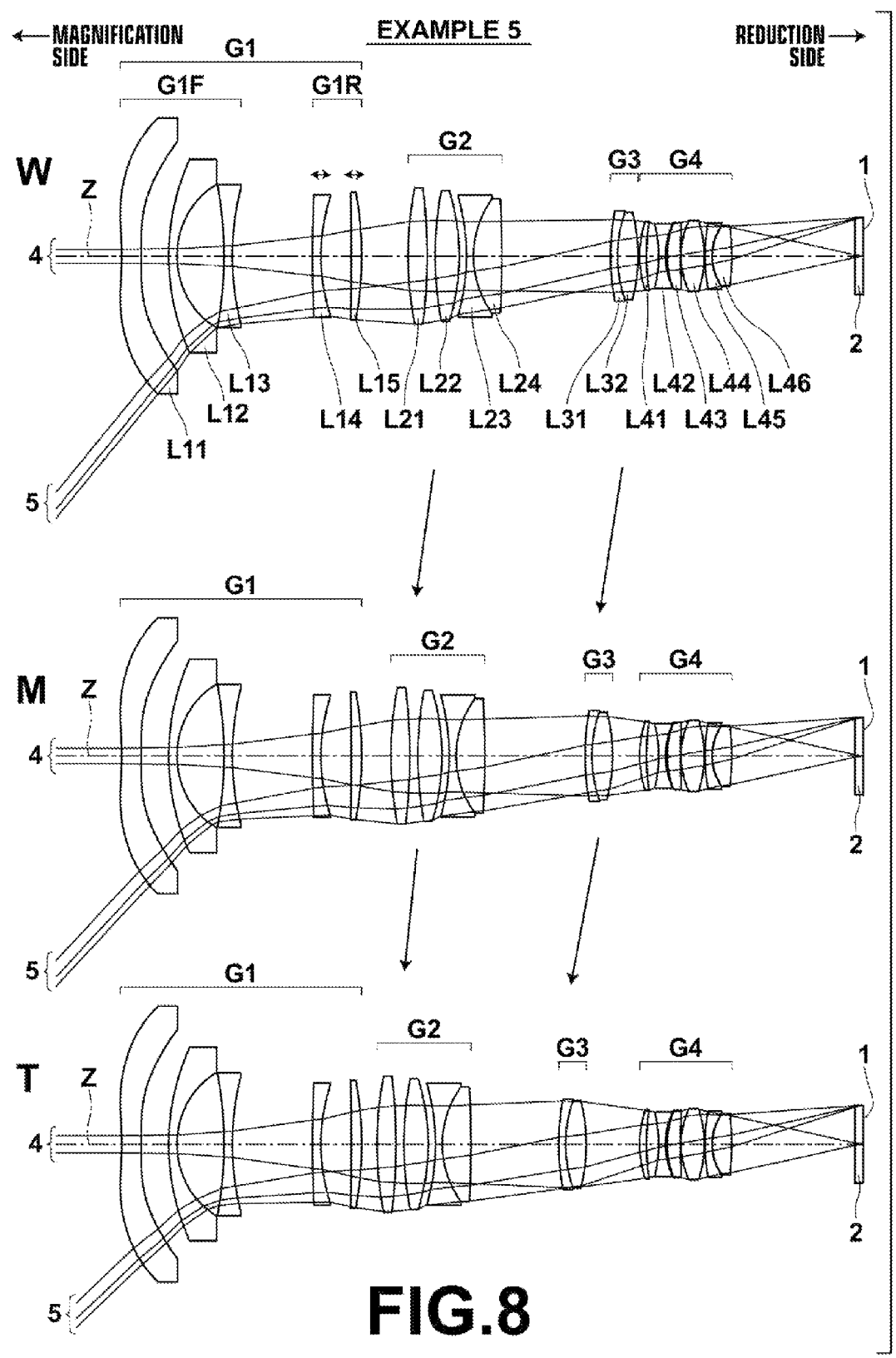
FIG. 8 is a cross section illustrating the lens configuration of a zoom lens for projection in Example 5 of the present invention and paths of rays.

FIG. 8 is a diagram illustrating a cross section of the zoom lens for projection in Example 5 and paths of rays. The group configuration of the zoom lens for projection in Example 5 is a four-group lens configured by arranging first lens group G1 having negative refractive power, second lens group G2 having positive refractive power, third lens group G3 having positive refractive power and fourth lens group G4 having positive refractive power in this order from the magnification side. The zoom lens for projection is configured in such a manner that first lens group G1 and fourth lens group G4 are fixed, and second lens group G2 and third lens group G3 move in the direction of an optical axis from the reduction side toward the magnification side during magnification change from a wide-angle end to a telephoto end. Further, the reduction side is non-telecentric. In Example 5, the middle group consists of second lens group G2 and third lens group G3, and a last lens group consists of fourth lens group G4.

In the zoom lens for projection of Example 5, the schematic configuration of first lens group G1 and a focusing method are almost similar to the zoom lens for projection in Example 1. The zoom lens for projection in Example 5 differs from Example 1 in that second lens group G2 consists of four lenses of lenses L21 through L24 in this order from the magnification side, and that third lens group G3 consists of two lenses of lenses L31 and L32 in this order from the magnification side, and that fourth lens group G4 consists of six lenses of lenses L41 through L46 in this order from the magnification side. Further, lens L23 and L24 are cemented together, and lens L31 and lens L32 are cemented together, and the other lenses are single lenses, which are not cemented together.

Figure 26:
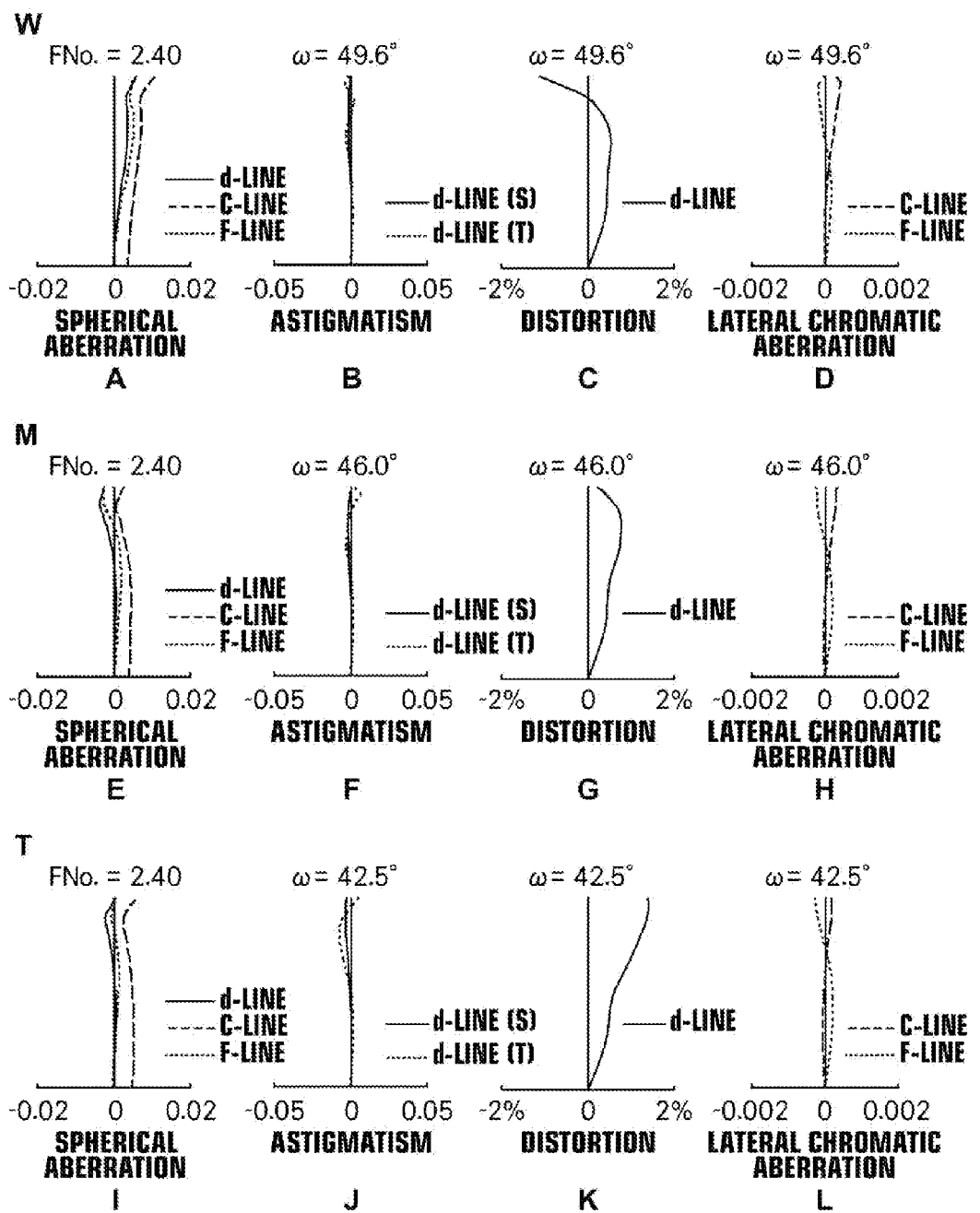
FIG. 26, Sections A through L are aberration diagrams of the zoom lens for projection in Example 5 of the present invention when a projection distance is a reference distance.
Figure 27:
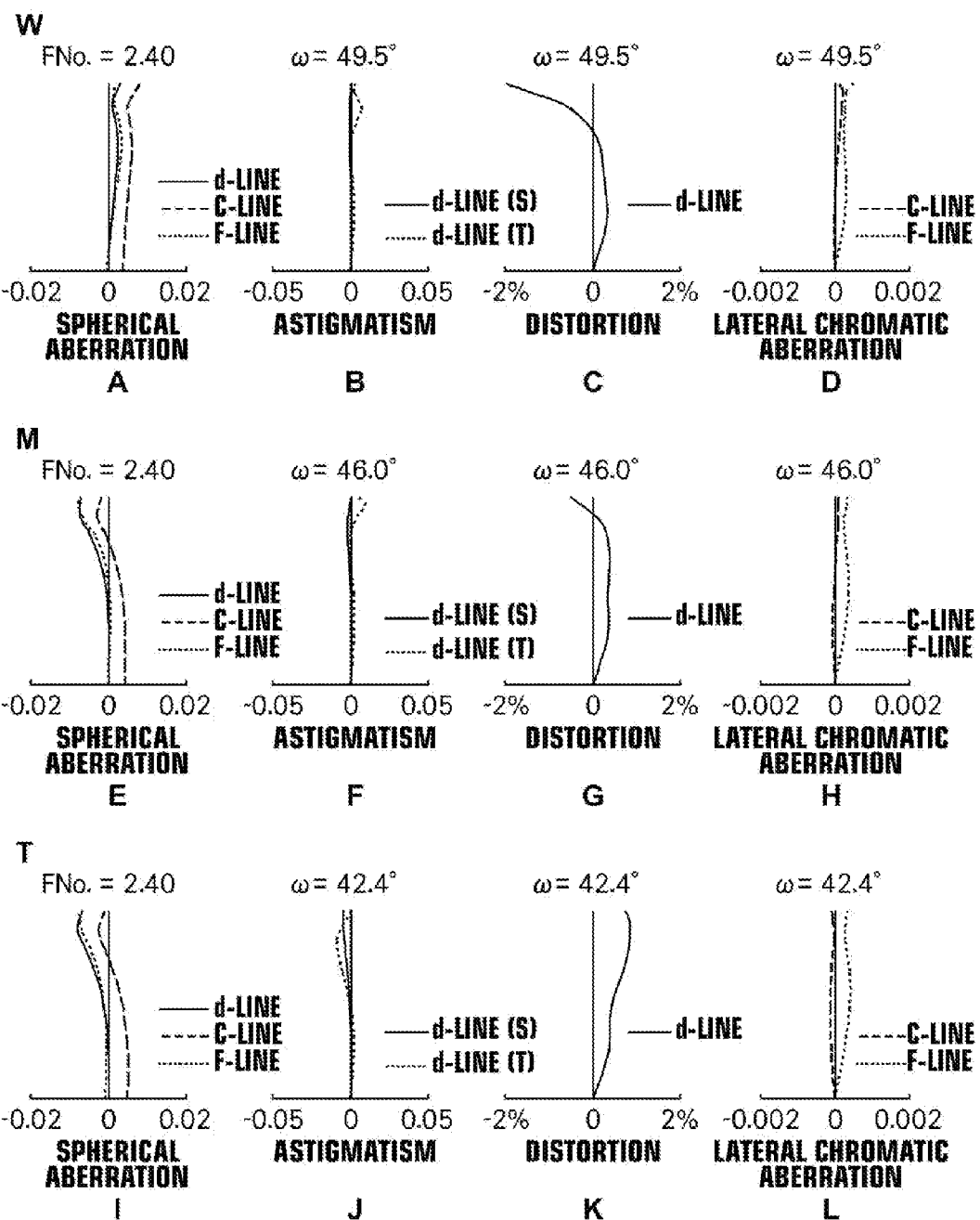
FIG. 27, Sections A through L are aberration diagrams of the zoom lens for projection in Example 5 of the present invention when a projection distance is a closest distance.

Table 13, Table 14 and Table 15 show basic lens data of the zoom lens for projection in Example 5, aspherical coefficients, and specification for d-line and values of variable surface distances, respectively. FIG. 26, Sections A through L and FIG. 27, Sections A through L are aberration diagrams of the zoom lens for projection in Example 5. In Example 5, a reference projection distance is 118.8, and a closest projection distance is 58.42.

TABLE 13

| Si | Ri | Di | Ndj | vdj |
|---|---|---|---|---|
| *1 | −6.2087 | 0.6086 | 1.49100 | 57.58 |
| *2 | −36.4724 | 0.8669 | | |
| 3 | 6.7712 | 0.2607 | 1.74400 | 44.78 |
| 4 | 2.5167 | 1.4877 | | |
| 5 | −11.0026 | 0.2608 | 1.77250 | 49.60 |
| 6 | 7.9690 | DD[6] | | |
| 7 | 53.8672 | 0.2608 | 1.74400 | 44.78 |
| 8 | 5.6183 | DD[8] | | |
| 9 | −82.4081 | 0.3261 | 1.51742 | 52.43 |
| 10 | −10.4968 | DD[10] | | |
| 11 | 10.4154 | 0.5956 | 1.69895 | 30.13 |
| 12 | −16.3905 | 0.2540 | | |

TABLE 13-continued

| Si | Ri | Di | Ndj | vdj |
|---|---|---|---|---|
| 13 | 10.1906 | 0.7541 | 1.51633 | 64.14 |
| 14 | −6.5577 | 0.2319 | | |
| 15 | −6.3269 | 0.2173 | 1.61800 | 63.33 |
| 16 | 2.8482 | 0.8982 | 1.51742 | 52.43 |
| 17 | −29.0070 | DD[17] | | |
| 18 | 7.1973 | 0.2173 | 1.80518 | 25.42 |
| 19 | 3.9632 | 0.6474 | 1.48749 | 70.23 |
| 20 | −5.0606 | DD[20] | | |
| 21 | 3.3043 | 0.2173 | 1.48749 | 70.23 |
| 22 | 6.7174 | 0.3775 | | |
| 23 | −3.8789 | 0.2174 | 1.77250 | 49.60 |
| 24 | 2.1612 | 0.0549 | | |
| 25 | 2.6188 | 0.4201 | 1.48749 | 70.23 |
| 26 | 45.2489 | 0.0130 | | |
| 27 | 2.4625 | 0.7300 | 1.51633 | 64.14 |
| 28 | −3.2804 | 0.0260 | | |
| 29 | 5.3565 | 0.2173 | 1.80400 | 46.57 |
| 30 | 1.5329 | 0.0131 | | |
| 31 | 1.5732 | 0.6070 | 1.48749 | 70.23 |
| 32 | −8.6941 | 3.8869 | | |
| 33 | ∞ | 0.2608 | 1.50847 | 61.19 |
| 34 | ∞ | | | |

TABLE 14

| SURFACE NUMBER | 1 | 2 |
|---|---|---|
| KA | 8.00000E−01 | −2.79783E+00 |
| A3 | 2.53891E−02 | 2.74749E−02 |
| A4 | 2.36773E−02 | 1.74702E−02 |
| A5 | −9.62687E−03 | −4.60556E−03 |
| A6 | 6.32895E−04 | −5.11808E−04 |
| A7 | 2.39436E−04 | −2.34153E−04 |
| A8 | −1.30206E−05 | 9.97935E−05 |
| A9 | −6.20677E−06 | 2.37665E−05 |
| A10 | 8.06777E−08 | −8.85441E−07 |
| A11 | 1.01798E−07 | −1.37785E−06 |
| A12 | 3.60120E−09 | −4.34891E−07 |
| A13 | −9.15384E−10 | 1.11337E−07 |

TABLE 15

| | PROJECTION DISTANCE = ∞ | | |
|---|---|---|---|
| | WIDE-ANGLE END | MIDDLE | TELEPHOTO END |
| ZOOM RATIO | 1.000 | 1.118 | 1.250 |
| f' | 1.000 | 1.118 | 1.250 |
| FNo. | 2.40 | 2.40 | 2.40 |
| 2ω[°] | 99.2 | 92.2 | 85.2 |
| DD[6] | 2.5257 | 2.5257 | 2.5257 |
| DD[8] | 0.9523 | 0.9523 | 0.9523 |
| DD[10] | 1.4617 | 0.9201 | 0.4835 |
| DD[17] | 3.4233 | 3.1613 | 2.7700 |
| DD[20] | 0.0481 | 0.8518 | 1.6797 |

| | PROJECTION DISTANCE = 118.8 | | | PROJECTION DISTANCE = 58.42 | | |
|---|---|---|---|---|---|---|
| | WIDE-ANGLE END | MIDDLE | TELEPHOTO END | WIDE-ANGLE END | MIDDLE | TELEPHOTO END |
| ZOOM RATIO | 1.000 | 1.118 | 1.250 | 1.000 | 1.118 | 1.250 |
| f' | 1.000 | 1.118 | 1.249 | 1.001 | 1.118 | 1.250 |
| FNo. | 2.40 | 2.40 | 2.40 | 2.40 | 2.40 | 2.40 |
| 2ω[°] | 99.2 | 92.0 | 85.0 | 99.0 | 92.0 | 84.8 |
| DD[6] | 2.5480 | 2.5480 | 2.5480 | 2.4565 | 2.4565 | 2.4565 |
| DD[8] | 1.0009 | 1.0009 | 1.0009 | 0.9586 | 0.9586 | 0.9586 |
| DD[10] | 1.3908 | 0.8492 | 0.4126 | 1.5246 | 0.9830 | 0.5464 |

Example 6

Figure 9:
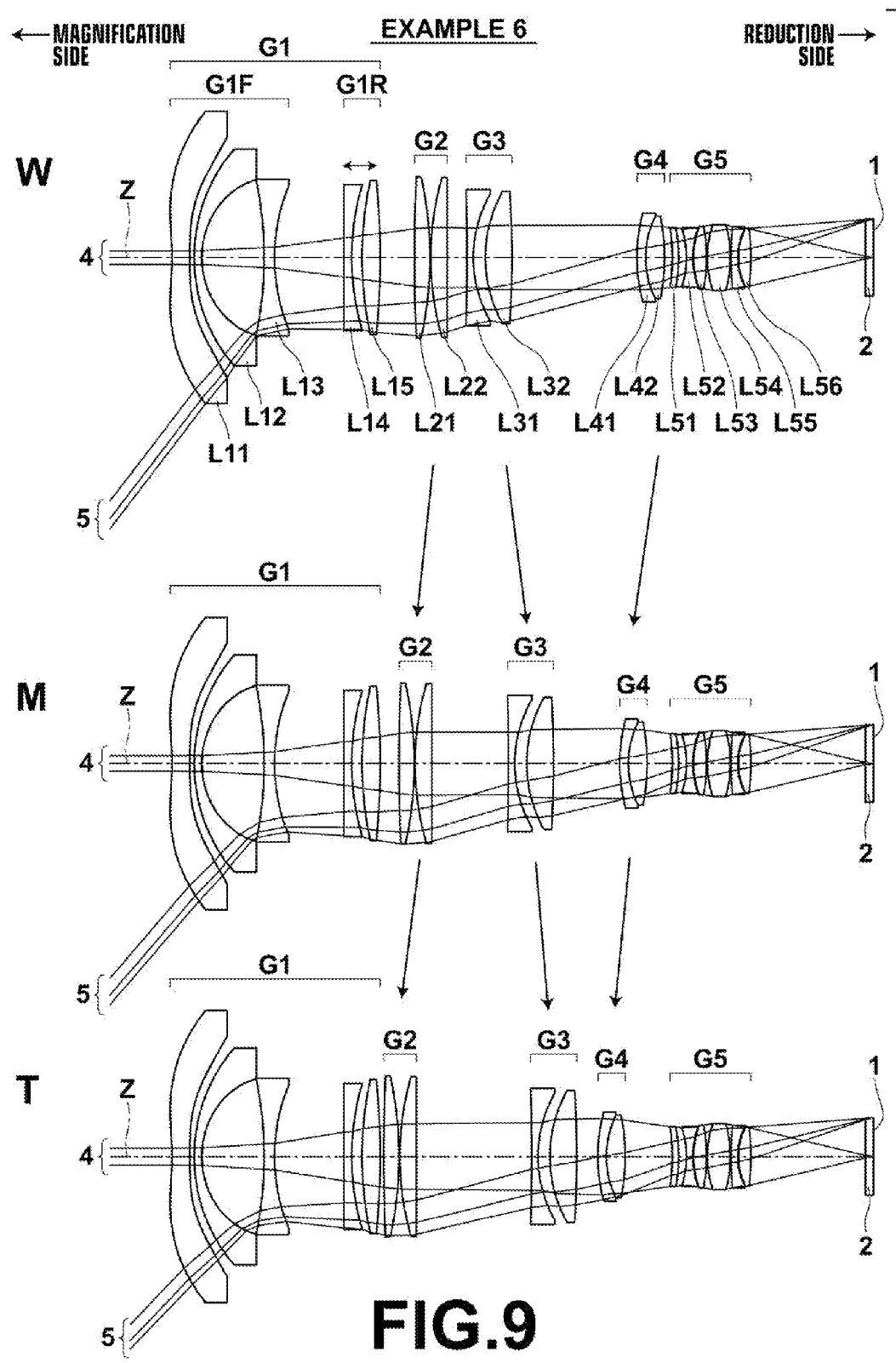
FIG. 9 is a cross section illustrating the lens configuration of a zoom lens for projection in Example 6 of the present invention and paths of rays.
Figure 29:
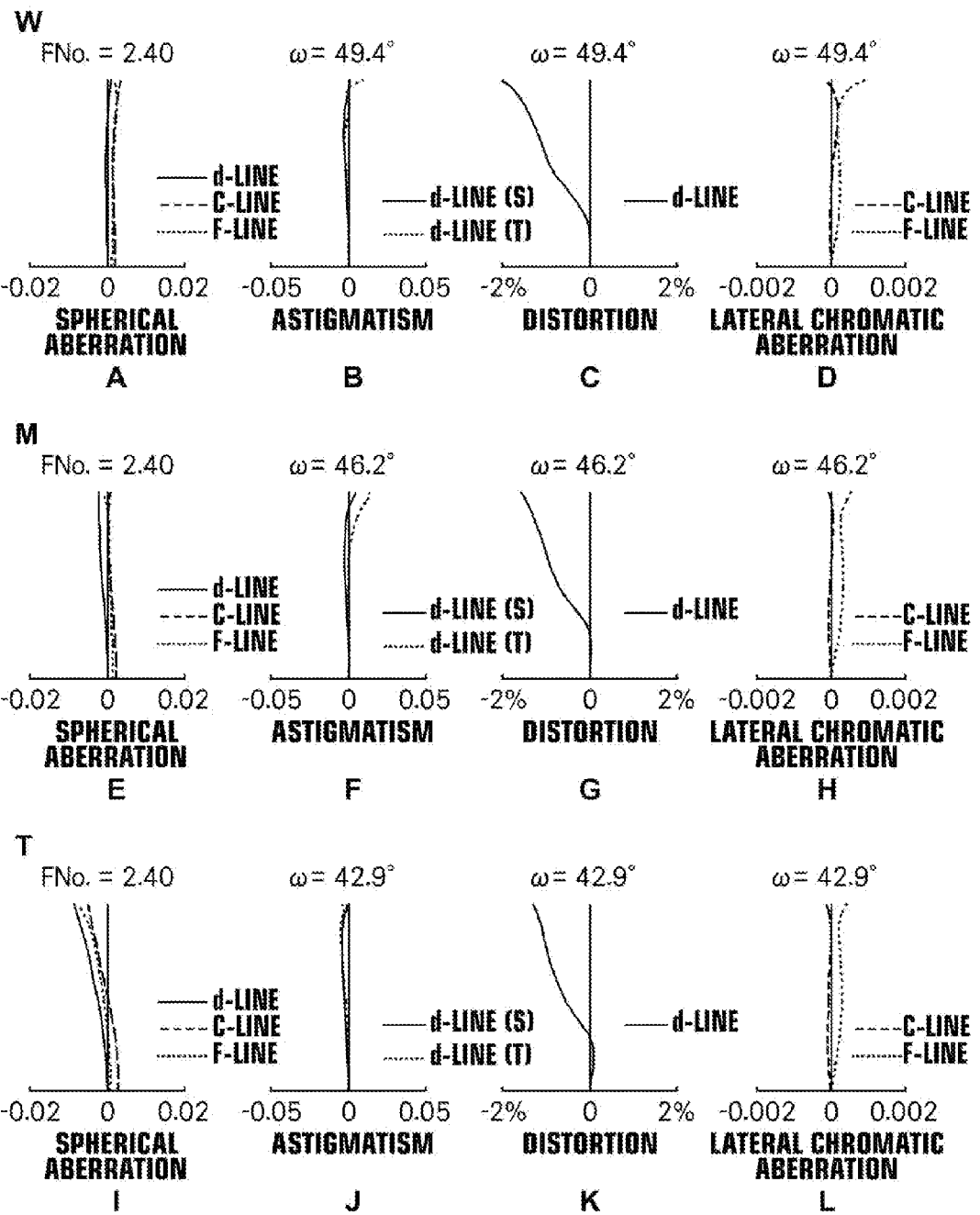
FIG. 29, Sections A through L are aberration diagrams of the zoom lens for projection in Example 6 of the present invention when a projection distance is a closest distance.

FIG. 9 is a diagram illustrating a cross section of the zoom lens for projection in Example 6 and paths of rays. In the zoom lens for projection of Example 6, the group configuration and the schematic configuration of each lens group are almost similar to the zoom lens for projection in Example 1. However, the zoom lens for projection in Example 6 differs from Example 1 in adopting a focusing method in which lenses L14 and L15 are moved in an integrated manner during focusing. Table 16, Table 17 and Table 18 show basic lens data of the zoom lens for projection in Example 6, aspherical coefficients, and specification for d-line and values of variable surface distances, respectively. FIG. 28, Sections A through L and FIG. 29, Sections A through L are aberration diagrams of the zoom lens for projection in Example 6. In Example 6, a reference projection distance is 119.14, and a closest projection distance is 58.6.

TABLE 16

| Si | Ri | Di | Ndj | vdj |
|---|---|---|---|---|
| *1 | −6.2283 | 0.6104 | 1.49100 | 57.58 |
| *2 | 75.1107 | 0.1499 | | |
| 3 | 4.6955 | 0.2615 | 1.63854 | 55.38 |
| 4 | 2.4654 | 2.1098 | | |
| 5 | −10.4551 | 0.3489 | 1.77250 | 49.60 |
| 6 | 5.1666 | DD[6] | | |
| 7 | −421.9807 | 0.2615 | 1.72342 | 37.95 |
| 8 | 7.2146 | 0.3489 | | |
| 9 | 10.1557 | 0.6103 | 1.51633 | 64.14 |
| 10 | −20.9862 | DD[10] | | |
| 11 | 52.4573 | 0.5186 | 1.64769 | 33.79 |
| 12 | −10.1439 | 0.0263 | | |
| 13 | 7.9654 | 0.5617 | 1.59551 | 39.24 |
| 14 | −4329.2449 | DD[14] | | |
| 15 | −74.7123 | 0.2180 | 1.61800 | 63.33 |
| 16 | 3.5683 | 0.4062 | | |

TABLE 16-continued

| Si | Ri | Di | Ndj | vdj |
|---|---|---|---|---|
| 17 | 3.7977 | 0.9089 | 1.51742 | 52.43 |
| 18 | −27.5652 | DD[18] | | |
| 19 | 4.7609 | 0.2944 | 1.80100 | 34.97 |
| 20 | 2.6057 | 0.6330 | 1.48749 | 70.23 |
| 21 | −5.9194 | DD[21] | | |
| 22 | −5.3885 | 0.2179 | 1.51633 | 64.14 |
| 23 | −3.9866 | 0.2643 | | |
| 24 | −2.5201 | 0.2180 | 1.77250 | 49.60 |
| 25 | 2.4052 | 0.0261 | | |
| 26 | 2.5885 | 0.4335 | 1.48749 | 70.23 |
| 27 | −4.6984 | 0.0262 | | |
| 28 | 2.8264 | 0.7856 | 1.51633 | 64.14 |
| 29 | −3.1613 | 0.0261 | | |
| 30 | 12.9005 | 0.2179 | 1.80400 | 46.57 |
| 31 | 1.7350 | 0.0262 | | |
| 32 | 1.8267 | 0.4172 | 1.61800 | 63.33 |
| 33 | −8.7195 | 3.8967 | | |
| 34 | ∞ | 0.2616 | 1.50847 | 61.19 |
| 35 | ∞ | | | |

TABLE 17

| SURFACE NUMBER | 1 | 2 |
|---|---|---|
| KA | 8.00000E−01 | −2.79783E+00 |
| A3 | 1.60562E−02 | 1.63755E−02 |
| A4 | 2.65293E−02 | 2.12177E−02 |
| A5 | −9.69716E−03 | −6.64306E−03 |
| A6 | 3.77172E−04 | 1.18665E−04 |
| A7 | 4.08532E−04 | 6.58843E−05 |
| A8 | −5.20217E−05 | −8.53212E−06 |
| A9 | −7.38200E−06 | 4.77439E−06 |
| A10 | 8.95192E−07 | 1.29257E−08 |
| A11 | 2.27312E−07 | −2.30226E−07 |
| A12 | −2.92209E−08 | 2.22234E−08 |

TABLE 18

| | PROJECTION DISTANCE = ∞ | | |
|---|---|---|---|
| | WIDE-ANGLE END | MIDDLE | TELEPHOTO END |
| ZOOM RATIO | 1.000 | 1.118 | 1.250 |
| f | 1.000 | 1.118 | 1.250 |
| FNo. | 2.40 | 2.40 | 2.40 |
| 2ω[°] | 99.2 | 92.8 | 86.4 |
| DD[6] | 2.3593 | 2.3593 | 2.3593 |
| DD[10] | 1.1702 | 0.6416 | 0.1251 |
| DD[14] | 0.6659 | 2.6063 | 3.9083 |
| DD[18] | 4.2384 | 2.2416 | 0.7113 |
| DD[21] | 0.2685 | 0.8535 | 1.5985 |

| | PROJECTION DISTANCE = 119.14 | | | PROJECTION DISTANCE = 58.6 | | |
|---|---|---|---|---|---|---|
| | WIDE-ANGLE END | MIDDLE | TELEPHOTO END | WIDE-ANGLE END | MIDDLE | TELEPHOTO END |
| ZOOM RATIO | 1.000 | 1.118 | 1.250 | 1.000 | 1.118 | 1.250 |
| f | 1.002 | 1.120 | 1.253 | 1.003 | 1.120 | 1.254 |
| FNo. | 2.40 | 2.40 | 2.40 | 2.40 | 2.40 | 2.40 |
| 2ω[°] | 99.0 | 92.4 | 86.0 | 98.8 | 92.4 | 85.8 |
| DD[6] | 2.2137 | 2.2137 | 2.2137 | 2.0637 | 2.2137 | 2.1232 |
| DD[10] | 1.3157 | 0.7871 | 0.2706 | 1.4657 | 0.7871 | 0.3611 |

Example 7

Figure 10:
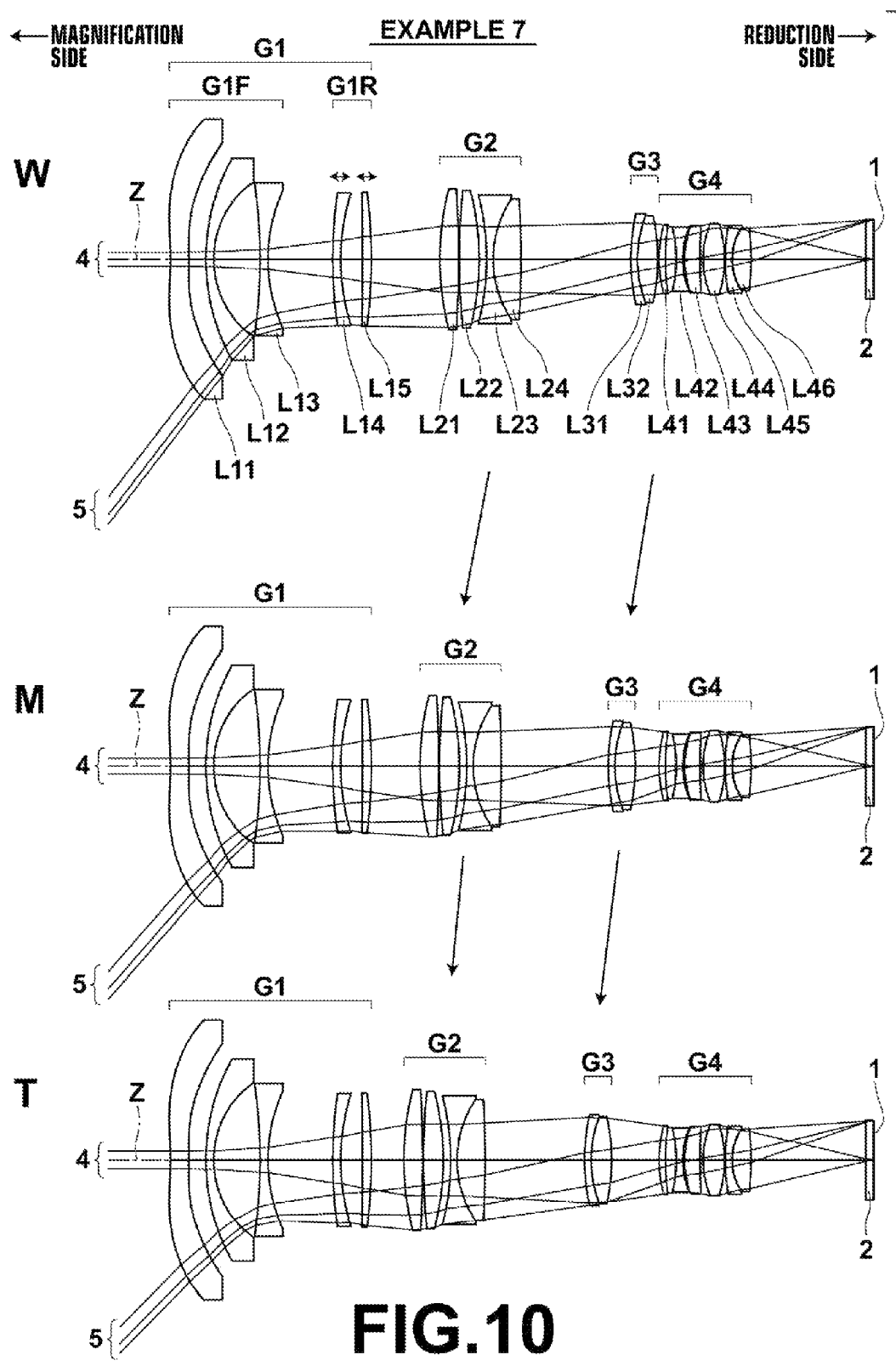
FIG. 10 is a cross section illustrating the lens configuration of a zoom lens for projection in Example 7 of the present invention and paths of rays.
Figure 31:
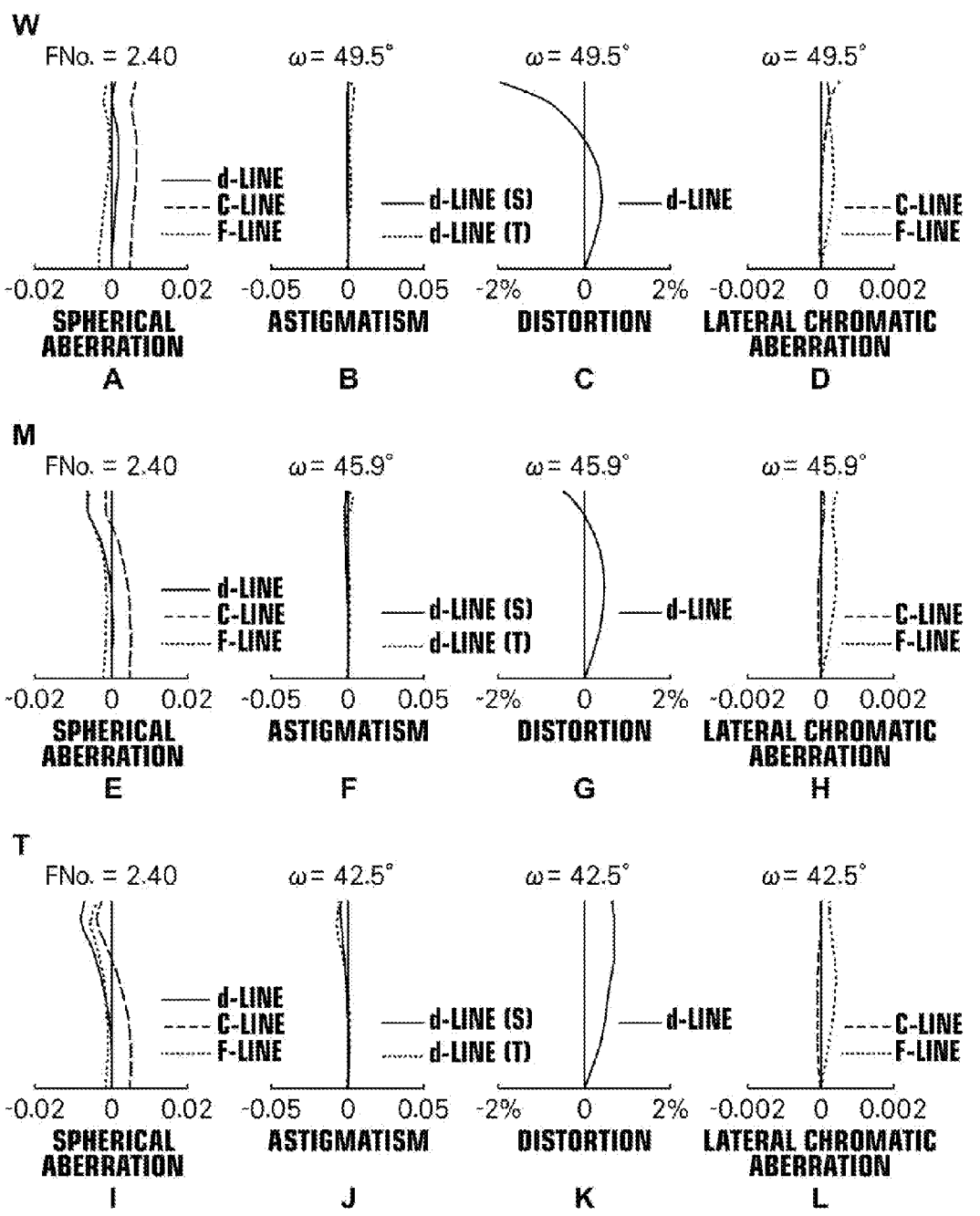
FIG. 31, Sections A through L are aberration diagrams of the zoom lens for projection in Example 7 of the present invention when a projection distance is a closest distance.

FIG. 10 is a diagram illustrating a cross section of the zoom lens for projection in Example 7 and paths of rays. In the zoom lens for projection of Example 7, the group configuration, the schematic configuration of each lens group and a focusing method are almost similar to the zoom lens for projection in Example 5. Table 19, Table 20 and Table 21 show basic lens data of the zoom lens for projection in Example 7, aspherical coefficients, and specification for d-line and values of variable surface distances, respectively. FIG. 30, Sections A through L and FIG. 31, Sections A through L are aberration diagrams of the zoom lens for projection in Example 7. In Example 7, a reference projection distance is 118.64, and a closest projection distance is 58.35.

TABLE 19

| Si | Ri | Di | Ndj | νdj |
|---|---|---|---|---|
| *1 | −6.2003 | 0.6078 | 1.49100 | 57.58 |
| *2 | −36.4230 | 0.5679 | | |
| 3 | 5.6678 | 0.2604 | 1.74400 | 44.78 |
| 4 | 2.6620 | 1.5298 | | |
| 5 | −14.1931 | 0.2605 | 1.77250 | 49.60 |
| 6 | 4.5361 | DD[6] | | |
| 7 | 13.2085 | 0.2604 | 1.74400 | 44.78 |
| 8 | 5.9217 | DD[8] | | |
| 9 | −117.0475 | 0.2902 | 1.72342 | 37.95 |
| 10 | −14.3406 | DD[10] | | |
| 11 | 7.6008 | 0.6187 | 1.64769 | 33.79 |
| 12 | −32.2068 | 0.0260 | | |
| 13 | 18.2225 | 0.6567 | 1.51633 | 64.14 |
| 14 | −7.2155 | 0.2428 | | |
| 15 | −6.9134 | 0.2170 | 1.61800 | 63.33 |
| 16 | 2.9627 | 0.9222 | 1.51742 | 52.43 |
| 17 | −30.0614 | DD[17] | | |

TABLE 19-continued

| Si | Ri | Di | Ndj | νdj |
|---|---|---|---|---|
| 18 | 5.6418 | 0.2170 | 1.80518 | 25.42 |
| 19 | 3.2615 | 0.6711 | 1.48749 | 70.23 |
| 20 | −5.3783 | DD[20] | | |
| 21 | 3.3579 | 0.2170 | 1.51742 | 52.43 |
| 22 | 7.2873 | 0.3499 | | |
| 23 | −3.8692 | 0.2171 | 1.77250 | 49.60 |
| 24 | 2.1757 | 0.0712 | | |
| 25 | 2.8689 | 0.5032 | 1.64769 | 33.79 |
| 26 | 15.5764 | 0.0982 | | |
| 27 | 2.4929 | 0.7043 | 1.51633 | 64.14 |
| 28 | −3.2526 | 0.0260 | | |
| 29 | 5.2633 | 0.2170 | 1.83400 | 37.16 |
| 30 | 1.5184 | 0.0131 | | |
| 31 | 1.5577 | 0.6171 | 1.48749 | 70.23 |
| 32 | −8.6825 | 3.7954 | | |
| 33 | ∞ | 0.2605 | 1.50847 | 61.19 |
| 34 | ∞ | | | |

TABLE 20

| SURFACE NUMBER | 1 | 2 |
|---|---|---|
| KA | 8.00000E−01 | −2.79783E+00 |
| A3 | 2.81618E−02 | 3.14683E−02 |
| A4 | 2.23318E−02 | 1.39977E−02 |
| A5 | −9.62266E−03 | −3.58424E−03 |
| A6 | 7.21296E−04 | −6.46777E−04 |
| A7 | 2.29973E−04 | −2.50305E−04 |
| A8 | −1.64136E−05 | 9.89257E−05 |
| A9 | −5.96855E−06 | 2.43042E−05 |
| A10 | 1.78638E−07 | −1.29621E−07 |
| A11 | 1.10876E−07 | −1.36897E−06 |
| A12 | 6.78425E−09 | −4.38822E−07 |
| A13 | −2.10773E−09 | 1.03418E−07 |

TABLE 21

| | PROJECTION DISTANCE = ∞ | | |
|---|---|---|---|
| | WIDE-ANGLE END | MIDDLE | TELEPHOTO END |
| ZOOM RATIO | 1.000 | 1.118 | 1.250 |
| f' | 1.000 | 1.118 | 1.250 |
| FNo. | 2.40 | 2.40 | 2.40 |
| 2ω[°] | 99.2 | 92.0 | 85.2 |
| DD[6] | 2.1380 | 2.1380 | 2.1380 |
| DD[8] | 0.7176 | 0.7176 | 0.7176 |
| DD[10] | 2.2610 | 1.6054 | 1.0725 |
| DD[17] | 3.6277 | 3.5381 | 3.2902 |
| DD[20] | 0.0407 | 0.7859 | 1.5666 |

| | PROJECTION DISTANCE = 118.64 | | | PROJECTION DISTANCE = 58.35 | | |
|---|---|---|---|---|---|---|
| | WIDE-ANGLE END | MIDDLE | TELEPHOTO END | WIDE-ANGLE END | MIDDLE | TELEPHOTO END |
| ZOOM RATIO | 1.000 | 1.118 | 1.250 | 1.000 | 1.118 | 1.250 |
| f' | 0.998 | 1.116 | 1.248 | 0.999 | 1.117 | 1.249 |
| FNo. | 2.40 | 2.40 | 2.40 | 2.40 | 2.40 | 2.40 |
| 2ω[°] | 99.2 | 92.0 | 85.2 | 99.0 | 91.8 | 85.0 |
| DD[6] | 2.4048 | 2.4048 | 2.4048 | 2.2793 | 2.2793 | 2.2793 |
| DD[8] | 0.8188 | 0.8188 | 0.8188 | 0.8313 | 0.8313 | 0.8313 |
| DD[10] | 1.8930 | 1.2374 | 0.7046 | 2.0061 | 1.3505 | 0.8176 |

Example 8

Figure 11:
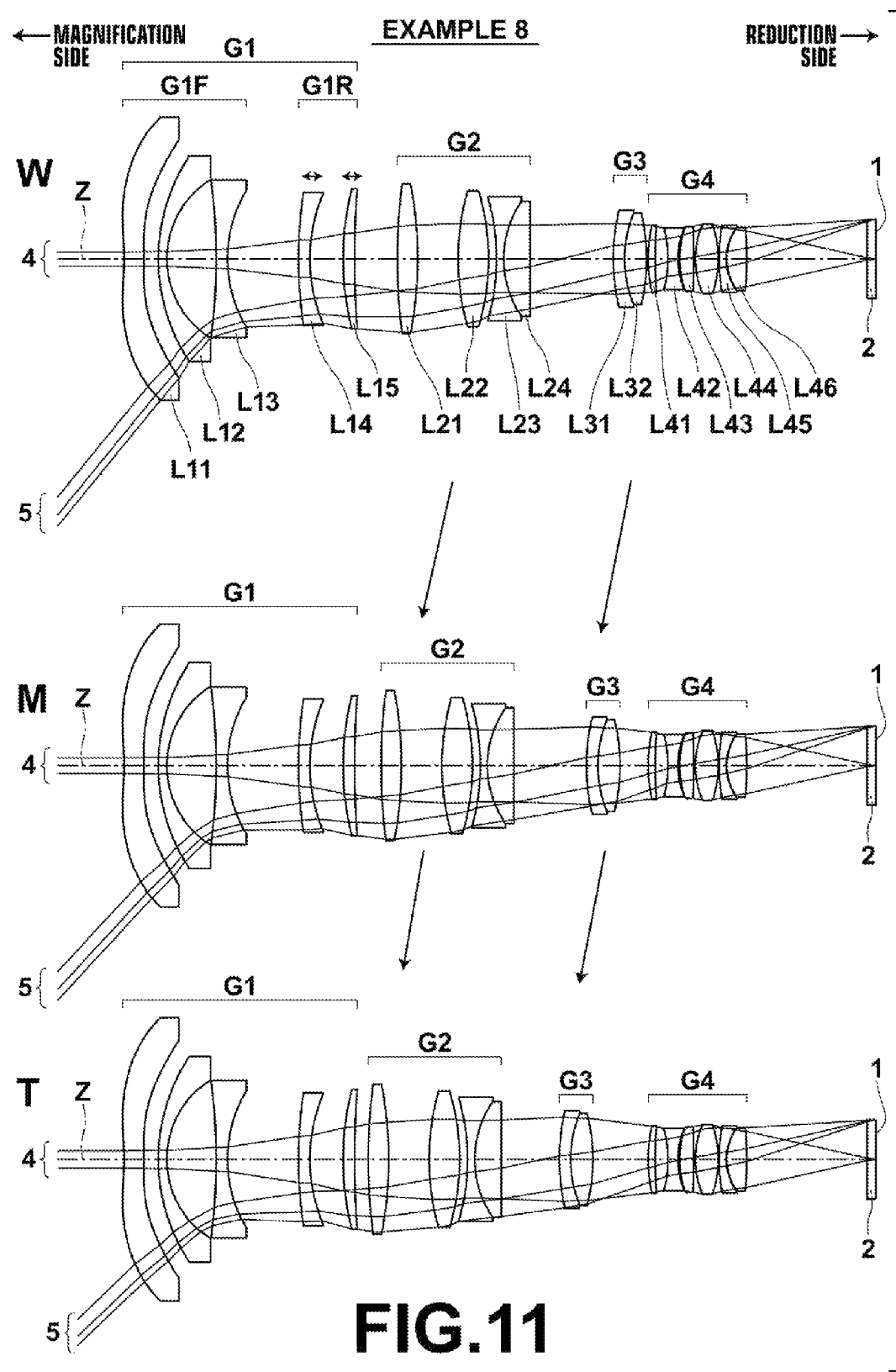
FIG. 11 is a cross section illustrating the lens configuration of a zoom lens for projection in Example 8 of the present invention and paths of rays.
Figure 32:
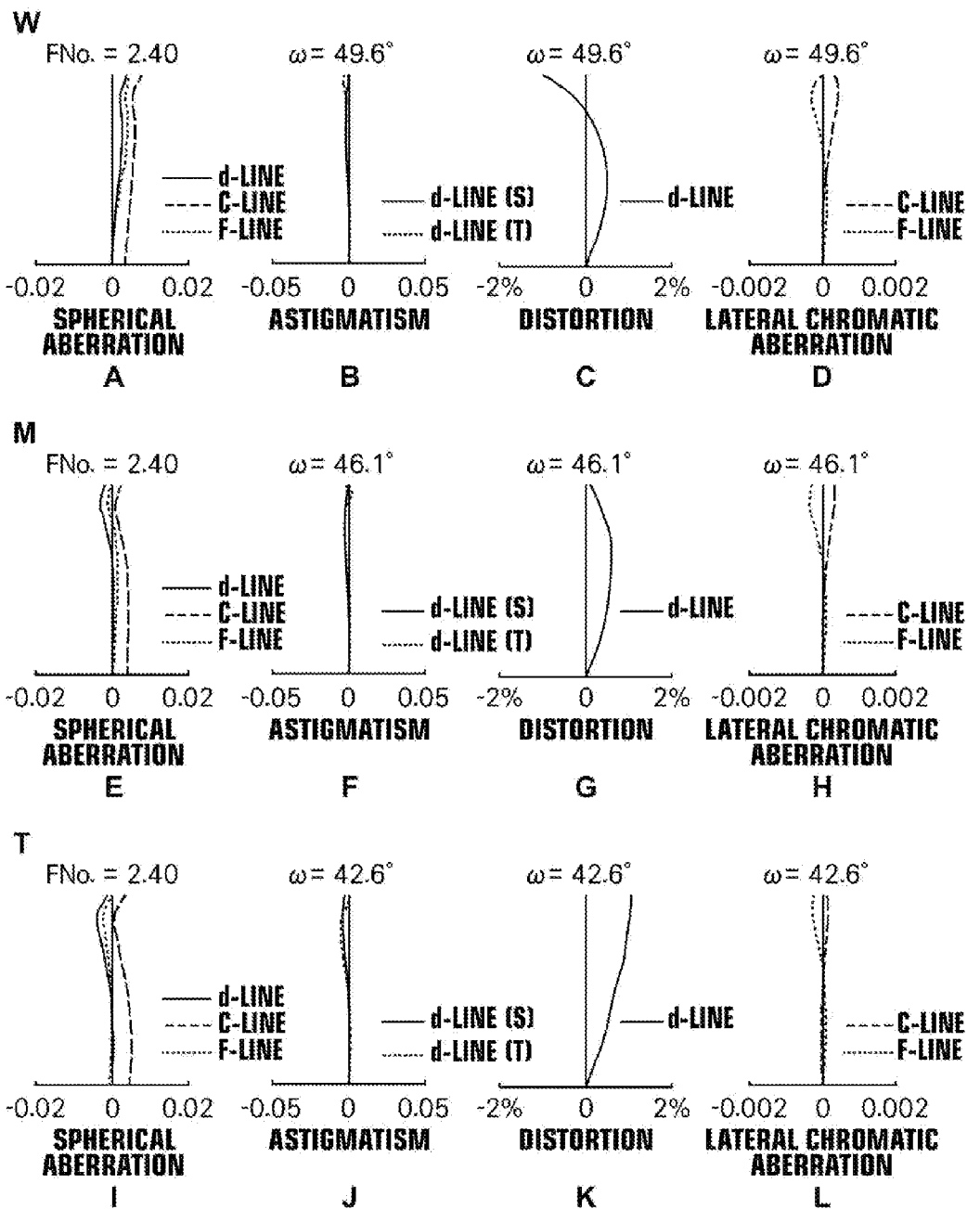
FIG. 32, Sections A through L are aberration diagrams of the zoom lens for projection in Example 8 of the present invention when a projection distance is a reference distance.

FIG. 11 is a diagram illustrating a cross section of the zoom lens for projection in Example 8 and paths of rays. In the zoom lens for projection of Example 8, the group configuration, the schematic configuration of each lens group and a focusing method are almost similar to the zoom lens for projection in Example 5. Table 22, Table 23 and Table 24 show basic lens data of the zoom lens for projection in Example 8, aspherical coefficients, and specification for d-line and values of variable surface distances, respectively. FIG. 32, Sections A through L and FIG. 33, Sections A through L are aberration diagrams of the zoom lens for projection in Example 8. In Example 8, a reference projection distance is 119.14, and a closest projection distance is 58.59.

TABLE 22

| Si | Ri | Di | Ndj | vdj |
|---|---|---|---|---|
| *1 | −6.2267 | 0.6104 | 1.49100 | 57.58 |
| *2 | −36.5778 | 0.4517 | | |
| 3 | 5.3582 | 0.2615 | 1.74400 | 44.78 |
| 4 | 2.7214 | 1.5321 | | |
| 5 | −17.3513 | 0.3488 | 1.77250 | 49.60 |
| 6 | 3.8361 | DD[6] | | |
| 7 | 13.3756 | 0.3489 | 1.74400 | 44.78 |
| 8 | 4.7802 | DD[8] | | |
| 9 | 8.1403 | 0.3558 | 1.51742 | 52.43 |
| 10 | 26.9236 | DD[10] | | |
| 11 | 16.3891 | 0.6305 | 1.69895 | 30.13 |
| 12 | −11.3164 | 1.2532 | | |
| 13 | 7.2775 | 0.9414 | 1.51633 | 64.14 |
| 14 | −6.6917 | 0.2439 | | |
| 15 | −6.3449 | 0.2180 | 1.61800 | 63.33 |
| 16 | 2.9047 | 0.8210 | 1.51742 | 52.43 |
| 17 | −6890.5782 | DD[17] | | |
| 18 | 6.0517 | 0.3489 | 1.80518 | 25.42 |
| 19 | 3.4371 | 0.6839 | 1.48749 | 70.23 |
| 20 | −5.5529 | DD[20] | | |
| 21 | 4.3158 | 0.2179 | 1.51633 | 64.14 |
| 22 | 10.6146 | 0.3959 | | |
| 23 | −3.5020 | 0.3053 | 1.77250 | 49.60 |
| 24 | 2.2112 | 0.0585 | | |
| 25 | 2.8183 | 0.4326 | 1.51633 | 64.14 |
| 26 | −19.6823 | 0.0496 | | |
| 27 | 2.4723 | 0.7110 | 1.48749 | 70.23 |
| 28 | −3.0065 | 0.0261 | | |
| 29 | 5.8387 | 0.2180 | 1.77250 | 49.60 |
| 30 | 1.5274 | 0.0131 | | |
| 31 | 1.5669 | 0.6247 | 1.48749 | 70.23 |
| 32 | −8.7192 | 3.7235 | | |
| 33 | ∞ | 0.2616 | 1.50847 | 61.19 |
| 34 | ∞ | | | |

TABLE 23

| SURFACE NUMBER | 1 | 2 |
|---|---|---|
| KA | 8.00000E−01 | −2.79783E+00 |
| A3 | 2.76080E−02 | 3.07921E−02 |
| A4 | 2.21607E−02 | 1.38200E−02 |
| A5 | −9.46935E−03 | −3.57656E−03 |
| A6 | 7.06169E−04 | −6.38538E−04 |
| A7 | 2.22997E−04 | −2.48566E−04 |
| A8 | −1.60961E−05 | 9.61162E−05 |
| A9 | −5.86617E−06 | 2.36668E−05 |
| A10 | 2.00226E−07 | −1.22441E−07 |
| A11 | 1.09223E−07 | −1.31341E−06 |
| A12 | 6.57437E−09 | −4.18613E−07 |
| A13 | −2.15882E−09 | 9.86612E−08 |

TABLE 24

| | PROJECTION DISTANCE = ∞ | | |
|---|---|---|---|
| | WIDE-ANGLE END | MIDDLE | TELEPHOTO END |
| ZOOM RATIO | 1.000 | 1.118 | 1.250 |
| f' | 1.000 | 1.118 | 1.250 |
| FNo. | 2.40 | 2.40 | 2.40 |
| 2ω[°] | 99.4 | 92.4 | 85.6 |
| DD[6] | 2.1976 | 2.1976 | 2.1976 |
| DD[8] | 1.0249 | 1.0249 | 1.0249 |
| DD[10] | 1.3187 | 0.8178 | 0.4233 |
| DD[17] | 2.5743 | 2.2491 | 1.8030 |
| DD[20] | 0.0429 | 0.8690 | 1.7095 |

| | PROJECTION DISTANCE = 119.14 | | | PROJECTION DISTANCE = 58.59 | | |
|---|---|---|---|---|---|---|
| | WIDE-ANGLE END | MIDDLE | TELEPHOTO END | WIDE-ANGLE END | MIDDLE | TELEPHOTO END |
| ZOOM RATIO | 1.000 | 1.118 | 1.250 | 1.000 | 1.118 | 1.250 |
| f' | 1.002 | 1.120 | 1.252 | 1.004 | 1.122 | 1.254 |
| FNo. | 2.40 | 2.40 | 2.40 | 2.40 | 2.40 | 2.40 |
| 2ω[°] | 99.2 | 92.2 | 85.2 | 99.0 | 92.0 | 85.0 |
| DD[6] | 1.9300 | 1.9300 | 1.9300 | 1.6098 | 1.6098 | 1.6098 |
| DD[8] | 0.8862 | 0.8862 | 0.8862 | 0.6975 | 0.6975 | 0.6975 |
| DD[10] | 1.7249 | 1.2240 | 0.8296 | 2.2339 | 1.7330 | 1.3385 |

Example 9

Figure 12:
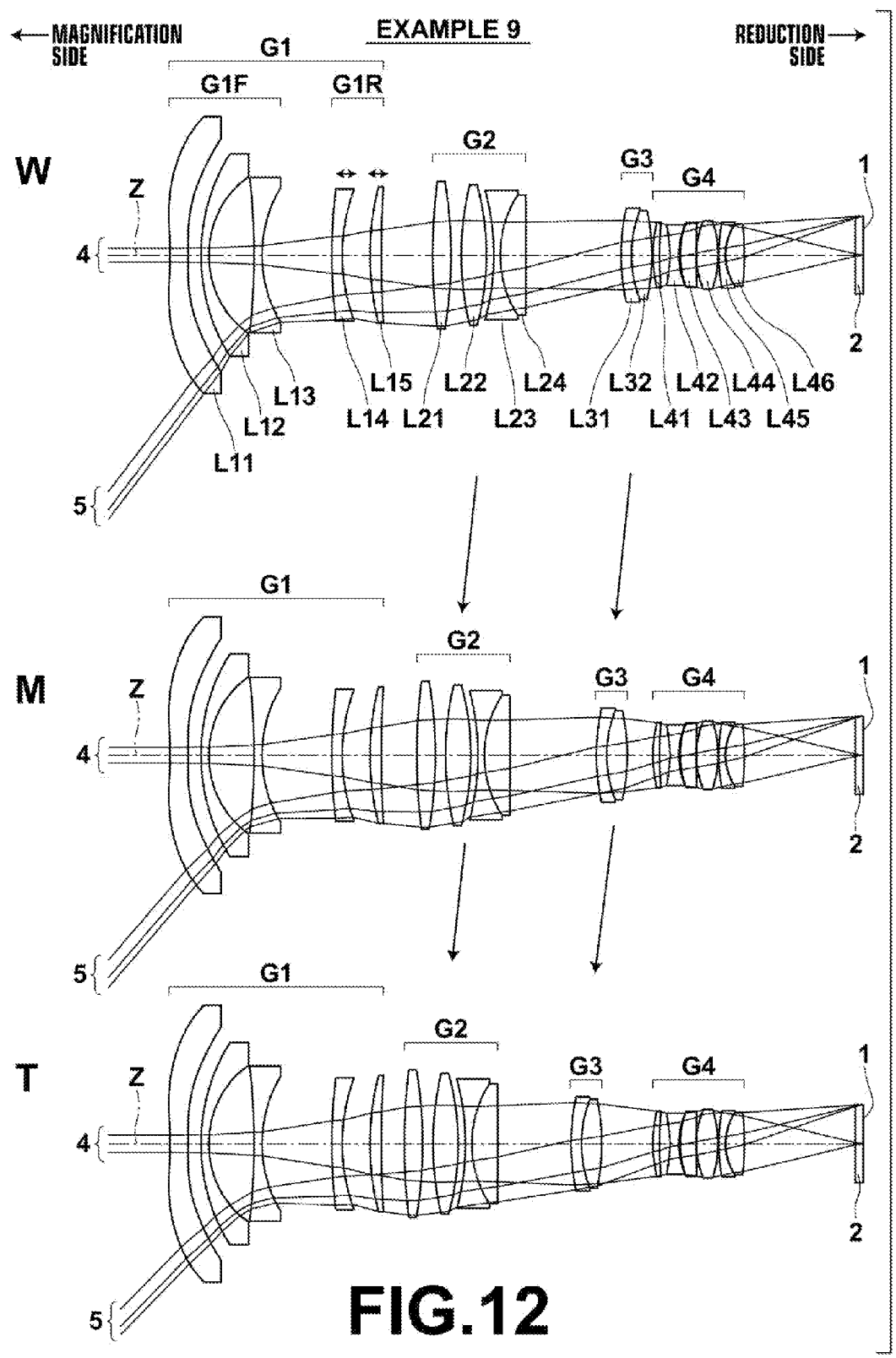
FIG. 12 is a cross section illustrating the lens configuration of a zoom lens for projection in Example 9 of the present invention and paths of rays.

FIG. 12 is a diagram illustrating a cross section of the zoom lens for projection in Example 9 and paths of rays. In the zoom lens for projection of Example 9, the group configuration, the schematic configuration of each lens group and a focusing method are almost similar to the zoom lens for projection in Example 5. Table 25, Table 26 and Table 27 show basic lens data of the zoom lens for projection in Example 9, aspherical coefficients, and specification for d-line and values of variable surface distances, respectively. FIG. 34, Sections A through L and FIG. 35, Sections A through L are aberration diagrams of the zoom lens for projection in Example 9. In Example 9, a reference projection distance is 142.38, and a closest projection distance is 58.9.

TABLE 25

| Si | Ri | Di | Ndj | vdj |
|---|---|---|---|---|
| *1 | −6.2552 | 0.6131 | 1.49100 | 57.58 |
| *2 | −36.7451 | 0.4379 | | |
| 3 | 5.3268 | 0.2627 | 1.74400 | 44.78 |
| 4 | 2.7779 | 1.5187 | | |
| 5 | −19.1614 | 0.2686 | 1.77250 | 49.60 |
| 6 | 3.6375 | DD[6] | | |
| 7 | 14.5241 | 0.3504 | 1.74400 | 44.78 |
| 8 | 5.0878 | DD[8] | | |
| 9 | 7.6129 | 0.3812 | 1.51742 | 52.43 |
| 10 | 30.7788 | DD[10] | | |
| 11 | 15.9250 | 0.6208 | 1.69895 | 30.13 |
| 12 | −12.1457 | 0.3454 | | |
| 13 | 8.2722 | 0.8465 | 1.51633 | 64.14 |
| 14 | −7.2779 | 0.2450 | | |
| 15 | −6.7722 | 0.2189 | 1.61800 | 63.33 |
| 16 | 3.0891 | 0.8652 | 1.51742 | 52.43 |
| 17 | −240.1098 | DD[17] | | |

TABLE 25-continued

| Si | Ri | Di | Ndj | vdj |
|---|---|---|---|---|
| 18 | 6.0738 | 0.3504 | 1.80518 | 25.42 |
| 19 | 3.3777 | 0.6832 | 1.48749 | 70.23 |
| 20 | −5.8123 | DD[20] | | |
| 21 | 3.8371 | 0.2189 | 1.51633 | 64.14 |
| 22 | 10.0217 | 0.3464 | | |
| 23 | −3.8547 | 0.3067 | 1.77250 | 49.60 |
| 24 | 2.1189 | 0.0498 | | |
| 25 | 2.5633 | 0.5301 | 1.51633 | 64.14 |
| 26 | 22.0419 | 0.0132 | | |
| 27 | 2.4721 | 0.7229 | 1.48749 | 70.23 |
| 28 | −3.0536 | 0.0262 | | |
| 29 | 4.9187 | 0.2189 | 1.77250 | 49.60 |
| 30 | 1.5246 | 0.0132 | | |
| 31 | 1.5642 | 0.6269 | 1.48749 | 70.23 |
| 32 | −8.7591 | 3.7401 | | |
| 33 | ∞ | 0.2628 | 1.50847 | 61.19 |
| 34 | ∞ | | | |

TABLE 26

| SURFACE NUMBER | 1 | 2 |
|---|---|---|
| KA | 8.00000E−01 | −2.79783E+00 |
| A3 | 2.80299E−02 | 3.08611E−02 |
| A4 | 2.18574E−02 | 1.39766E−02 |
| A5 | −9.28485E−03 | −3.46566E−03 |
| A6 | 6.92518E−04 | −6.29294E−04 |
| A7 | 2.16638E−04 | −2.45412E−04 |
| A8 | −1.57617E−05 | 9.20796E−05 |
| A9 | −5.69860E−06 | 2.25762E−05 |
| A10 | 1.90289E−07 | −1.63752E−07 |
| A11 | 1.05039E−07 | −1.25281E−06 |
| A12 | 6.99410E−09 | −3.91652E−07 |
| A13 | −2.08566E−09 | 9.36660E−08 |

TABLE 27

| | PROJECTION DISTANCE = ∞ | | |
|---|---|---|---|
| | WIDE-ANGLE END | MIDDLE | TELEPHOTO END |
| ZOOM RATIO | 1.000 | 1.118 | 1.250 |
| f′ | 1.000 | 1.118 | 1.250 |
| FNo. | 2.40 | 2.40 | 2.40 |
| 2ω[°] | 99.6 | 92.6 | 85.8 |
| DD[6] | 2.3441 | 2.3441 | 2.3441 |
| DD[8] | 0.9372 | 0.9372 | 0.9372 |
| DD[10] | 1.7239 | 1.1930 | 0.7680 |
| DD[17] | 3.2030 | 2.9051 | 2.4779 |
| DD[20] | 0.0367 | 0.8655 | 1.7178 |

| | PROJECTION DISTANCE = 142.38 | | | PROJECTION DISTANCE = 58.9 | | |
|---|---|---|---|---|---|---|
| | WIDE-ANGLE END | MIDDLE | TELEPHOTO END | WIDE-ANGLE END | MIDDLE | TELEPHOTO END |
| ZOOM RATIO | 1.000 | 1.118 | 1.250 | 1.000 | 1.118 | 1.250 |
| f′ | 1.003 | 1.121 | 1.254 | 1.006 | 1.124 | 1.257 |
| FNo. | 2.40 | 2.40 | 2.40 | 2.40 | 2.40 | 2.40 |
| 2ω[°] | 99.4 | 92.4 | 85.6 | 99.2 | 92.2 | 85.2 |
| DD[6] | 1.8873 | 1.8873 | 1.8873 | 1.3889 | 1.3889 | 1.3889 |
| DD[8] | 0.7703 | 0.7703 | 0.7703 | 0.5751 | 0.5751 | 0.5751 |
| DD[10] | 2.3476 | 1.8167 | 1.3916 | 3.0412 | 2.5103 | 2.0853 |

Example 10

Figure 13:
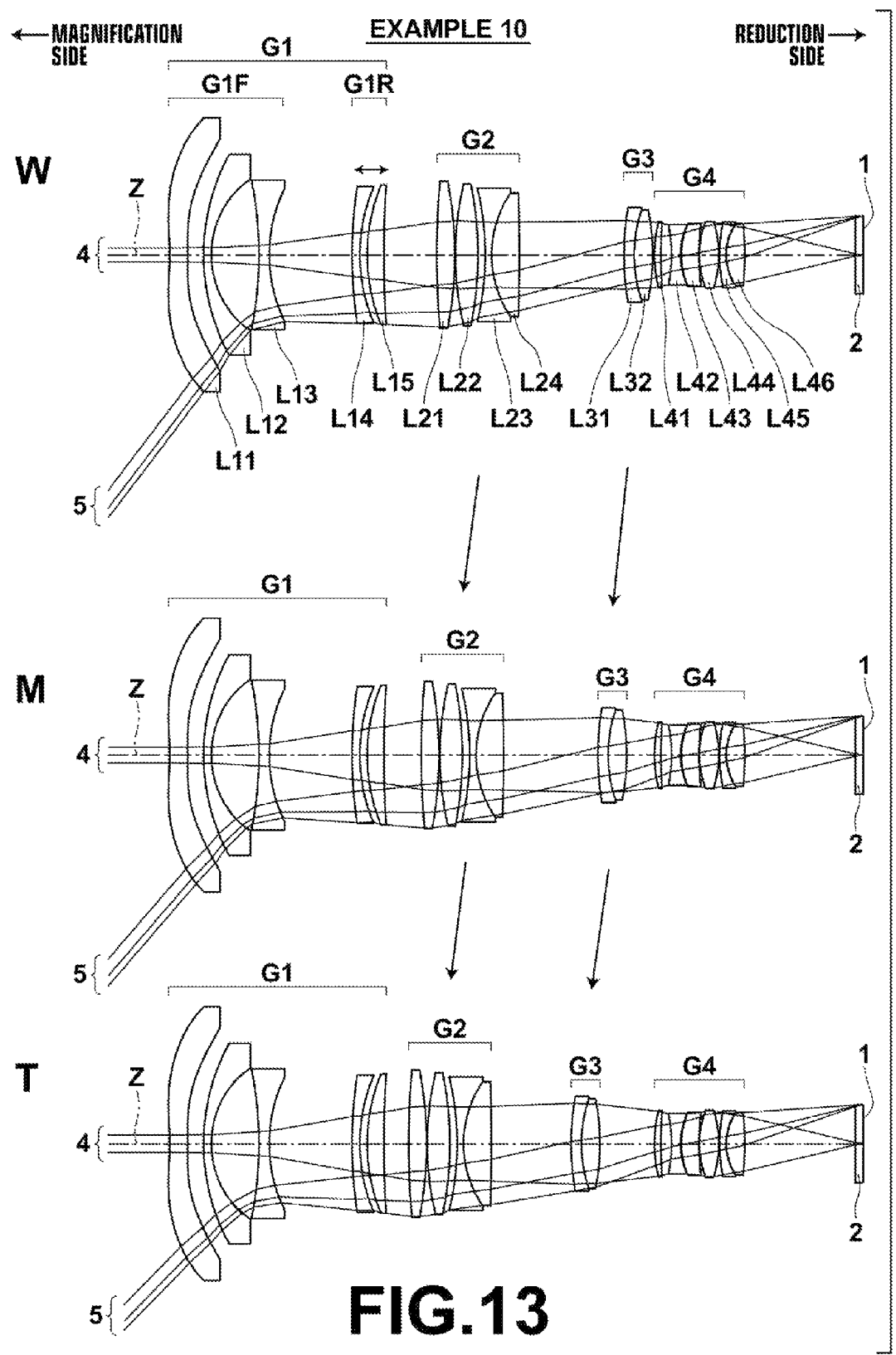
FIG. 13 is a cross section illustrating the lens configuration of a zoom lens for projection in Example 10 of the present invention and paths of rays.

FIG. 13 is a diagram illustrating a cross section of the zoom lens for projection in Example 10 and paths of rays. In the zoom lens for projection of Example 10, the group configuration and the schematic configuration of each lens group are almost similar to the zoom lens for projection in Example 5. However, the zoom lens for projection in Example 10 differs from Example 5 in adopting a focusing method in which lenses L14 and L15 are moved in an integrated manner during focusing. Table 28, Table 29 and Table 30 show basic lens data of the zoom lens for projection in Example 10, aspherical coefficients, and specification for d-line and values of variable surface distances, respectively. FIG. 36, Sections A through L and FIG. 37, Sections A through L are aberration diagrams of the zoom lens for projection in Example 10. In Example 10, a reference projection distance is 142.07, and a closest projection distance is 58.77.

TABLE 28

| Si | Ri | Di | Ndj | vdj |
|---|---|---|---|---|
| *1 | −6.2414 | 0.6118 | 1.49100 | 57.58 |
| *2 | −36.6640 | 0.5407 | | |
| 3 | 5.8111 | 0.2621 | 1.74400 | 44.78 |
| 4 | 2.6629 | 1.5984 | | |
| 5 | −10.3993 | 0.3497 | 1.77250 | 49.60 |
| 6 | 4.2055 | DD[6] | | |
| 7 | 12.3950 | 0.2621 | 1.74400 | 44.78 |
| 8 | 4.8156 | 0.2489 | | |
| 9 | 5.0449 | 0.5643 | 1.51742 | 52.43 |
| 10 | 31.9401 | DD[10] | | |
| 11 | 23.0376 | 0.5991 | 1.75520 | 27.51 |
| 12 | −10.8084 | 0.0262 | | |
| 13 | 8.4162 | 0.7582 | 1.51633 | 64.14 |
| 14 | −9.7229 | 0.2444 | | |
| 15 | −7.8137 | 0.2184 | 1.61800 | 63.33 |

TABLE 28-continued

| Si | Ri | Di | Ndj | vdj |
|---|---|---|---|---|
| 16 | 3.0445 | 0.9358 | 1.51633 | 64.14 |
| 17 | −55.0620 | DD[17] | | |
| 18 | 7.7223 | 0.3496 | 1.80518 | 25.42 |
| 19 | 3.9666 | 0.6165 | 1.51633 | 64.14 |
| 20 | −6.3298 | DD[20] | | |
| 21 | 3.7615 | 0.2184 | 1.51633 | 64.14 |
| 22 | 11.3445 | 0.3547 | | |
| 23 | −4.0971 | 0.3060 | 1.77250 | 49.60 |
| 24 | 1.9902 | 0.0262 | | |
| 25 | 2.1758 | 0.5928 | 1.51633 | 64.14 |
| 26 | 6.7273 | 0.0130 | | |
| 27 | 2.5006 | 0.6554 | 1.48749 | 70.23 |
| 28 | −3.0298 | 0.0262 | | |
| 29 | 4.4680 | 0.2184 | 1.78590 | 44.20 |
| 30 | 1.5567 | 0.0131 | | |
| 31 | 1.5995 | 0.6144 | 1.51633 | 64.14 |
| 32 | −8.7398 | 3.7310 | | |
| 33 | ∞ | 0.2622 | 1.50847 | 61.19 |
| 34 | ∞ | | | |

TABLE 29

| SURFACE NUMBER | 1 | 2 |
|---|---|---|
| KA | 8.00000E−01 | −2.79783E+00 |
| A3 | 2.90389E−02 | 3.38883E−02 |
| A4 | 2.20476E−02 | 1.16711E−02 |
| A5 | −9.57729E−03 | −2.71694E−03 |
| A6 | 7.71011E−04 | −6.89028E−04 |
| A7 | 2.16446E−04 | −2.73706E−04 |
| A8 | −1.66417E−05 | 9.24701E−05 |
| A9 | −5.83316E−06 | 2.49427E−05 |
| A10 | 1.91692E−07 | 1.09299E−06 |
| A11 | 1.09708E−07 | −1.90353E−06 |
| A12 | 6.45575E−09 | −3.75364E−07 |
| A13 | −2.14238E−09 | 1.05684E−07 |

TABLE 30

| PROJECTION DISTANCE = ∞ | | | |
|---|---|---|---|
| | WIDE-ANGLE END | MIDDLE | TELEPHOTO END |
| ZOOM RATIO | 1.000 | 1.118 | 1.250 |
| f' | 1.000 | 1.118 | 1.250 |
| FNo. | 2.40 | 2.40 | 2.40 |
| 2ω[°] | 99.6 | 92.6 | 85.6 |
| DD[6] | 2.7849 | 2.7849 | 2.7849 |
| DD[10] | 1.7772 | 1.2527 | 0.8304 |
| DD[17] | 3.5208 | 3.1708 | 2.6931 |
| DD[20] | 0.0622 | 0.9367 | 1.8367 |

| | PROJECTION DISTANCE = 142.07 | | | PROJECTION DISTANCE = 58.77 | | |
|---|---|---|---|---|---|---|
| | WIDE-ANGLE END | MIDDLE | TELEPHOTO END | WIDE-ANGLE END | MIDDLE | TELEPHOTO END |
| ZOOM RATIO | 1.000 | 1.118 | 1.250 | 1.000 | 1.118 | 1.250 |
| f' | 1.001 | 1.119 | 1.251 | 1.002 | 1.121 | 1.253 |
| FNo. | 2.40 | 2.40 | 2.40 | 2.40 | 2.40 | 2.40 |
| 2ω[°] | 99.4 | 92.4 | 85.2 | 99.2 | 92.0 | 85.0 |
| DD[6] | 2.3433 | 2.3433 | 2.3433 | 1.6448 | 1.6448 | 1.6448 |
| DD[10] | 2.2188 | 1.6944 | 1.2720 | 2.9173 | 2.3929 | 1.9705 |

Example 11

Figure 14:
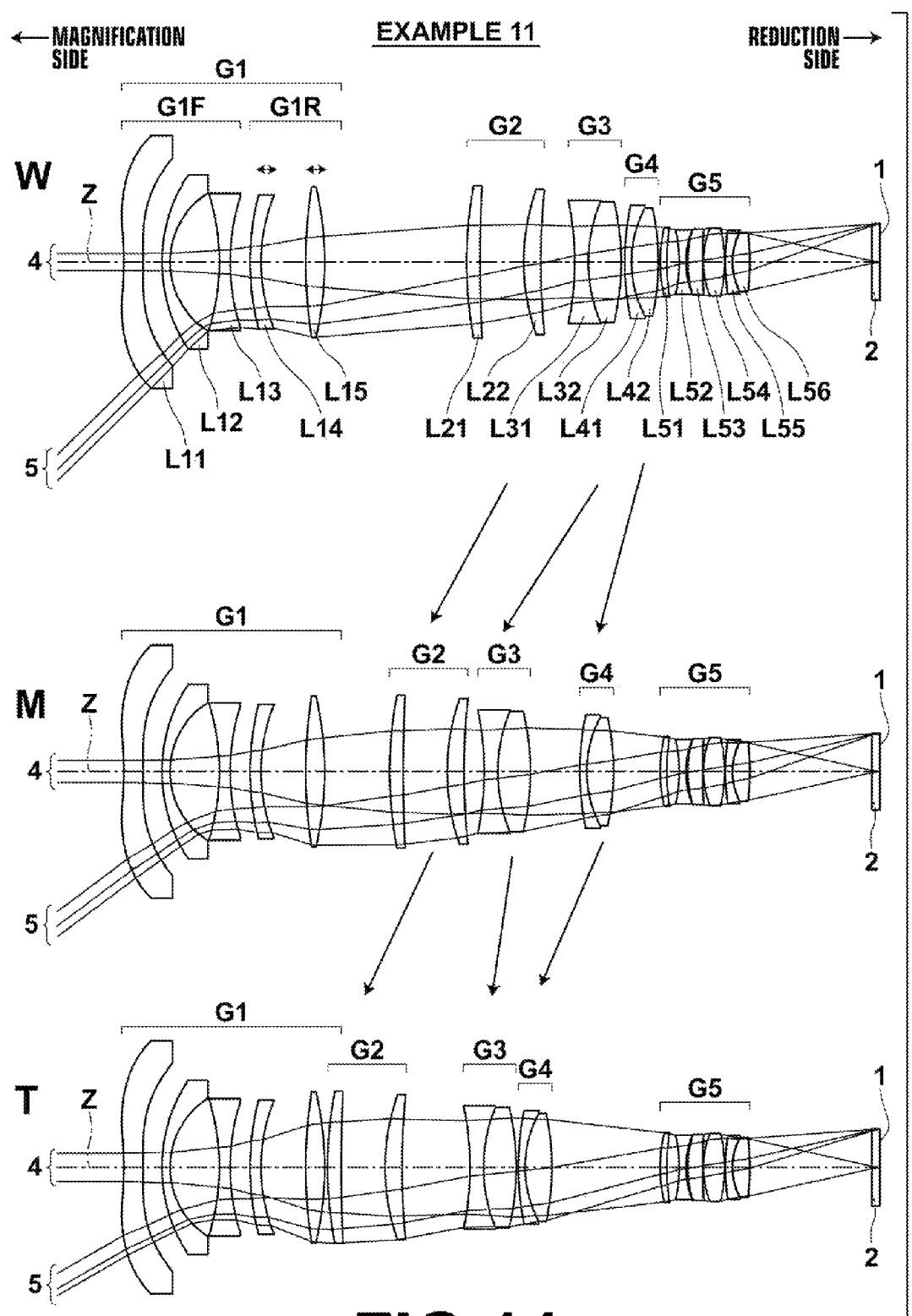
FIG. 14 is a cross section illustrating the lens configuration of a zoom lens for projection in Example 11 of the present invention and paths of rays.
Figure 39:
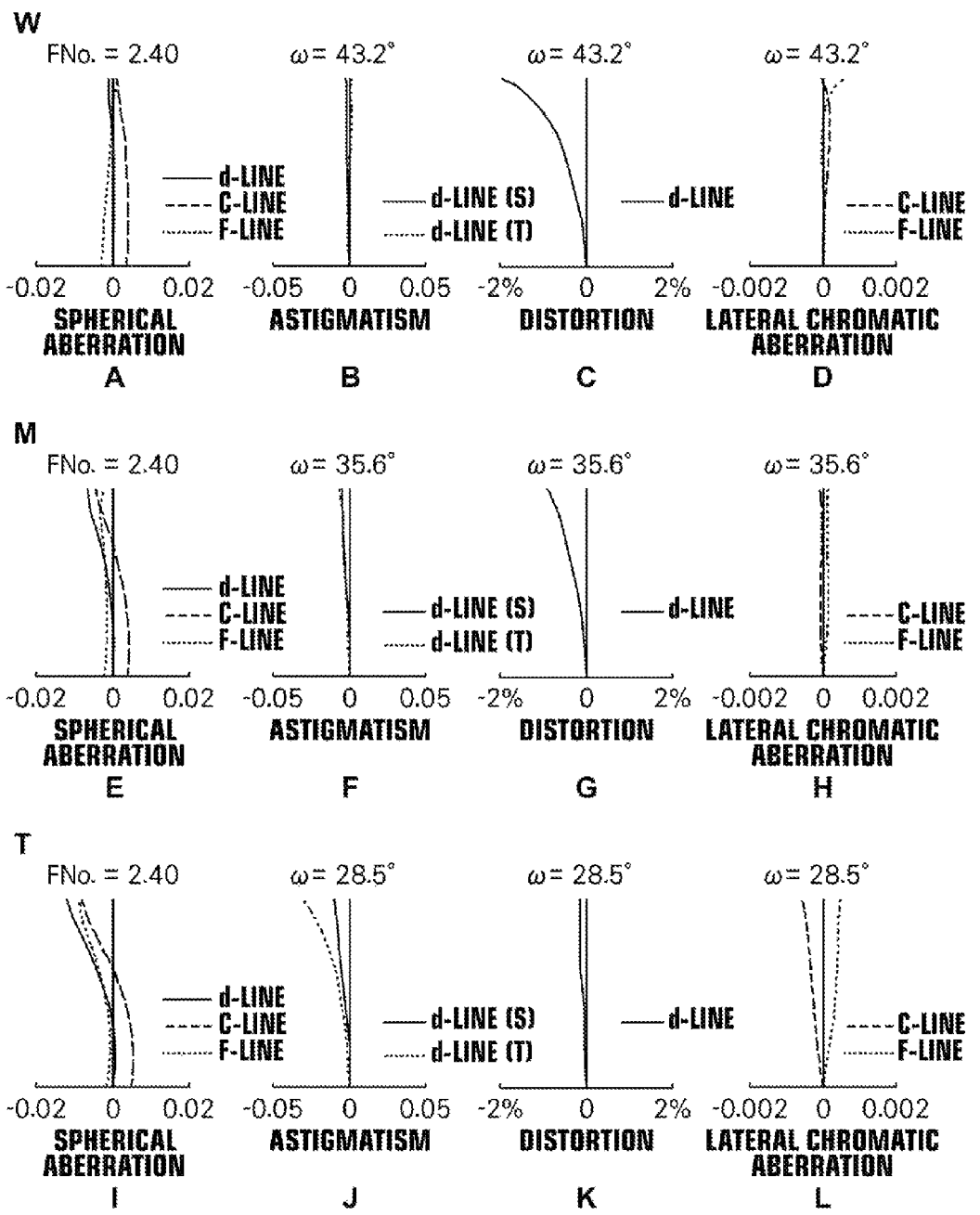
FIG. 39, Sections A through L are aberration diagrams of the zoom lens for projection in Example 11 of the present invention when a projection distance is a closest distance.

FIG. 14 is a diagram illustrating a cross section of the zoom lens for projection in Example 11 and paths of rays. In the zoom lens for projection of Example 11, the group configuration, the schematic configuration of each lens group and the focusing method almost similar to the zoom lens for projection in Example 4. Table 31, Table 32 and Table 33 show basic lens data of the zoom lens for projection in Example 11, aspherical coefficients, and specification for d-line and values of variable surface distances, respectively. FIG. 38, Sections A through L and FIG. 39, Sections A through L are aberration diagrams of the zoom lens for projection in Example 11. In Example 11, a reference projection distance is 119.1, and a closest projection distance is 58.57.

TABLE 31

| Si | Ri | Di | Ndj | vdj |
|---|---|---|---|---|
| *1 | −4.9795 | 0.4881 | 1.49100 | 57.58 |
| *2 | −29.2515 | 0.4808 | | |
| 3 | 3.7600 | 0.2092 | 1.74400 | 44.78 |
| 4 | 1.9711 | 1.2620 | | |
| 5 | −5.4913 | 0.2773 | 1.77250 | 49.60 |
| 6 | 5.0789 | DD[6] | | |
| 7 | 6.6073 | 0.2770 | 1.74400 | 44.78 |
| 8 | 4.2087 | DD[8] | | |
| 9 | 11.3905 | 0.4882 | 1.72342 | 37.95 |
| 10 | −7.7356 | DD[10] | | |
| 11 | 9.5979 | 0.3474 | 1.75520 | 27.51 |
| 12 | 36.4568 | 1.1220 | | |
| 13 | 5.1914 | 0.4340 | 1.51633 | 64.14 |
| 14 | 17.0654 | DD[14] | | |
| 15 | −7.1412 | 0.3487 | 1.65844 | 50.88 |
| 16 | 3.7422 | 0.8375 | 1.58913 | 61.14 |
| 17 | −6.1503 | DD[17] | | |
| 18 | 6.5879 | 0.1743 | 1.80518 | 25.42 |
| 19 | 2.7405 | 0.6847 | 1.48749 | 70.23 |
| 20 | −6.0402 | DD[20] | | |
| 21 | 3.4078 | 0.1742 | 1.75520 | 27.51 |
| 22 | 6.1265 | 0.3100 | | |
| 23 | −3.5731 | 0.1743 | 1.77250 | 49.60 |
| 24 | 2.0411 | 0.0480 | | |
| 25 | 2.6656 | 0.3818 | 1.64769 | 33.79 |
| 26 | 14.6048 | 0.0104 | | |
| 27 | 2.0865 | 0.5465 | 1.51633 | 64.14 |
| 28 | −3.4214 | 0.0209 | | |
| 29 | 4.7282 | 0.1743 | 1.83400 | 37.16 |
| 30 | 1.4630 | 0.0105 | | |
| 31 | 1.5184 | 0.4373 | 1.48749 | 70.23 |
| 32 | −6.9731 | 3.1243 | | |
| 33 | ∞ | 0.2092 | 1.50847 | 61.19 |
| 34 | ∞ | | | |

TABLE 32

| SURFACE NUMBER | 1 | 2 |
|---|---|---|
| KA | 8.00000E−01 | −2.79783E+00 |
| A3 | 1.07921E−02 | 1.52010E−02 |
| A4 | 6.11282E−02 | 4.20044E−02 |
| A5 | −2.44055E−02 | −9.34597E−03 |
| A6 | 1.66534E−03 | −5.94563E−04 |
| A7 | 5.80072E−04 | −1.26700E−03 |
| A8 | 4.78867E−05 | 2.43053E−04 |
| A9 | −2.43595E−05 | 1.40379E−04 |
| A10 | −2.47283E−07 | 3.39685E−05 |
| A11 | −2.18507E−06 | −1.54884E−05 |
| A12 | 6.93448E−07 | −4.72097E−06 |
| A13 | −2.27566E−08 | 1.19544E−06 |

TABLE 33

| | PROJECTION DISTANCE = ∞ | | |
|---|---|---|---|
| | WIDE-ANGLE END | MIDDLE | TELEPHOTO END |
| ZOOM RATIO | 1.000 | 1.304 | 1.700 |
| f | 1.000 | 1.304 | 1.700 |
| FNo. | 2.40 | 2.40 | 2.40 |
| 2ω[°] | 87.0 | 71.8 | 58.0 |
| DD[6] | 0.5132 | 0.5132 | 0.5132 |
| DD[8] | 1.1404 | 1.1404 | 1.1404 |
| DD[10] | 3.6225 | 1.6579 | 0.0731 |
| DD[14] | 0.8683 | 0.5122 | 1.7345 |
| DD[17] | 0.0915 | 1.2669 | 0.0565 |
| DD[20] | 0.0471 | 1.1925 | 2.7652 |

| | PROJECTION DISTANCE = 119.1 | | | PROJECTION DISTANCE = 58.57 | | |
|---|---|---|---|---|---|---|
| | WIDE-ANGLE END | MIDDLE | TELEPHOTO END | WIDE-ANGLE END | MIDDLE | TELEPHOTO END |
| ZOOM RATIO | 1.000 | 1.304 | 1.700 | 1.000 | 1.304 | 1.700 |
| f | 1.002 | 1.305 | 1.702 | 1.003 | 1.307 | 1.704 |
| FNo. | 2.40 | 2.40 | 2.40 | 2.40 | 2.40 | 2.40 |
| 2ω[°] | 86.8 | 71.4 | 57.4 | 86.4 | 71.2 | 57.0 |
| DD[6] | 0.4645 | 0.4645 | 0.4645 | 0.4265 | 0.4265 | 0.4265 |
| DD[8] | 1.1869 | 1.1869 | 1.1869 | 1.2265 | 1.2265 | 1.2265 |
| DD[10] | 3.6248 | 1.6601 | 0.0754 | 3.6231 | 1.6585 | 0.0737 |

Example 12

Figure 15:
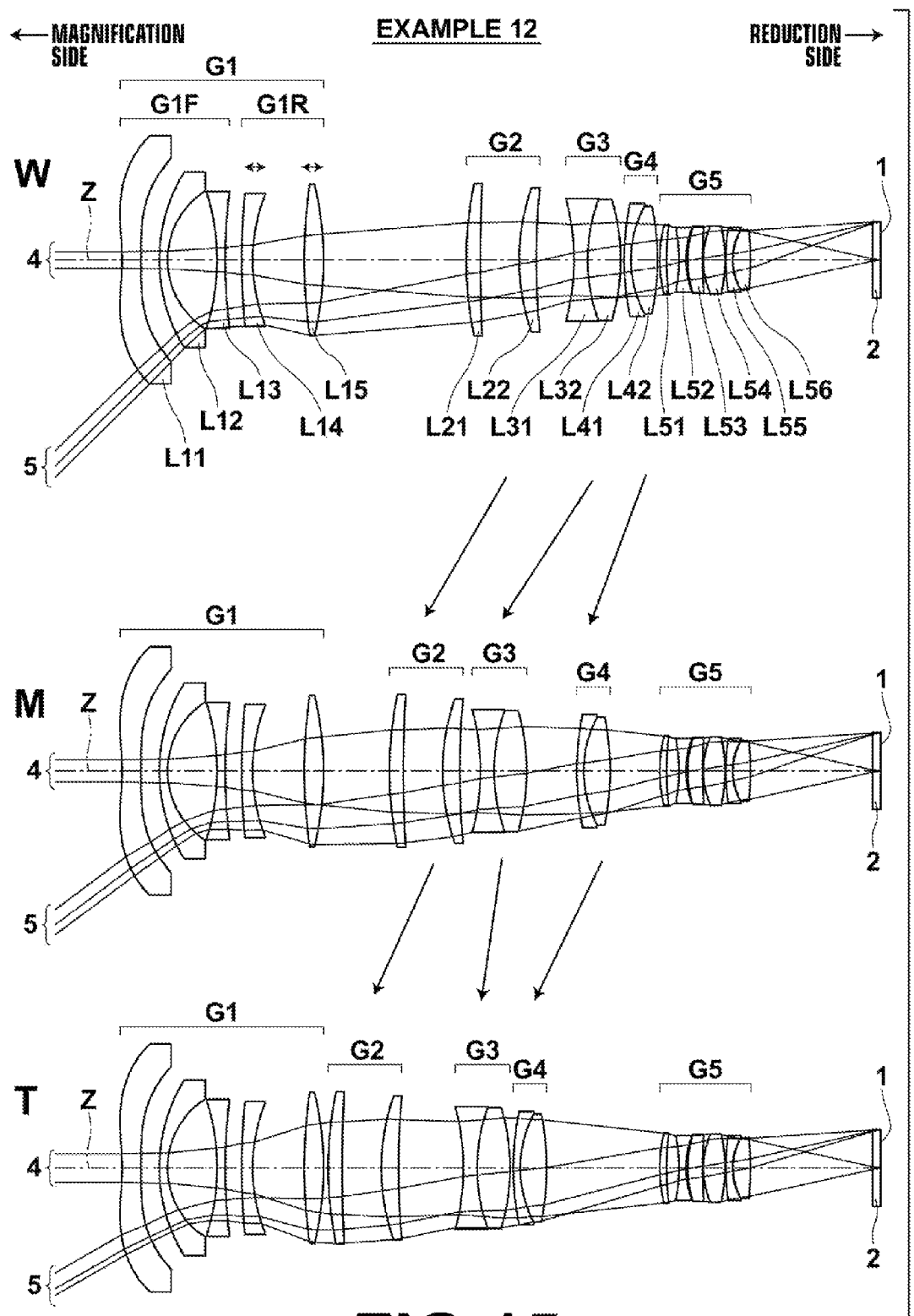
FIG. 15 is a cross section illustrating the lens configuration of a zoom lens for projection in Example 12 of the present invention and paths of rays.
Figure 40:
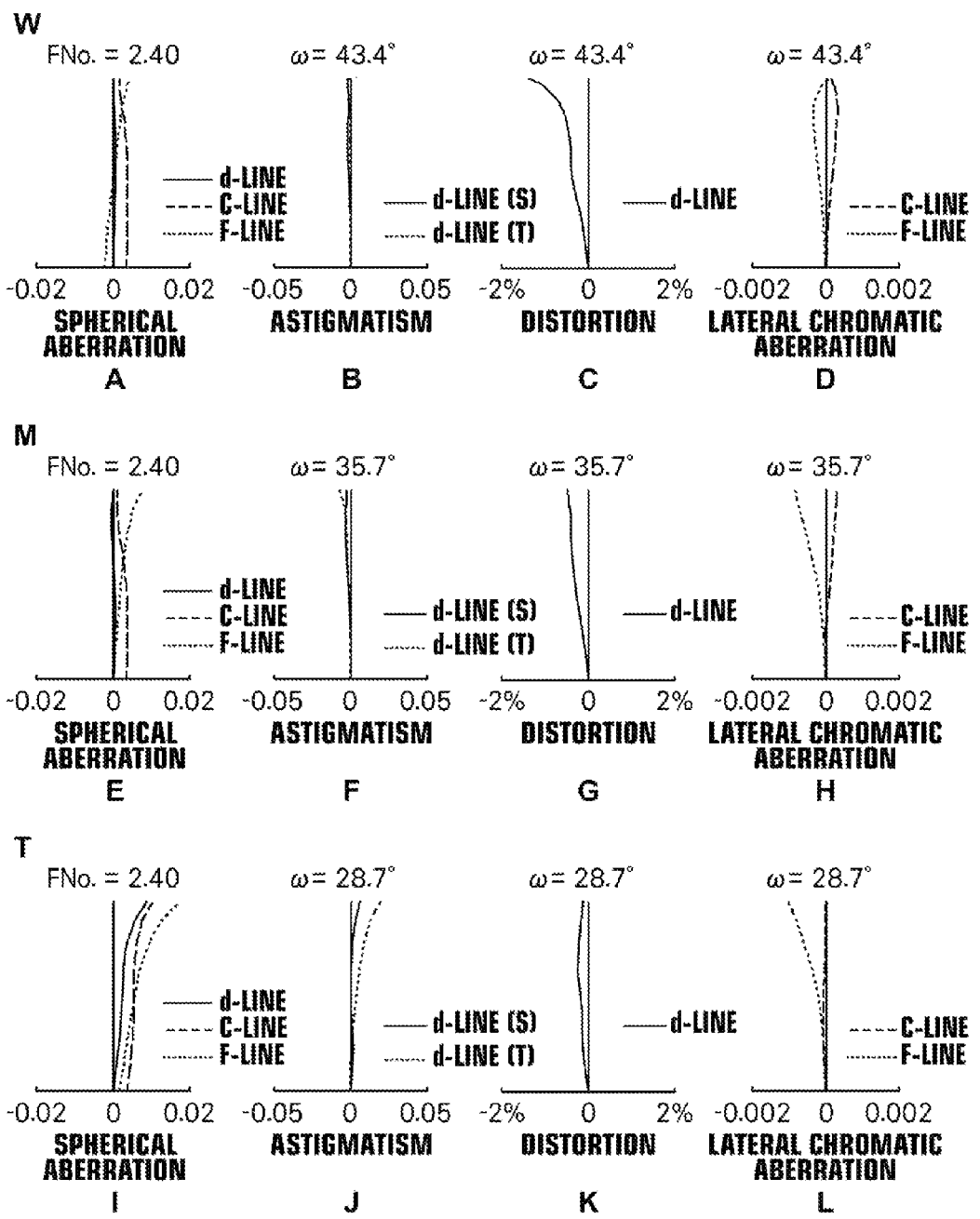
FIG. 40, Sections A through L are aberration diagrams of the zoom lens for projection in Example 12 of the present invention when a projection distance is a reference distance.
Figure 41:
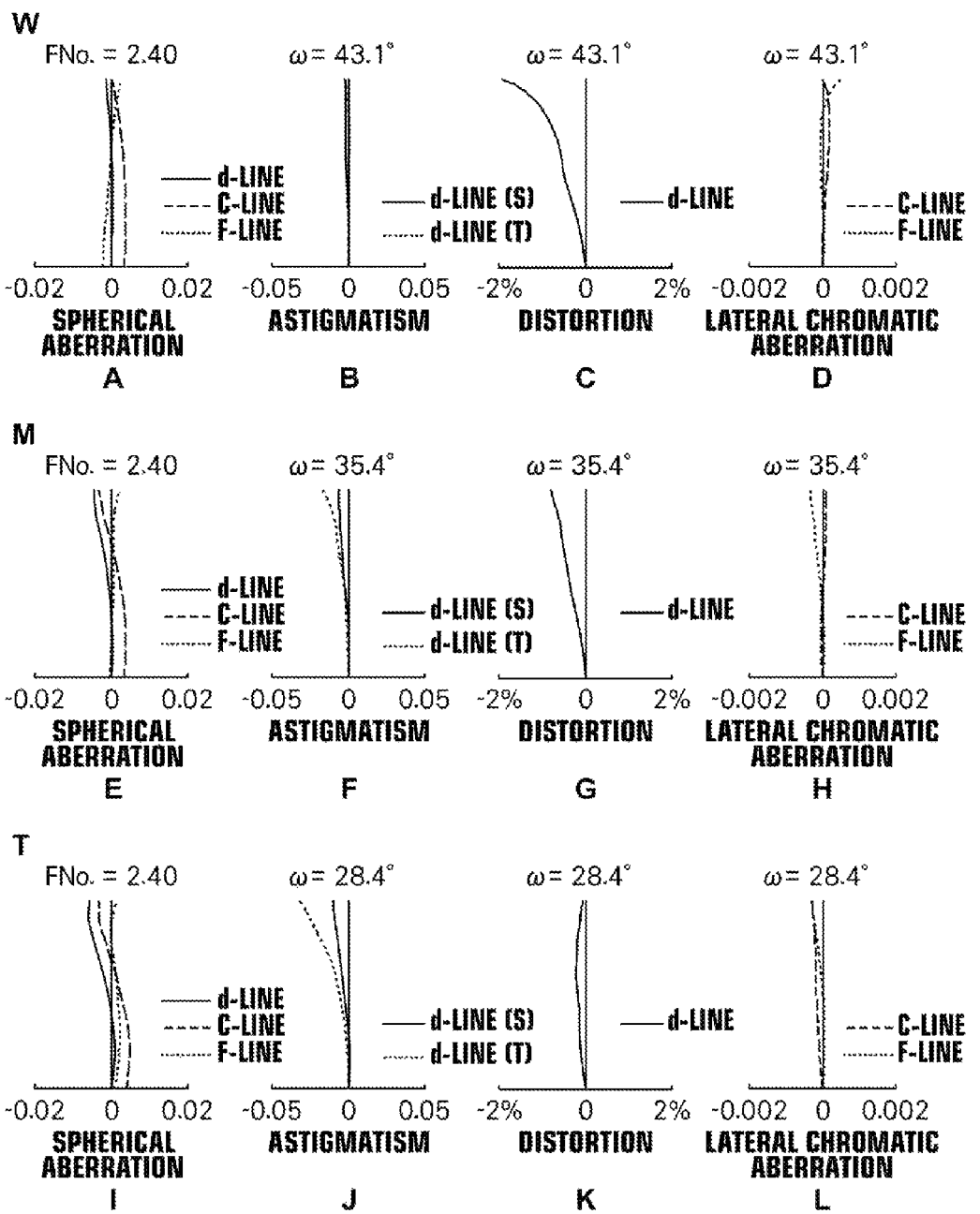
FIG. 41, Sections A through L are aberration diagrams of the zoom lens for projection in Example 12 of the present invention when a projection distance is a closest distance.

FIG. 15 is a diagram illustrating a cross section of the zoom lens for projection in Example 12 and paths of rays. In the zoom lens for projection of Example 12, the group configuration, the schematic configuration of each lens group and the focusing method almost similar to the zoom lens for projection in Example 4. Table 34, Table 35 and Table 36 show basic lens data of the zoom lens for projection in Example 12, aspherical coefficients, and specification for d-line and values of variable surface distances, respectively. FIG. 40, Sections A through L and FIG. 41, Sections A through L are aberration diagrams of the zoom lens for projection in Example 12. In Example 12, a reference projection distance is 119.04, and a closest projection distance is 58.55.

TABLE 34

| Si | Ri | Di | Ndj | vdj |
|---|---|---|---|---|
| *1 | −4.9772 | 0.4879 | 1.49100 | 57.58 |
| *2 | −29.2380 | 0.4596 | | |
| 3 | 3.9868 | 0.2090 | 1.74400 | 44.78 |
| 4 | 1.9623 | 1.2658 | | |
| 5 | −5.3152 | 0.2090 | 1.77250 | 49.60 |
| 6 | 13.2288 | DD[6] | | |
| 7 | 16.5895 | 0.2788 | 1.74400 | 44.78 |
| 8 | 4.1944 | DD[8] | | |
| 9 | 12.5852 | 0.4879 | 1.72342 | 37.95 |
| 10 | −7.5713 | DD[10] | | |
| 11 | 8.9101 | 0.3535 | 1.75520 | 27.51 |
| 12 | 31.9941 | 0.9979 | | |
| 13 | 5.2105 | 0.4350 | 1.51633 | 64.14 |
| 14 | 17.8677 | DD[14] | | |
| 15 | −5.5116 | 0.3485 | 1.65844 | 50.88 |
| 16 | 4.1858 | 0.8371 | 1.58913 | 61.14 |
| 17 | −5.0642 | DD[17] | | |

TABLE 34-continued

| Si | Ri | Di | Ndj | vdj |
|---|---|---|---|---|
| 18 | 6.5651 | 0.1742 | 1.80518 | 25.42 |
| 19 | 2.7107 | 0.6723 | 1.48749 | 70.23 |
| 20 | −6.4176 | DD[20] | | |
| 21 | 3.4060 | 0.1758 | 1.75520 | 27.51 |
| 22 | 6.0219 | 0.3160 | | |
| 23 | −3.7602 | 0.1743 | 1.77250 | 49.60 |
| 24 | 2.0273 | 0.0504 | | |
| 25 | 2.6802 | 0.3832 | 1.64769 | 33.79 |
| 26 | 20.6899 | 0.0104 | | |
| 27 | 2.0156 | 0.5501 | 1.51633 | 64.14 |
| 28 | −3.6246 | 0.0208 | | |
| 29 | 5.0353 | 0.1742 | 1.83400 | 37.16 |
| 30 | 1.4263 | 0.0105 | | |
| 31 | 1.4779 | 0.4448 | 1.48749 | 70.23 |
| 32 | −6.9697 | 3.1075 | | |
| 33 | ∞ | 0.2091 | 1.50847 | 61.19 |
| 34 | ∞ | | | |

TABLE 35

| SURFACE NUMBER | 1 | 2 |
|---|---|---|
| KA | 8.00000E−01 | −2.79783E+00 |
| A3 | 8.88629E−03 | 1.38954E−02 |
| A4 | 6.52304E−02 | 4.53365E−02 |
| A5 | −2.57746E−02 | −9.2S232E−03 |
| A6 | 1.67479E−03 | −9.48570E−04 |
| A7 | 6.42427E−04 | −1.43694E−03 |
| A8 | 6.29479E−05 | 3.24794E−04 |
| A9 | −2.86761E−05 | 1.84240E−04 |
| A10 | −8.02107E−07 | 3.40995E−05 |
| A11 | −1.73363E−06 | −2.13779E−05 |
| A12 | 3.51041E−07 | −7.69755E−06 |
| A13 | 4.67982E−08 | 2.27537E−06 |

TABLE 36

| | PROJECTION DISTANCE = ∞ | | |
|---|---|---|---|
| | WIDE-ANGLE END | MIDDLE | TELEPHOTO END |
| ZOOM RATIO | 1.000 | 1.304 | 1.700 |
| f | 1.000 | 1.304 | 1.700 |
| FNo. | 2.40 | 2.40 | 2.40 |
| 2ω[°] | 87.0 | 71.6 | 57.8 |
| DD[6] | 0.4195 | 0.4195 | 0.4195 |
| DD[8] | 1.3138 | 1.3138 | 1.3138 |
| DD[10] | 3.6342 | 1.6801 | 0.1213 |
| DD[14] | 0.9595 | 0.5251 | 1.6521 |
| DD[17] | 0.0904 | 1.2742 | 0.0904 |
| DD[20] | 0.0570 | 1.2618 | 2.8772 |

| | PROJECTION DISTANCE = 119.04 | | | PROJECTION DISTANCE = 58.55 | | |
|---|---|---|---|---|---|---|
| | WIDE-ANGLE END | MIDDLE | TELEPHOTO END | WIDE-ANGLE END | MIDDLE | TELEPHOTO END |
| ZOOM RATIO | 1.000 | 1.304 | 1.700 | 1.000 | 1.304 | 1.700 |
| f | 1.002 | 1.305 | 1.702 | 1.007 | 1.312 | 1.710 |
| FNo. | 2.40 | 2.40 | 2.40 | 2.40 | 2.40 | 2.40 |
| 2ω[°] | 86.8 | 71.4 | 57.4 | 86.2 | 70.8 | 56.8 |
| DD[6] | 0.3951 | 0.3951 | 0.3951 | 0.3008 | 0.3008 | 0.3008 |
| DD[8] | 1.3385 | 1.3385 | 1.3385 | 1.3903 | 1.3903 | 1.3903 |
| DD[10] | 3.6340 | 1.6799 | 0.1211 | 3.6764 | 1.7223 | 0.1635 |

Example 13

Figure 16:
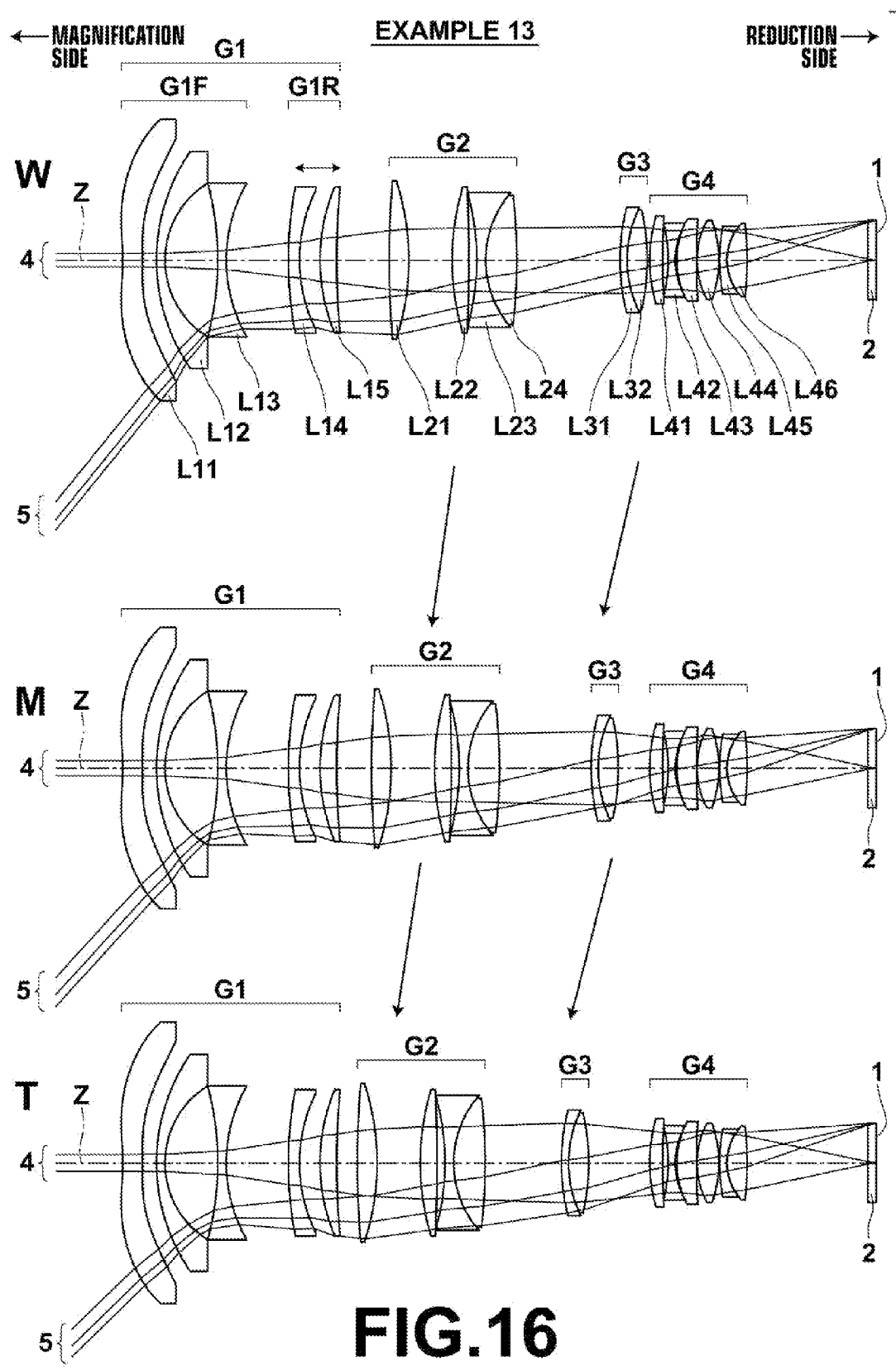
FIG. 16 is a cross section illustrating the lens configuration of a zoom lens for projection in Example 13 of the present invention and paths of rays.

FIG. 16 is a diagram illustrating a cross section of the zoom lens for projection in Example 13 and paths of rays. In the zoom lens for projection of Example 13, the group configuration, the schematic configuration of each lens group and the focusing method are almost similar to the zoom lens for projection in Example 10. Table 37, Table 38 and Table 39 show basic lens data of the zoom lens for projection in Example 13, aspherical coefficients, and specification for d-line and values of variable surface distances, respectively. FIG. 42, Sections A through L and FIG. 43, Sections A through L are aberration diagrams of the zoom lens for projection in Example 13. In Example 13, a reference projection distance is 143.28, and a closest projection distance is 59.27.

TABLE 37

| Si | Ri | Di | Ndj | vdj |
|---|---|---|---|---|
| *1 | −6.2945 | 0.6170 | 1.49100 | 57.58 |
| *2 | −36.9762 | 0.4407 | | |
| 3 | 5.5617 | 0.2645 | 1.74400 | 44.78 |
| 4 | 2.6583 | 1.6528 | | |
| 5 | −8.6232 | 0.2643 | 1.77250 | 49.60 |
| 6 | 4.4749 | DD[6] | | |
| 7 | 11.0059 | 0.3514 | 1.72342 | 37.95 |
| 8 | 4.6046 | 0.6376 | | |
| 9 | 5.4714 | 0.5242 | 1.51823 | 58.90 |
| 10 | 23.9645 | DD[10] | | |
| 11 | 26.2442 | 0.6169 | 1.59551 | 39.24 |
| 12 | −7.4143 | 1.3524 | | |
| 13 | 7.5453 | 0.5202 | 1.56732 | 42.82 |
| 14 | −45.7149 | 0.2465 | | |
| 15 | −7.1415 | 0.2756 | 1.62041 | 60.29 |
| 16 | 3.0009 | 0.9779 | 1.56732 | 42.82 |
| 17 | −16.4634 | DD[17] | | |

TABLE 37-continued

| Si | Ri | Di | Ndj | vdj |
|---|---|---|---|---|
| 18 | 6.2262 | 0.2210 | 1.80518 | 25.42 |
| 19 | 3.4352 | 0.6273 | 1.48749 | 70.23 |
| 20 | −6.4900 | DD[20] | | |
| 21 | 4.5489 | 0.4080 | 1.48749 | 70.23 |
| 22 | 23.5065 | 0.1685 | | |
| 23 | −4.4255 | 0.2217 | 1.77250 | 49.60 |
| 24 | 2.1217 | 0.0459 | | |
| 25 | 2.5152 | 0.6150 | 1.51633 | 64.14 |
| 26 | 19.3927 | 0.0177 | | |
| 27 | 2.4331 | 0.6805 | 1.48749 | 70.23 |
| 28 | −3.4247 | 0.0264 | | |
| 29 | 5.4413 | 0.2203 | 1.80400 | 46.57 |
| 30 | 1.5579 | 0.0133 | | |
| 31 | 1.6008 | 0.6231 | 1.51633 | 64.14 |
| 32 | −8.8143 | 3.7748 | | |
| 33 | ∞ | 0.2644 | 1.50847 | 61.19 |
| 34 | ∞ | | | |

TABLE 38

| SURFACE NUMBER | 1 | 2 |
|---|---|---|
| KA | 8.00000E−01 | −2.79783E+00 |
| A3 | 2.61886E−02 | 3.08680E−02 |
| A4 | 2.35097E−02 | 1.26733E−02 |
| A5 | −9.78920E−03 | −2.53609E−03 |
| A6 | 8.09980E−04 | −7.90044E−04 |
| A7 | 1.94939E−04 | −2.85301E−04 |
| A8 | −1.56162E−05 | 8.42156E−05 |
| A9 | −5.93326E−06 | 2.33884E−05 |
| A10 | 2.68336E−07 | 1.29574E−06 |
| A11 | 1.36726E−07 | −1.53123E−06 |
| A12 | 5.09739E−10 | −2.80046E−07 |
| A13 | −1.82143E−09 | 7.20780E−08 |

TABLE 39

| | PROJECTION DISTANCE = ∞ | | |
|---|---|---|---|
| | WIDE-ANGLE END | MIDDLE | TELEPHOTO END |
| ZOOM RATIO | 1.000 | 1.118 | 1.250 |
| f′ | 1.000 | 1.118 | 1.250 |
| FNo. | 2.40 | 2.40 | 2.40 |
| 2ω[°] | 99.8 | 93.0 | 86.2 |
| DD[6] | 1.9351 | 1.9351 | 1.9351 |
| DD[10] | 1.6328 | 1.0819 | 0.6397 |
| DD[17] | 3.2221 | 2.8706 | 2.3868 |
| DD[20] | 0.0748 | 0.9772 | 1.9032 |

| | PROJECTION DISTANCE = 143.28 | | | PROJECTION DISTANCE = 59.27 | | |
|---|---|---|---|---|---|---|
| | WIDE-ANGLE END | MIDDLE | TELEPHOTO END | WIDE-ANGLE END | MIDDLE | TELEPHOTO END |
| ZOOM RATIO | 1.000 | 1.118 | 1.250 | 1.000 | 1.118 | 1.250 |
| f′ | 1.002 | 1.121 | 1.253 | 1.007 | 1.125 | 1.258 |
| FNo. | 2.40 | 2.40 | 2.40 | 2.40 | 2.40 | 2.40 |
| 2ω[°] | 99.6 | 92.8 | 85.8 | 99.2 | 92.2 | 85.4 |
| DD[6] | 1.6249 | 1.6249 | 1.6249 | 1.1141 | 1.1141 | 1.1141 |
| DD[10] | 1.9430 | 1.3921 | 0.9499 | 2.4538 | 1.9029 | 1.4607 |

Example 14

Figure 17:
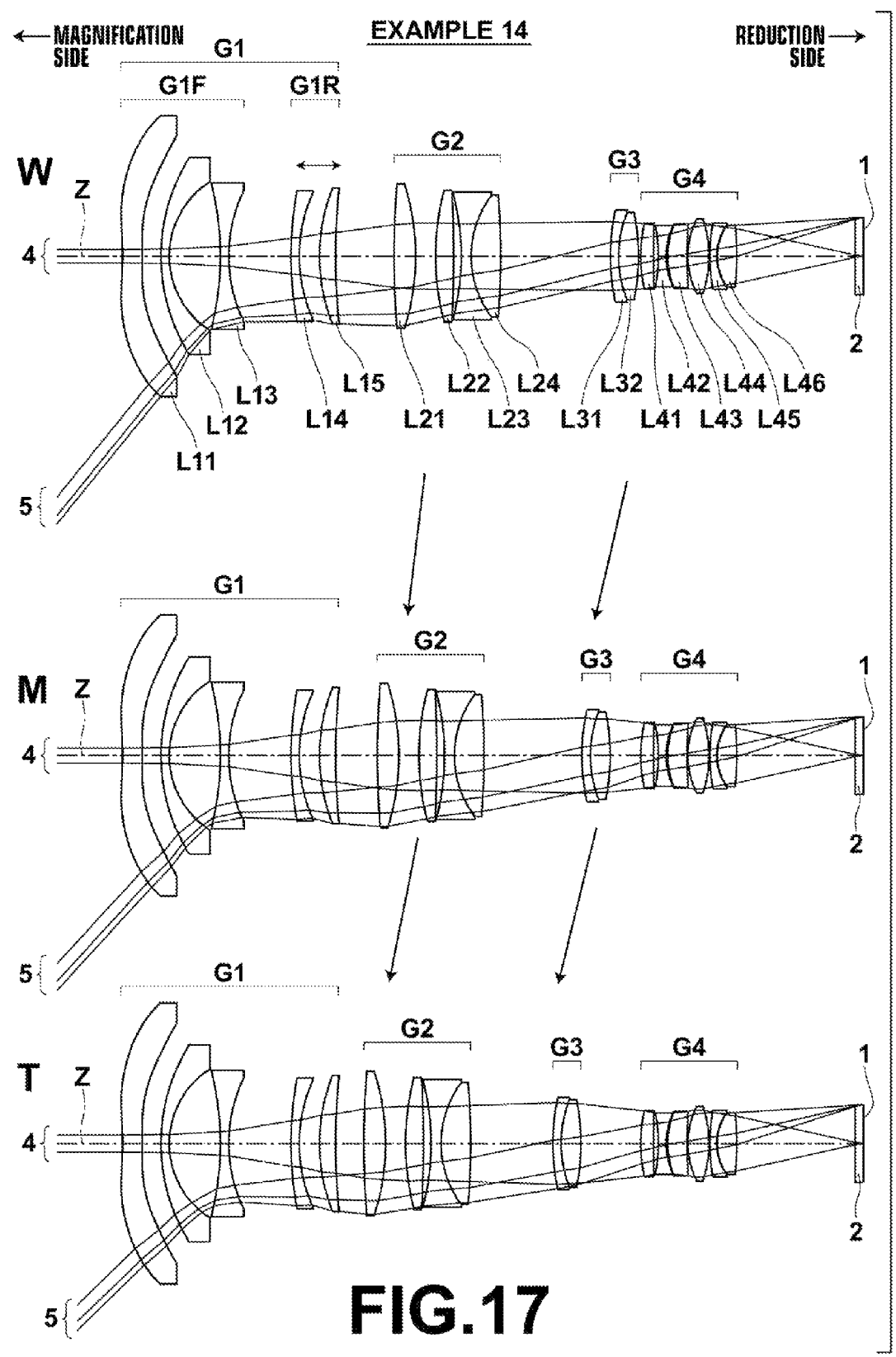
FIG. 17 is a cross section illustrating the lens configuration of a zoom lens for projection in Example 14 of the present invention and paths of rays.
Figure 45:
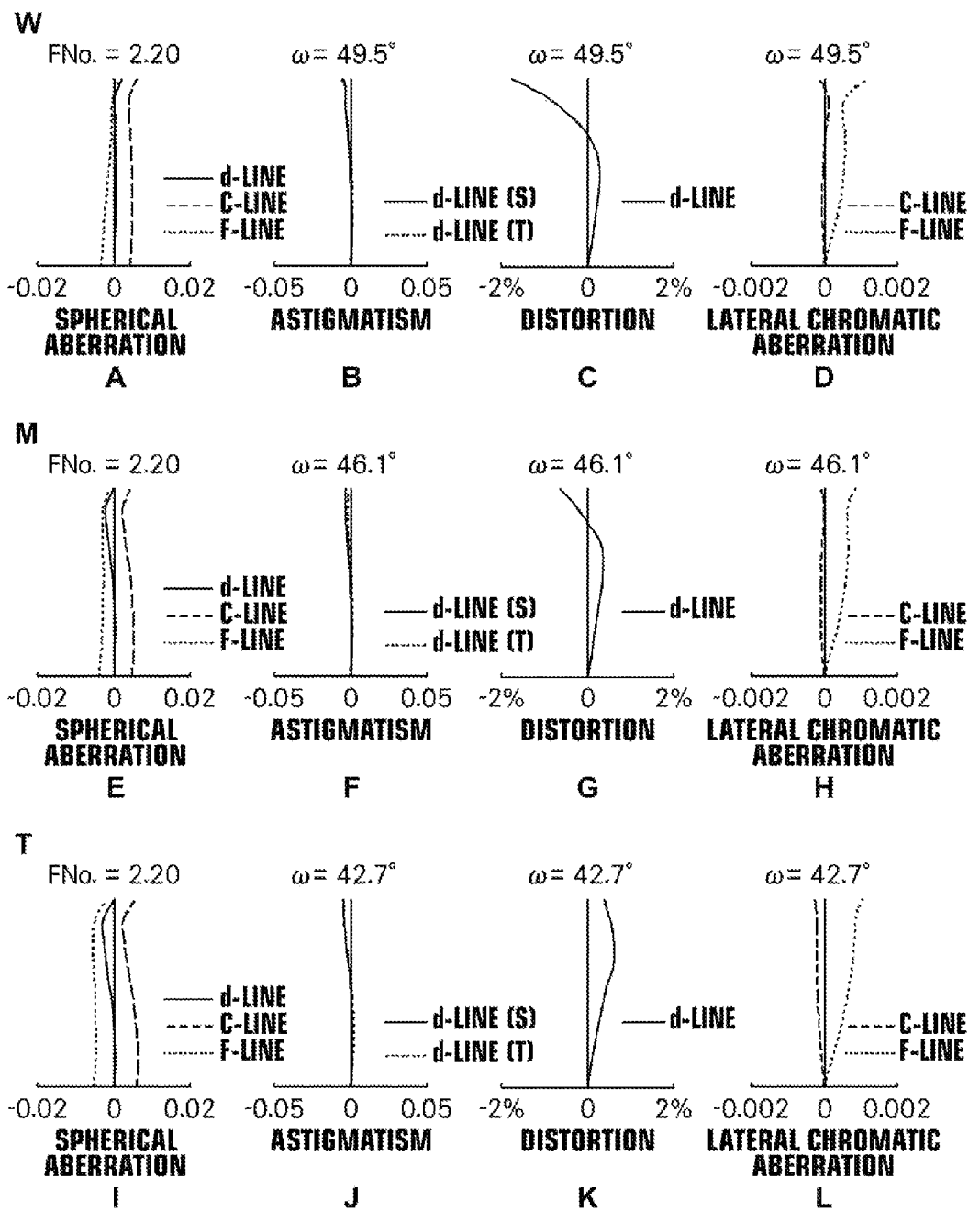
FIG. 45, Sections A through L are aberration diagrams of the zoom lens for projection in Example 14 of the present invention when a projection distance is a closest distance.

FIG. 17 is a diagram illustrating a cross section of the zoom lens for projection in Example 14 and paths of rays. In the zoom lens for projection of Example 14, the group configuration, the schematic configuration of each lens group and the focusing method are almost similar to the zoom lens for projection in Example 10. Table 40, Table 41 and Table 42 show basic lens data of the zoom lens for projection in Example 14, aspherical coefficients, and specification for d-line and values of variable surface distances, respectively. FIG. 44, Sections A through L and FIG. 45, Sections A through L are aberration diagrams of the zoom lens for projection in Example 14. In Example 14, a reference projection distance is 142.66, and a closest projection distance is 55.21.

TABLE 40

| Si | Ri | Di | Ndj | vdj |
|---|---|---|---|---|
| *1 | −6.2886 | 0.6164 | 1.49100 | 57.58 |
| *2 | −36.9416 | 0.6054 | | |
| 3 | 5.5210 | 0.2641 | 1.74400 | 44.78 |
| 4 | 2.6427 | 1.6337 | | |
| 5 | −8.7302 | 0.2641 | 1.77250 | 49.60 |
| 6 | 4.4679 | DD[6] | | |
| 7 | 10.4539 | 0.2641 | 1.72342 | 37.95 |
| 8 | 4.6142 | 0.6442 | | |
| 9 | 5.4558 | 0.5151 | 1.51633 | 64.14 |
| 10 | 20.4714 | DD[10] | | |
| 11 | 25.4956 | 0.6872 | 1.59551 | 39.24 |
| 12 | −6.9765 | 0.6377 | | |
| 13 | 7.7260 | 0.5671 | 1.54814 | 45.79 |
| 14 | −38.3319 | 0.2463 | | |
| 15 | −7.2919 | 0.3166 | 1.62041 | 60.29 |
| 16 | 3.0217 | 0.9396 | 1.56732 | 42.82 |
| 17 | −21.4410 | DD[17] | | |

TABLE 40-continued

| Si | Ri | Di | Ndj | vdj |
|---|---|---|---|---|
| 18 | 6.3830 | 0.2643 | 1.80518 | 25.42 |
| 19 | 3.5042 | 0.6302 | 1.48749 | 70.23 |
| 20 | −6.5022 | DD[20] | | |
| 21 | 4.6369 | 0.4052 | 1.48749 | 70.23 |
| 22 | 36.9369 | 0.1557 | | |
| 23 | −4.4572 | 0.2468 | 1.77250 | 49.60 |
| 24 | 2.1165 | 0.0475 | | |
| 25 | 2.5243 | 0.6215 | 1.51633 | 64.14 |
| 26 | 18.9649 | 0.0176 | | |
| 27 | 2.4201 | 0.6762 | 1.48749 | 70.23 |
| 28 | −3.4292 | 0.0263 | | |
| 29 | 5.5711 | 0.2201 | 1.80400 | 46.57 |
| 30 | 1.5612 | 0.0140 | | |
| 31 | 1.6068 | 0.6237 | 1.51633 | 64.14 |
| 32 | −8.8139 | 3.7708 | | |
| 33 | ∞ | 0.2642 | 1.50847 | 61.19 |
| 34 | ∞ | | | |

TABLE 41

| SURFACE NUMBER | 1 | 2 |
|---|---|---|
| KA | 8.00000E−01 | −2.79783E+00 |
| A3 | 2.50232E−02 | 2.98568E−02 |
| A4 | 2.37275E−02 | 1.28594E−02 |
| A5 | −9.80605E−03 | −2.43828E−03 |
| A6 | 8.15971E−04 | −7.75812E−04 |
| A7 | 1.92159E−04 | −2.83525E−04 |
| A8 | −1.53367E−05 | 8.28747E−05 |
| A9 | −6.03411E−06 | 2.29879E−05 |
| A10 | 2.50230E−07 | 1.20211E−06 |
| A11 | 1.28680E−07 | −1.63349E−06 |
| A12 | 1.16241E−08 | −1.94059E−07 |
| A13 | −3.57199E−09 | 5.94465E−08 |

TABLE 42

| | PROJECTION DISTANCE = ∞ | | |
|---|---|---|---|
| | WIDE-ANGLE END | MIDDLE | TELEPHOTO END |
| ZOOM RATIO | 1.000 | 1.118 | 1.250 |
| f | 1.000 | 1.118 | 1.250 |
| FNo. | 2.20 | 2.20 | 2.20 |
| 2ω[°] | 99.8 | 93.0 | 86.2 |
| DD[6] | 1.9809 | 1.9809 | 1.9809 |
| DD[10] | 1.8563 | 1.3243 | 0.8974 |
| DD[17] | 3.4956 | 3.1240 | 2.6240 |
| DD[20] | 0.0748 | 0.9784 | 1.9054 |

| | PROJECTION DISTANCE = 142.66 | | | PROJECTION DISTANCE = 55.21 | | |
|---|---|---|---|---|---|---|
| | WIDE-ANGLE END | MIDDLE | TELEPHOTO END | WIDE-ANGLE END | MIDDLE | TELEPHOTO END |
| ZOOM RATIO | 1.000 | 1.118 | 1.250 | 1.000 | 1.118 | 1.250 |
| f | 1.002 | 1.120 | 1.253 | 1.007 | 1.125 | 1.258 |
| FNo. | 2.20 | 2.20 | 2.20 | 2.20 | 2.20 | 2.20 |
| 2ω[°] | 99.6 | 92.6 | 85.8 | 99.0 | 92.2 | 85.4 |
| DD[6] | 1.6910 | 1.6910 | 1.6910 | 1.1644 | 1.1644 | 1.1644 |
| DD[10] | 2.1462 | 1.6142 | 1.1872 | 2.6728 | 2.1409 | 1.7139 |

Table 43 shows values corresponding to conditional expressions (1) through (10), (12) through (14) and values used in the conditional expressions in Examples 1 through 14. Expression numbers and corresponding physical quantities are written in the column of "CONDITIONAL EXPRESSION" of Table 43, and the description of upper limit values and lower limit values is omitted. Table 43 shows values for d-line when a projection distance is infinity.

TABLE 43

| CONDITIONAL EXPRESSION | EX. 1 | EX. 2 | EX. 3 | EX. 4 | EX. 5 | EX. 6 | EX. 7 | EX. 8 | EX. 9 | EX. 10 | EX. 11 | EX. 12 | EX. 13 | EX. 14 |
|---|---|---|---|---|---|---|---|---|---|---|---|---|---|---|
| (1) fGe/fw | 6.482 | 6.664 | 5.995 | 7.001 | 9.187 | 7.025 | 8.521 | 7.672 | 7.562 | 7.164 | 7.051 | 7.056 | 7.448 | 7.399 |
| (2) d1/Hr1 | 0.029 | 0.029 | 0.029 | 0.029 | 0.015 | 0.029 | 0.014 | 0.014 | 0.014 | 0.014 | 0.015 | 0.015 | 0.015 | 0.015 |
| (3) RF1 × (NdR1−1) | 0.692 | 0.710 | 0.729 | 0.581 | 0.591 | 0.730 | 0.570 | 0.615 | 0.615 | 0.639 | 0.563 | 0.564 | 0.625 | 0.624 |
| RR1 × (NdF1−1) | | | | | | | | | | | | | | |
| (4) fp12/fw | 3.131 | 2.870 | 2.928 | 3.177 | 2.893 | 2.982 | 2.988 | 2.950 | 2.794 | 2.572 | 2.600 | 2.698 | 2.929 | 2.948 |
| (5) d2/Hr2 | 0.027 | 0.028 | 0.029 | 0.028 | 0.056 | 0.028 | 0.074 | 0.063 | 0.053 | 0.029 | 0.060 | 0.063 | 0.051 | 0.051 |
| (6) RF2 × (NdR2−1) | 0.586 | 0.561 | 0.593 | 0.600 | 0.521 | 0.586 | 0.636 | 0.524 | 0.553 | 0.611 | 0.642 | 0.634 | 0.564 | 0.560 |
| RR2 × (NdF2−1) | | | | | | | | | | | | | | |
| (7) Bf/y | 3.657 | 3.463 | 3.445 | 3.427 | 3.459 | 3.458 | 3.385 | 3.311 | 3.310 | 3.309 | 3.466 | 3.450 | 3.320 | 3.319 |
| (8) y/fw | 1.109 | 1.177 | 1.177 | 1.176 | 1.174 | 1.177 | 1.172 | 1.177 | 1.182 | 1.180 | 0.941 | 0.941 | 1.190 | 1.189 |
| (9) fG1F/fw | −1.854 | −1.557 | −1.756 | −1.925 | −1.935 | −1.810 | −1.846 | −1.818 | −1.832 | −1.667 | −1.456 | −1.745 | −1.685 | −1.675 |
| (10) Dep/y | 4.831 | 4.544 | 4.544 | 4.544 | 4.544 | 4.544 | 4.544 | 4.544 | 4.544 | 4.544 | 4.544 | 4.544 | 4.544 | 4.544 |
| (12) φGL·y × 2 | −0.422 | −0.538 | −0.541 | −0.548 | −0.539 | −0.554 | −0.492 | −0.477 | −0.485 | −0.472 | −0.442 | −0.420 | −0.534 | −0.488 |
| (13) vp | 48.09 | 55.31 | 48.09 | 48.09 | 48.09 | 48.09 | 43.38 | 49.60 | 49.60 | 46.90 | 43.38 | 43.38 | 48.09 | 48.09 |
| (14) Hc/y | −0.180 | −0.146 | −0.195 | −0.202 | −0.199 | −0.172 | −0.205 | −0.210 | −0.205 | −0.207 | −0.177 | −0.175 | −0.180 | −0.180 |
| fw | 1.000 | 1.000 | 1.000 | 1.000 | 1.000 | 1.000 | 1.000 | 1.000 | 1.000 | 1.000 | 1.000 | 1.000 | 1.000 | 1.000 |
| fGe | 6.482 | 6.664 | 5.995 | 7.001 | 9.187 | 7.025 | 8.521 | 7.672 | 7.562 | 7.164 | 7.051 | 7.056 | 7.448 | 7.399 |
| Hr1 | 0.888 | 0.898 | 0.900 | 0.896 | 0.882 | 0.889 | 0.905 | 0.918 | 0.919 | 0.923 | 0.702 | 0.714 | 0.899 | 0.923 |
| fp12 | 3.131 | 2.870 | 2.928 | 3.177 | 2.893 | 2.982 | 2.988 | 2.950 | 2.794 | 2.572 | 2.600 | 2.698 | 2.929 | 2.948 |
| Hr2 | 0.950 | 0.919 | 0.914 | 0.944 | 0.983 | 0.923 | 0.964 | 0.935 | 0.931 | 0.913 | 0.795 | 0.796 | 0.895 | 0.940 |
| Bf | 4.054 | 4.078 | 4.054 | 4.029 | 4.060 | 4.070 | 3.968 | 3.897 | 3.914 | 3.905 | 3.263 | 3.246 | 3.950 | 3.946 |
| y | 1.109 | 1.177 | 1.177 | 1.176 | 1.174 | 1.177 | 1.172 | 1.177 | 1.182 | 1.180 | 0.941 | 0.941 | 1.190 | 1.189 |
| fG1F | −1.854 | −1.557 | −1.756 | −1.925 | −1.935 | −1.810 | −1.846 | −1.818 | −1.832 | −1.667 | −1.456 | −1.745 | −1.685 | −1.675 |
| Dep | 5.355 | 5.351 | 5.349 | 5.343 | 5.334 | 5.349 | 5.327 | 5.349 | 5.374 | 5.362 | 4.278 | 4.276 | 5.408 | 5.403 |
| φGL | 1.796 | 1.817 | 1.813 | 1.803 | 1.808 | 1.800 | 1.852 | 1.878 | 1.880 | 1.888 | 1.440 | 1.462 | 1.846 | 1.890 |
| Hc | −0.200 | −0.172 | −0.229 | −0.237 | −0.234 | −0.202 | −0.240 | −0.247 | −0.242 | −0.244 | −0.167 | −0.165 | −0.214 | −0.214 |

So far, the present invention has been described by using embodiments and examples. However, the zoom lens for projection of the present invention is not limited to the aforementioned examples, and various modifications of the mode are possible. For example, the curvature radius of each lens, a distance between surfaces, a refractive index, an Abbe number and aspherical coefficients may be appropriately modified.

Further, the configuration of the projection-type display apparatus of the present invention is not limited to the aforementioned configuration. For example, a light valve to be used and an optical member to be used to separate rays or combine rays are not limited to the aforementioned configuration, and various modifications of the mode are possible.

What is claimed is:

1. A zoom lens for projection consisting of:
  a first lens group having negative refractive power, and which is arranged closest to a magnification side and fixed during magnification change;
  a last lens group having positive refractive power, and which is arranged closest to a reduction side and fixed during magnification change; and
  a middle group arranged between the first lens group and the last lens group, and which consists of two or three lens groups that move in such a manner to change a distance from each other during magnification change,
  wherein both of a lens group closest to the magnification side in the middle group and a lens group closest to the reduction side in the middle group have positive refractive power, and move constantly from the reduction side toward the magnification side during magnification change from a wide-angle end to a telephoto end, and
  wherein the reduction side is non-telecentric, and
  wherein the last lens group includes at least two positive lenses and at least two negative lenses, and a most reduction-side positive lens having positive refractive power is arranged closest to the reduction side in the last lens group, and
  wherein the following conditional expression (1) is satisfied:

$$3.00 < fGe/fw < 12.00 \quad (1),$$ where fGe: a focal length of the last lens group, and
fw: a focal length of an entire system at the wide-angle end when a projection distance is infinity.

2. The zoom lens for projection, as defined in claim 1, wherein the first lens group consists of a front group consisting of first through third lenses in this order from the magnification side and a rear group in this order from the magnification side, and wherein the front group includes an aspheric lens.

3. The zoom lens for projection, as defined in claim 1, wherein the most reduction-side positive lens is a biconvex lens.

4. The zoom lens for projection, as defined in claim 1, wherein a negative lens with its concave surface facing the reduction side is arranged toward the magnification side of the most reduction-side positive lens in such a manner that a first air lens is formed between the negative lens and the most reduction-side positive lens, and wherein the following conditional expression (2) is satisfied:

$$0.01<d1/Hr1<0.15 \quad (2), \text{where}$$

d1: a center thickness of the first air lens, and
Hr1: a maximum effective radius of a reduction-side surface of the first air lens.

5. The zoom lens for projection, as defined in claim 4, wherein the following conditional expression (3) is satisfied:

$$0.30<RF1\times(NdR1-1)/((RR1\times(NdF1-1))<1.10 \quad (3), \text{where}$$

RF1: a curvature radius of a magnification-side surface of the first air lens,
RR1: a curvature radius of a reduction-side surface of the first air lens,
NdF1: a refractive index for d-line of the negative lens forming the first air lens, and
NdR1: a refractive index for d-line of the most reduction-side positive lens.

6. The zoom lens for projection, as defined in claim 1, wherein the following conditional expression (4) is satisfied:

$$1.50<fp12/fw<5.00 \quad (4), \text{where}$$

fp12: a combined focal length of a second positive lens from the reduction side in the last lens group through the most reduction-side positive lens.

7. The zoom lens for projection, as defined in claim 1, wherein the last lens group includes, besides the most reduction-side positive lens, a positive lens with its convex surface facing the magnification side and a negative lens with its concave surface facing the reduction side arranged toward the magnification side of the positive lens in such a manner that a second air lens is formed between the negative lens and the positive lens, and wherein the following conditional expression (5) is satisfied:

$$0.01<d2/Hr2<0.15 \quad (5), \text{where}$$

d2: a center thickness of the second air lens, and
Hr2: a maximum effective radius of a reduction-side surface of the second air lens.

8. The zoom lens for projection, as defined in claim 7, wherein the following conditional expression (6) is satisfied:

$$0.30<RF2\times(NdR2-1)/((RR2\times(NdF2-1))<1.10 \quad (6), \text{where}$$

RF2: a curvature radius of a magnification-side surface of the second air lens,
RR2: a curvature radius of a reduction-side surface of the second air lens,
NdF2: a refractive index for d-line of the negative lens forming the second air lens, and
NdR2: a refractive index for d-line of the positive lens forming the second air lens.

9. The zoom lens for projection, as defined in claim 1, wherein the following conditional expressions (7) and (8) are satisfied:

$$2.50<Bf/y<4.50 \quad (7); \text{and}$$

$$0.80<y/fw \quad (8), \text{where}$$

Bf: a reduction-side air-equivalent back focus of an entire system, and
y: a reduction-side maximum image height.

10. The zoom lens for projection, as defined in claim 2, wherein the following conditional expression (9) is satisfied:

$$-2.50<fG1F/fw<-0.80 \quad (9), \text{where}$$

fG1F: a focal length of the front group.

11. The zoom lens for projection, as defined in claim 1, wherein the middle group consists of two lens groups having positive refractive power, and which move during magnification change.

12. The zoom lens for projection, as defined in claim 1, wherein the middle group consists of three lens groups that move during magnification change, and wherein the three lens groups are a lens group having positive refractive power, a lens group having negative refractive power and a lens group having positive refractive power in this order from the magnification side.

13. The zoom lens for projection, as defined in claim 1, wherein the following conditional expression (10) is satisfied:

$$4.00<Dep/y<6.00 \quad (10), \text{where}$$

Dep: a length from a paraxial exit pupil position to a reduction-side image plane at a wide-angle end when the reduction side is regarded as an exit side, and
y: a reduction-side maximum image height.

14. The zoom lens for projection, as defined in claim 1, wherein the following conditional expression (1') is satisfied:

$$4.00<fGe/fw<11.00 \quad (1').$$

15. The zoom lens for projection, as defined in claim 1, wherein the following conditional expression (1") is satisfied:

$$5.00<fGe/fw<10.00 \quad (1").$$

16. The zoom lens for projection, as defined in claim 9, wherein the following conditional expression (7') is satisfied:

$$3.00<Bf/y<4.00 \quad (7').$$

17. The zoom lens for projection, as defined in claim 9, wherein the following conditional expression (8") is satisfied:

$$0.90<y/fw<1.40 \quad (8").$$

18. The zoom lens for projection, as defined in claim 10, wherein the following conditional expression (9") is satisfied:

$$-2.10<fG1F/fw<-1.30 \quad (9").$$

19. The zoom lens for projection, as defined in claim 13, wherein the following conditional expression (10') is satisfied:

$$4.00<Dep/y<5.00 \quad (10').$$

20. A projection-type display apparatus comprising:
a light source;
a light valve that light from the light source enters; and
the zoom lens for projection, as defined in claim 1, as a zoom lens for projection that projects an optical image of light optically modulated by the light valve onto a screen.

* * * * *